US007365871B2

(12) United States Patent
Monroe

(10) Patent No.: US 7,365,871 B2
(45) Date of Patent: Apr. 29, 2008

(54) APPARATUS FOR CAPTURING, CONVERTING AND TRANSMITTING A VISUAL IMAGE SIGNAL VIA A DIGITAL TRANSMISSION SYSTEM

(76) Inventor: David A. Monroe, 740 Lincoln Center, 7800 1H-10 West, San Antonio, TX (US) 78230

(*) Notice: Subject to any disclaimer, the term of this patent is extended or adjusted under 35 U.S.C. 154(b) by 0 days.

(21) Appl. No.: 10/336,470

(22) Filed: Jan. 3, 2003

(65) Prior Publication Data

US 2004/0001214 A1 Jan. 1, 2004

Related U.S. Application Data

(62) Division of application No. 09/006,073, filed on Jan. 12, 1998, now abandoned.

(51) Int. Cl.
*G06K 1/00* (2006.01)
*H04N 1/00* (2006.01)

(52) U.S. Cl. .................... 358/1.15; 358/402; 358/403; 358/407

(58) Field of Classification Search ............... 358/1.15, 358/402, 403, 407, 442, 468, 474
See application file for complete search history.

(56) References Cited

U.S. PATENT DOCUMENTS

| | | | | |
|---|---|---|---|---|
| 2,642,492 A | | 6/1953 | Hammond, Jr. | 348/24 |
| 3,251,937 A | | 5/1966 | Hoag | 358/410 |
| 3,751,159 A | | 8/1973 | Fisher | 355/20 |
| 3,864,514 A | | 2/1975 | Lemelson | 358/409 |
| 4,074,324 A | | 2/1978 | Barrett | 358/296 |
| 4,163,283 A | | 7/1979 | Darby | |
| 4,179,695 A | | 12/1979 | Levine et al. | |
| 4,197,536 A | | 4/1980 | Levine | |
| 4,516,125 A | | 5/1985 | Schwab et al. | |
| 4,530,014 A | | 7/1985 | D'Alayer de Costemore D'Arc | 386/119 |
| 4,652,926 A | | 3/1987 | Withers et al. | 347/226 |
| 4,688,244 A | * | 8/1987 | Hannon et al. | 377/58 |
| 4,831,438 A | | 5/1989 | Bellman, Jr. et al. | |
| 4,845,629 A | | 7/1989 | Murge | |
| 4,857,912 A | | 8/1989 | Everett, Jr. et al. | |
| 4,884,132 A | * | 11/1989 | Morris et al. | 358/479 |
| 4,891,650 A | | 1/1990 | Sheffer | |
| 4,910,692 A | | 3/1990 | Outram | |

(Continued)

FOREIGN PATENT DOCUMENTS

| | | |
|---|---|---|
| EP | 220752 | 5/1987 |

(Continued)

OTHER PUBLICATIONS

Anonymous, "New & Old: Web-ready Camera Server, LAN Video Connects", Security Distributing & Marketing; Apr. 1998; 28, 5; p. 58.

(Continued)

*Primary Examiner*—Houshang Safaipour

(57) ABSTRACT

An image capture, conversion, compression, storage and transmission system provides a data signal representing the image in a format and protocol capable of being transmitted over any of a plurality of readily available transmission systems and received by readily available, standard equipment receiving stations. In its most comprehensive form, the system is capable of sending and receiving audio, documentary and visual image data to and from standard remote stations readily available throughout the world.

15 Claims, 73 Drawing Sheets

U.S. PATENT DOCUMENTS 4,937,676 A 6/1990 Finelli et al. ............... 348/375
4,942,477 A 7/1990 Nakamura .................. 358/401
5,027,104 A 6/1991 Reid
5,027,114 A 6/1991 Kawashime et al.
5,032,911 A 7/1991 Takimoto .................... 358/501
5,047,870 A 9/1991 Filo ........................... 358/472
5,091,780 A 2/1992 Pomerleau
5,109,278 A 4/1992 Erickson
5,111,291 A 5/1992 Erickson
5,166,746 A 11/1992 Sato et al.
5,191,601 A * 3/1993 Ida et al. ................. 348/14.01
5,193,012 A 3/1993 Schmidt .................... 358/3.16
5,218,367 A 6/1993 Sheffer et al.
5,235,432 A 8/1993 Creedon et al. ............ 358/479
5,243,340 A 9/1993 Norman et al.
5,243,530 A 9/1993 Stanifer et al.
5,268,698 A 12/1993 Smith, Sr. et al.
5,283,643 A 2/1994 Fujimoto
5,321,615 A 6/1994 Frisbie et al.
5,334,982 A 8/1994 Owen
5,351,194 A 9/1994 Rose et al.
5,400,031 A 3/1995 Fitts
5,408,330 A 4/1995 Squicciarini et al.
5,412,708 A * 5/1995 Katz ....................... 348/14.05
5,432,838 A 7/1995 Purchase
5,440,337 A 8/1995 Henderson et al.
5,440,343 A 8/1995 Parulski
5,448,243 A 9/1995 Bethke et al.
5,463,595 A 10/1995 Rodhall et al.
5,469,371 A 11/1995 Bess
5,497,149 A 3/1996 Fast
5,508,736 A 4/1996 Cooper
5,509,009 A 4/1996 Laycock
5,515,176 A 5/1996 Galen et al. ................ 358/403
5,517,683 A * 5/1996 Collett et al. ............ 455/575.1
5,530,440 A 6/1996 Denzer et al.
5,539,452 A 7/1996 Bush et al. .............. 348/14.13
5,546,194 A 8/1996 Ross .......................... 358/445
5,550,646 A 8/1996 Hassan et al. .............. 358/442
5,553,609 A 9/1996 Chen et al.
5,557,254 A 9/1996 Johnson et al.
5,557,278 A 9/1996 Piccirillo et al.
5,598,167 A 1/1997 Zjderhand
5,612,668 A 3/1997 Scott
5,627,753 A 5/1997 Brankin et al.
5,629,691 A 5/1997 Jain
5,636,122 A 6/1997 Shah et al.
5,642,285 A 6/1997 Woo
5,666,157 A 9/1997 Avid
5,666,159 A 9/1997 Parulski et al. .......... 348/211.2
5,670,961 A 9/1997 Tomote et al.
5,677,979 A 10/1997 Squicciarini
5,684,716 A 11/1997 Freeman ..................... 345/723
5,689,300 A 11/1997 Shibata et al. ........... 348/14.07
5,689,442 A 11/1997 Swanson
5,712,679 A 1/1998 Coles
5,712,899 A 1/1998 Pace, II
5,714,948 A 2/1998 Farmakis et al.
5,742,336 A 4/1998 Lee
5,751,346 A 5/1998 Dozier
5,777,551 A 7/1998 Hess
5,777,580 A 7/1998 Janky et al.
5,793,416 A 8/1998 Rostoker et al.
5,825,283 A 10/1998 Camhi
5,835,059 A 11/1998 Nadel et al.
5,850,180 A 12/1998 Hess
5,867,804 A 2/1999 Pilley et al.
5,917,405 A 6/1999 Joso
5,926,210 A 7/1999 Hackett et al.
5,933,098 A 8/1999 Haxton
5,938,706 A 8/1999 Feldman
5,974,158 A 10/1999 Auty et al.
5,983,161 A 11/1999 Lemelson et al.
5,999,116 A 12/1999 Evers
6,002,427 A 12/1999 Kipust
6,009,356 A 12/1999 Monroe
6,067,571 A 5/2000 Igarashi et al.
6,069,655 A 5/2000 Seeley
6,072,600 A 6/2000 Wertsberger ............... 358/479
6,078,850 A 6/2000 Kane et al.
6,084,510 A 7/2000 Lemelson et al.
6,092,008 A 7/2000 Bateman
6,100,964 A 8/2000 De Cremiers
6,133,941 A 10/2000 Ono
6,154,658 A 11/2000 Caci
6,157,317 A 12/2000 Walker
6,181,373 B1 1/2001 Coles
6,195,609 B1 2/2001 Pilley et al.
6,226,031 B1 5/2001 Barraciough et al.
6,246,320 B1 6/2001 Monroe
6,259,475 B1 7/2001 Ramachandran et al.
6,275,231 B1 8/2001 Obradovich
6,278,965 B1 8/2001 Glass et al.
6,282,488 B1 8/2001 Castor et al.
6,292,098 B1 9/2001 Ebata
6,356,625 B1 3/2002 Casteiani
6,385,772 B1 5/2002 Courtney
6,424,370 B1 7/2002 Courtney
6,462,697 B1 10/2002 Klamer et al.
6,476,858 B1 11/2002 Ramirez Diaz et al.
6,504,479 B1 1/2003 Lemons
6,522,352 B1 2/2003 Strandwitz et al.
6,525,761 B2 2/2003 Sato et al.
6,549,130 B1 4/2003 Joso
6,556,241 B1 4/2003 Yoshimura et al.
6,570,610 B1 5/2003 Kipulst
6,628,835 B1 9/2003 Brill
6,646,676 B1 11/2003 DeGrace
6,662,649 B1 12/2003 Knight et al.
6,675,386 B1 1/2004 Hendricks et al.
6,698,021 B1 2/2004 Amini
6,720,990 B1 4/2004 Walker et al.
7,113,971 B1 9/2006 Ohi et al.
2003/0071899 A1 4/2003 Joso
2005/0055727 A1 3/2005 Creamer et al.
2005/0138083 A1 6/2005 Rastegar

FOREIGN PATENT DOCUMENTS

EP 232031 8/1987
EP 532110 3/1993
EP 209397 7/1993
EP 613109 8/1994
EP 613110 8/1994
EP 613111 8/1994
EP 744630 11/1996
EP 785536 7/1997
JP 06-268582 A * 9/1994
JP 6-301898 10/1994
JP 9-282600 10/1997
JP HEI-10-66058 3/1998
JP A-10-155040 6/1998
JP 9-251599 4/1999
JP 11-160424 6/1999
WO WO90/04242 4/1990
WO WO95/27910 10/1995
WO WO96/12265 4/1996
WO WO97/37336 10/1997
WO WO98/52174 11/1998

OTHER PUBLICATIONS

Anonymous, "The Eye's Mind: the Brains Behind Online Monitoring", Security: Jun. 1998; 35, 6; p. 68.

Zalud, Bill, "New & Old: Web-ready Camera Seriver, LAN Video", Security: Mar. 1998; 35,3; p. 52.
Mesenbrink, John, "Remote Video Surveillance: Breakthroughs Continue in LANs, WANs", Security Distributing & Marketing; Mar. 2000; 30.4, p. 23.
Mahonen, Petri, "Wireless Video Surveillance: System Concepts", Proceedings International Conference on Image Anaysis and Processing, ICIAP'99.
Colombo, Ailan B., "Internet Video: Ride the Wave" Security Distributing & Marketing, Oct. 2000; 30, 13, p. 71.
Anonymous, "SIA Police Chiefs Call Meeting on Public CCTV Law", Security, Jan. 1999; 35, 1, p. 52.
Mesenbrink, John, "Remote Video Surveillance: The Best of Both Worlds", Security: Mar. 2000; 37, 3, p. 37.
Anonymous, "School District sets Video Surveillance Standard", Security, Jun. 2000, 37, 6; p. 43.
Gold, Lessing E., "Remote Surveillance saves time, money", Security Distributing & Marketing, Jan. 1999; 29, 1, p. 105.
Anonymous, "Video Security System Alternative", Community Banker; Sep. 2000; 9,9, p. 52.
Zalud, Bill, "Conquering Digital Marks CCTV Inovations", Security, Apr. 2000; 37, 4, p. 43.
Anonymous, "Surveillance Cameras Harbour Racing Secrets", Security, Jan. 2000; 37, 1, p. 29.
Everett, H.R.. Laird, R.T., Gilbreath, G., Heath-Pastore, T.A., Inderieden, R.S., Grant, K., Jaffee, D.M., "Multiple Resource Host Architecture for the Mobile Detection Assessment and Response System", Space & Naval Warfare Systems Center; Technical Document 3026; Aug. 1998.
Collins, Robert T., Lipton, Alan J., Kanade, Takeo, Fujiyoshi, Hironobu, Duggins, David, Tsin, Yanghai, Tolliver, David, Enomoto, Nobuyoshi, Hasegawa, Osamo, Burt, Peter, Wixson, Lambert, "A system for Video Surveillance and Monitoring", CMU-RI-TR-00-12; 2000 Cameige Mellon University.
Wiggins, A.E., "Helsinki Journey Time Monitoring System", May 12, 1999 at IEE; CCTV and Road Surveillance.
Kuo. Chin-Hwa, Wang, Tay-Shen, "Design of Networked Visual Monitoring Systems", ISCAS 2000—IEEE Int'l Symposium on Circuits and Systems, May 28-31, 2000, pp. 297-300.
Harrison, Ian, Lupton, David, "Automatic Road Traffic Event Monitoring Information System (ARTEMIS)", May 12, 1999 at IEE; CCTV and Road Surveillance.
Bradbury, Spencer, "A Paper on Communications Protocols and Compression Techniques for Digital CCTV Applications"May 12, 1999 at IEE; CCTV and Road Surveillance.
Wunnava, Subbarso V., De La Cruz, Moises, "WEB Based Remote Security System (WRSS) Model Development", Proceedings of IEEE SE Con 2000, Apr. 7-9, 2000, pp. 379-382.
Bryan, W.D., Nguyen, H.G., Gage, D.W., "Man-Portable Networked Sensor System," SPIE Cfr on Sensor Technology f/Soldier Systems, Apr. 1998, SPIE vol. 3394, pp. 79-88.
Balch, Kris, "Replacing 16mm Airborne Film Cameras w/Commercial-Off-The-Shelf Digital Imaging," SPIE Cfr—Digitization of Battlespace III, Apr. 1998, SPIE vol. 3393. pp. 226-237.
Hata, Tsukada, BOH, Satoru, Tsukada, Akira, Ozaki, Minoru, "User interface using 3D model for video surveillance," SPIE vol. 3228,pp. 238-246.
Yamashiro, Zuiki, Yoshiada, Toshihiro, Utilizing Picture Information in the Traffic Field: The Intelligent Integrated ITV Systems (IIIS), (IITS), Proceedings of the 1999 IEEE/IEEJ/JSAI International Conference on Intelligent Transporation Systems, Oct. 5-8, 1999, pp. 224-229.
Sato, Kazuya, Tsukada, Akihiro, Matsuda, Furnio, Kawasaki, Kaoru, Ozaki, Minoru, "Multimedia Systems for Industrial Surveillance," SPIE vol. 3020, pp. 182-19.
Maeda, Hiromi, "About the Internet as ITS" Proceedings of the 1999 IEEE/IEEJ/JSAI International Conference on Intelligent Transporation Systems, Oct. 5-6, 1999, pp. 478-483.
Infographics Systems, "Network Video Recorder eWave NVR Series Digital Recorder/Administrators Manual," 2001, pp. 1-47.
Gage, Douglas W., Bryan, W. Dale, Nguyen, Hoa G., "Internetting tactical security sensor systems," SPIE Cfr Digitization of Battlespace III; Apr. 1998, SPIE vol. 3393, pp. 184-194.
Kohno, Atsushi, Hata, Toshihiko, Ozaki, Minorr, "Moving Object Detection Method Using H.263 Video Coded Data for Remote Surveillance Systems" IS&T/SPIE Cfr on Videometrics VI, Jan. 1999, SPIE vol. 3641, pp. 247-258.
Gage, Douglas W., "Network Protocols for Mobile Robot Systems", SPIE vol. 3210, pp. 107-118.
Laird, R.T., Everett, H.R., Gilbreath, G.A., Heath-Pastore. T.A., Inderieden, R.S., "MDARS Multiple Robot Host Architecture", Assn. of Unmanned Vehicle Systems, Jul. 10-12, 1995.
Smart, J., "Integrated Workstations for Reliable, Site-Independent Security Monitoring and Control", IEEE Publication CH22645-0/88/0000-0145; 1998; pp. 145-149.
Apr. 1966, Apollo Unified S-Band System, NASA-Goddard Space Flight Center, Greenbelt, Maryland.
Nov. 24, 19976, TELEXIS ViaNet General Information Booklet Version 1.3.
2000, ViaNet 3000 Administrator's Manual Version 1.1-NetXpress Video by TELEXIS, Kanata, Ontario, Canada.
1999, ViaNet 3000 Operator Manual Version 1.0 by TELEXIS-NetXpress Video, Kanta, Ontario, Canada.
1999, viaNet 3000 Administrator Manual Version 1.0-NetXpress Video by TELEXIS, Kanata, Ontario, Canada.
1999, ViaNet 3000 Instruction Manual Operator's Revision 1-NetXpress Video by TELEXIS, Kanata, Ontario, Canada.

* cited by examiner

J23
INPUTI
5VCURR
CHRGEI
-EPWR
BATEMP
PON
1
2
3
4
5
6
B68-ZR
JST
D

J24
+5V
HOT5V
GND
GND
+18V
-5.5V
+5.5V
VIN+
SAT-
1
2
3
4
5
6
7
8
9
B98-ZR
JST
E

J6
AGND
AGND
-5V
+18V
-10V
+5.5V
-SYNON
SYNCLK
1
2
3
4
5
6
7
8
B88-ZR
JST
J17
1
2
3
4
B48-ZR

F
G

POWER
BOARD
J14
1
2
3
4
B48-ZR
JST
J13
1
2
3
4
BATT CONN

FIG. 8D-29
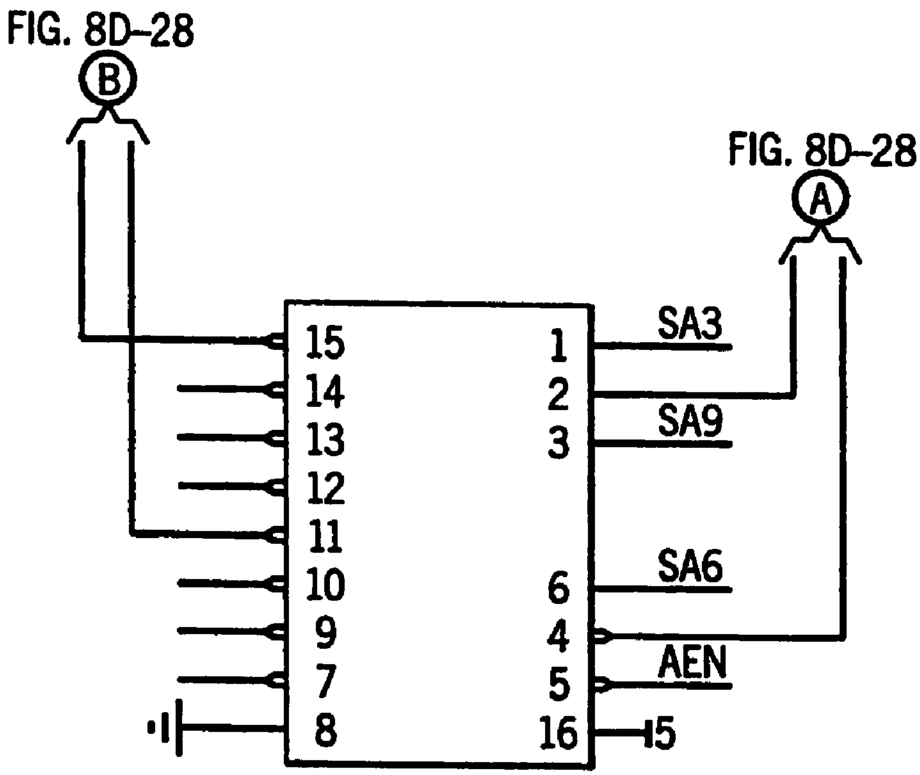
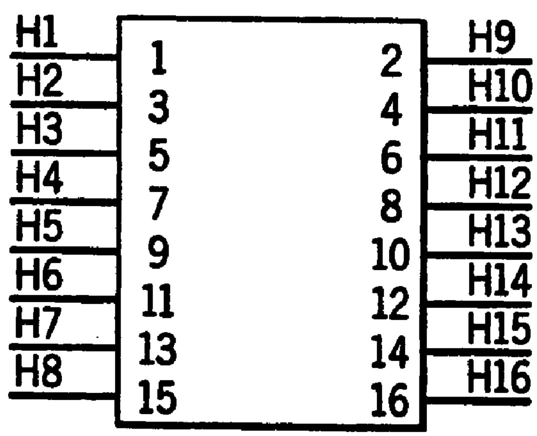

APPARATUS FOR CAPTURING, CONVERTING AND TRANSMITTING A VISUAL IMAGE SIGNAL VIA A DIGITAL TRANSMISSION SYSTEM

This application is a divisional application of and claims priority from a non-provisional United States Application entitled Apparatus For Capturing, Converting And Transmitting A Visual Image Signal Via A Digital Transmission System, Ser. No. 09/006,073, having a filing date of Jan. 12, 1998, now abandoned; the specification and drawings of which are hereby incorporated by reference.

BACKGROUND OF THE INVENTION

1. Field of the Invention

The invention is generally related to image capture and transmission systems and is specifically directed to an image capture, compression and transmission system for use in connection with land line and wireless telephone systems.

2. Discussion of the Prior Art

SUMMARY OF THE INVENTION

Embodiments provide an image capture, compression and transmission system that is specifically designed to permit reliable visual image transmission over land line or wireless communications using commercially available facsimile transmission techniques. Embodiments incorporate a camera and signal converter into an integrated unit wherein the converted signal can be transmitted on a real time basis or may be stored in memory for later recall and transmission. Embodiments provide maximum flexibility, with the camera/converter/telephone or other transmission device being designed in a modular configuration wherein any or all of the devices can exist as integrated or independent units.

Embodiments permit capture of a video image using a digital camera, an analog camera, or a video camera such as a camcorder. The captured video image is then converted into still frame digitized format for transmission over any of a variety of transmission systems ranging from Group-III facsimile to computer, or to a like device at a remote location, in any protocol desired. According to embodiments, once a signal is digitized, the transmission protocols are virtually endless.

Embodiments permit a still frame visual image to be captured at a remote location and sent immediately, over wireless communication systems, to a remote location such as, by way of example, a computer system wherein the image could be merged directly into newsprint. The image may also be sent to and printed as a hard copy using any Group-III facsimile machine, anywhere in the world. Where desired, the images may be stored in memory for later recall, and may be archived on a portable medium such as a memory card or the like.

Embodiments are useful for applications where immediate transmission of visual images of scenes, people and objects is desirable and sophisticated equipment is not always available for receiving the information. Embodiments also provide a unique and reliable means for transmitting visual data to and from remote locations, such as, by way of example, law enforcement and emergency vehicles and the like.

In an embodiment a system includes a video camera and an integral cellular telephone, wherein the telephone using the standard audio mode or future digital modes, can be used to transmit and receive visual image signals. An embodiment including a desk model is also disclosed and permits connection to a standard land line telephonic system. An embodiment including a mobile console model is disclosed for use in law enforcement vehicles, and the like. Other communication systems are also supported by embodiments, including hardwired networks, radio and satellite transmissions and the like.

In embodiments, a local facsimile machine can be incorporated with the unit and can serve as a printer for providing hard copy of the captured image at the point of capture, as well as being adapted for receiving facsimile transmissions in the standard fashion.

Embodiments disclose circuitry for supporting any configurations from a basic real time transmission system via Group-III fax to a comprehensive system supporting both land line and wireless transmission of image, audio and documentary data at both a local and remote station.

Embodiments permit digitized collection of audio signals through the use of an internal microphone, and external input device, a cellular telephone, land line telephone, wireless radio or other communication system, and digitized audio playback, as well. The playback can be via an internal speaker, out an external out jack to a remote device or via a cellular telephone, land line telephone, wireless radio or other communication system.

In embodiments, digitized image and audio capture features permit association of audio with an image, as well as data with the image. Useful data associated with the image includes GPS from either internal or external GPS devices, range information from ranging devices, date and time, and text which may be input from an integrated keyboard or from a remote device.

In embodiments, a system supports storage of images in an interim storage format including raw video, compressed video, interim gray scale format and/or half tone format. In embodiments, the image can also be stored in the selected output mode,such as by way of example, a Group-III facsimile mode. According to embodiments, the versatile capability of a system permits transmission of captured data to a standard bi-level facsimile machine such as Group-III, to gray scale facsimile systems or full color facsimile systems, as well as to other remote receiving devices such as, by way of example, personal computers and network servers. The data can be configured in any of a variety of formats and protocols including JPEG, FAX, wireless, emerging imagery formats, FAX and computer data protocols. Embodiments are adapted to operate in multiple modes, with a unitary capture and send mode or separate capture and store, and send modes.

In an embodiment, the system is adapted for tagging a collected image, video, audio, and other data such as GPS information, with geospatial information and real time clock and added text. This permits the complete historical data to be transmitted simultaneously with the image signal.

According to embodiments, it is contemplated that a system can be self-contained with an integral power unit such as a disposable battery, rechargeable battery source or the like.

According to embodiments, where desired, a system also includes camera operation control capability through the use of digital/analog circuits for converting digital commands to analog signals for controlling the gain, pedestal, setup, white clip, lens focus, white balance, lens iris, lens zoom and other functions of the camera from a local input device, a remote device or as automatic or programmed functions. The central processor can also be used to control camera shutter rate. Other camera features and parameters which can be controlled in this manner are compressor resolution (such as high, medium, low user settings) corresponding to compression rate parameters, field/frame mode, color or monochrome, image spatial resolution (640×420 pixels, 320×240 pixels, for example), lens and camera adjustments, input selection where multiple cameras or video sources are used and the like.

According to embodiments, when an integrated communications device is used, such as by way of example, a cellular telephone, the telephone can be isolated from the rest of the system to permit independent use, and independent power up and power off and other cellular phone functions.

According to embodiments, in operation, a system permits not only the manual capture, dial (select) and send of images, but can also be fully automated to capture, dial and send, for example, on a timed sequence or in response to a sensor such as a motion sensor, video motion detection, or from a remote trigger device. The remote trigger also can be activated by an incoming telephone signal, for example.

In embodiments, a remote device can also be used for remote loading and downloading of firmware, and for setting of the programmable parameters such as to provide remote configuration of sampling modes during capture, compression rates, triggering methods and the like.

The triggering function permits a multitude of sampling schemes for a simple triggered activation for capturing an image upon initiation to a trigger signal to more complicated schemes for capturing and transmitting images prior to and after receipt of the trigger signal. The trigger function can be set to operate, for example, on a time per sample and number of sample basis, or time per sample and total sample time basis, or number of samples and total time basis. Depending on application, the trigger can sample in a prior to and after signal mode, using in combination the time per sample and number of samples prior and after signal basis, a total time basis, a percent prior versus percent after trigger basis, time per sample basis, time prior to and time after trigger basis, and other combination. For example, if the image capture device is positioned to monitor traffic accidents at a specific location, and an audio signal sensor identifying a crash were used as the trigger, it would be desirable to collect image sample both prior to and after the trigger signal. The number of samples, total sample time, and percentage of samples prior to and after trigger would be controlled by the specific application.

Circular sampling techniques are supported by a data capture system of the present disclosure. This is particularly useful when triggering events are used to initiate transmission of collected image data over the communications system. For example, if a triggering event is motion detected at a motion sensor, it may be useful to look at the images captured for a period of time both prior to and after the actual event. The circuitry of subject embodiments permits any circular sampling technique to be utilized depending upon application, such as prior to an after trigger, only after trigger or only before trigger or prior to and after the trigger point. Again, as an example, it can be desirable to look primarily at images captured before a triggering event if the event is a catastrophic event such as an explosion or the like. Other circular sampling techniques can be employed, as well, incorporating multiple cameras, for example, wherein different fields are sampled depending upon the time frame in a sequence of events.

Embodiments provide an apparatus for capturing, converting and transmitting a visual image via standard facsimile transmission systems.

Embodiments provide an apparatus for compressing the visual image data in order to minimize the capacity requirements of the data capture and storage system.

Embodiments provide an apparatus for capturing and storing a visual image for later recall and review and/or transmission.

Embodiments provide an apparatus for storing a captured video image in digital format on a portable storage medium.

Embodiments provide an apparatus capable of sending and receiving telephonic audio messages, facsimile documents, and captured visual images to and from standard, readily available remote stations.

Embodiments provide the means and method for capturing images prior to, prior to and after, or after a triggering event.

Embodiments provide for triggering events and/or optional viewing or review of the captured images prior to printing or transmission.

Embodiments provide an apparatus which can be activated from a remote location for initiating the capture of images by the device.

Other objects and features will be readily apparent from the drawings and detailed description.

BRIEF DESCRIPTION OF THE DRAWINGS

FIGS. 8A-8L comprises a schematic diagram for an exemplary embodiment of the circuit for supporting the subject invention.

DETAILED DESCRIPTION OF THE PREFERRED EMBODIMENTS

According to embodiments, an image capture and transmission system captures either one or more single frame analog images or digital images or image data or visual data or visual images, the aforementioned hereinafter being referred to as an "image" or "images", and transmits a captured image in a digital signal via any of a plurality of transmission schemes through a transmission interface such as, for example, cellular transmission, radio signal, satellite transmission, hard line telephonic transmission, or other transmission to a remote receiving station where the image is downloaded for viewing on a screen or printing on hard paper copy or other medium. According to embodiments, a system is particularly well suited for sending and/or receiving images via a standard Group III facsimile transmission system and permits capture of the image at a remote location using an analog or digital camera. Two generic configurations are shown and described, the first, where each image is transmitted as it is captured, and the second, which permits capture, storage, and selective recall of captured images for transmission. Embodiments also contemplate a portable storage medium having the captured images stored thereon and which can be removed from the capture and transmission unit and archived for later use. While a system for black and white (gray tones) for Group-III facsimile transmission is described in detail herein, embodiments can be readily adapted to transmission of color images utilizing the teachings of the present disclosure using industry standard color video standards and circuits. Both portable, or hand held, image capture and transmission units and stationary, or desktop, image capture and transmission units are described. The circuitry utilized for both configurations is identical, but stationary configurations do not need a battery.

FIGS. 1-5 are circuit configuration diagrams for the various capture, storage and transmission schemes. The physical embodiments utilized to employ the teachings of the schemes taught in FIGS. 1-5 are not limited. FIGS. 6-10 are exemplary physical embodiments of the subject invention.

Figure 1:
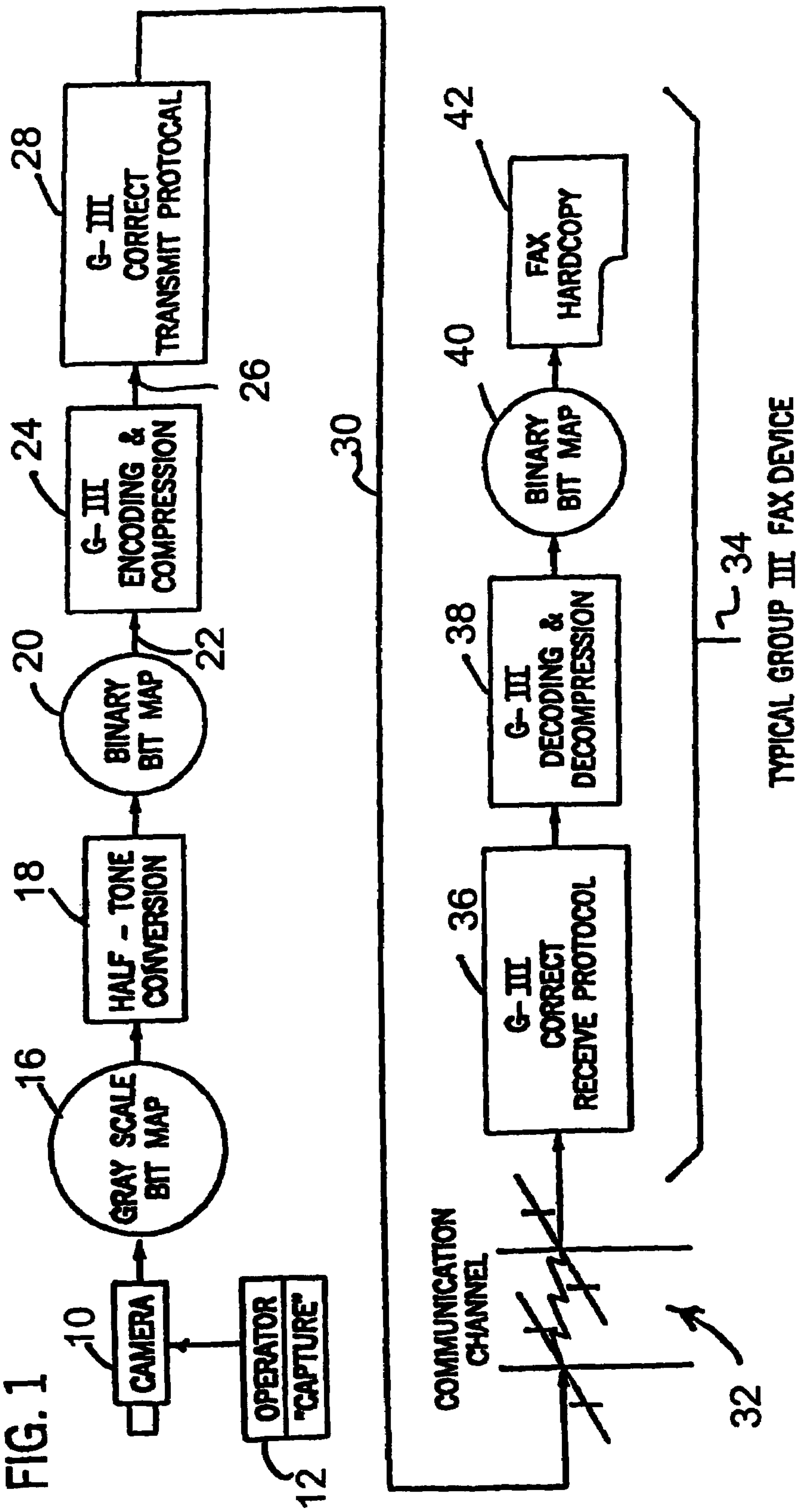
FIG. 1. is a block diagram of a basic facsimile camera configuration for capturing an image via a camera and transmitting it via Group III facsimile transmission to a standard hard copy medium.

Turning now to FIG. 1, an embodiment incorporates an image capture device such as a standard analog or digital camera device 10 for capturing a visual image in the typical fashion. The camera 10 can be operator activated as indicated at 12, or can be programmed to be activated at selected intervals or in response to certain conditions. For example, a motion detector can be utilized to activate the camera 10 in a surveillance installation. Once activated, the camera 10 captures a visual image in typical fashion through a lens (see lens 192, for example, in FIG. 7A). In the illustrated embodiment, the captured image is then transmitted to a gray scale bit map memory device 16, from which it is output to a half-tone conversion scheme 18 to be input into a binary bit map 20 for formatting the captured image in a configuration suitable for transmission via a Group-III facsimile system. The signal generated at 22 by the binary bit map 20 is input into a Group-III encoding and compression network 24 for generating an output signal at 26 which is introduced into a Group III protocol transmission device 28. The output at 30 of the transmission device 28 is then transmitted into any standard transmission interface such as, by way of example, hard line telephonic transmission, cellular transmission, radio signal, satellite transmission or other transmission system 32 via a modem or similar device, as needed (as diagrammatically illustrated at 29), to be received via a compatible interface by a remote Group-III1 receiving system 34. The Group III receiving system 34 is a typical Group-III facsimile system comprising a Group-III receiver 36, decoder and decompressor 38 and binary bit map 40, from which a facsimile hard copy such as plain paper copy 42 can be generated.

According to an embodiment, the above-described configuration is particularly well suited where near real time transmission is desired, for example when the system is operator controlled and a "real time" image is desired at a remote location. An example of such a system can be a photo identification confirmation of an apprehended suspect in law enforcement use, or transmission of images of damaged assets for insurance purposes, or transmission of images of construction job site conditions. This configuration is also well suited for use in those applications where a sensor activates the system and real time transmission of the sensed condition is desired. An example of such a system would be a motion activated camera in a surveillance location, where the image is immediately transmitted to a remote monitoring station. Of course, it will be readily understood by those who are skilled in the art that tagging a transmitted image with information such as, by way of example, date, time and location, can be incorporated in the transmitted signal so that a receiving station could monitor a plurality of remote image data capture systems. This is also useful for reviewing a body of previously stored or printed images to determine the time and location of such image.

Figure 2:
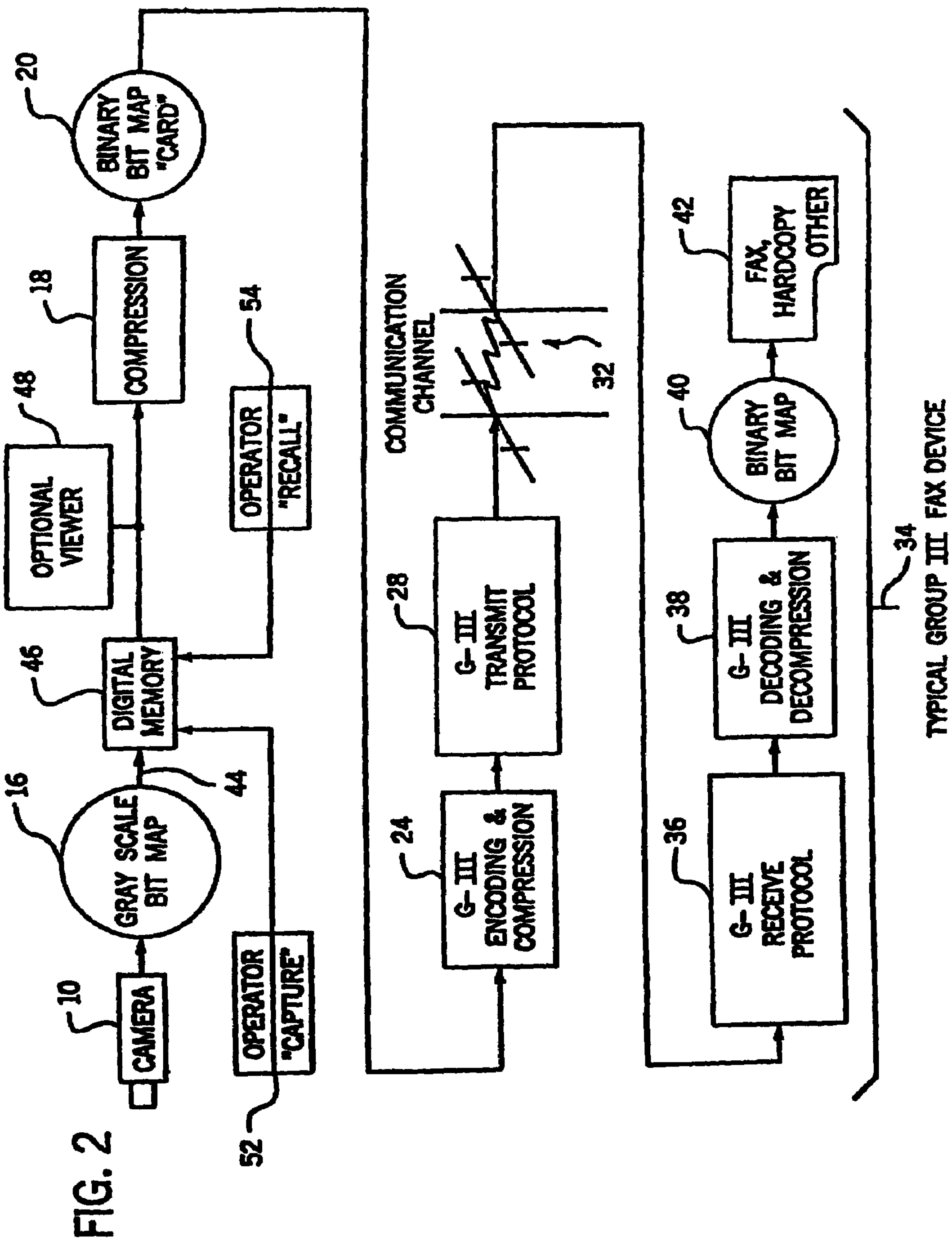
FIG. 2 is similar to FIG. 1, but incorporates a memory storage capability, permitting storage and optional review or viewing of the image prior to transmission.

The embodiment of FIG. 2 is similar to FIG. 1, but incorporates a memory and optional operator viewer system. The image is captured by the camera 10 and conditioned by the gray scale bit map 16, as in FIG. 1. In this embodiment, the output 44 of the bit map 16 is input into a standard digital memory device 46 for later recall. This configuration is particularly well suited for applications where near real time transmission of the image either is not required or is not desirable. It will be noted that with the exception of the insertion of the memory device 46 and the optional viewer device 48, the capture and transmission system of FIG. 2 is identical to that shown and described in FIG. 1. Once the image is captured by the camera 10 and is presented at 44 to the memory device 46, the image is stored for later recall and transmission. The specific type of memory device is optional and can include, for example, an SRAM device, a DRAM, Flash RAM, hard drive, floppy disk, PCMCIA format removable memory (see, for example, the PCMCIA card 50 in FIG. 7A), writeable optical media or other storage device. The memory can selectively capture images, as indicated by the operator interface/capture interface 52, or can be programmed to selectively capture periodic images or all images. In the embodiment shown in FIG. 2, an optional viewer device 48 is provided and permits the operator to recall and view all or selective images before transmission, as indicated by the operator interface/recall interface 54. The optional viewer device 48 permits the operator to review all images retained in the memory 46 and transmit selective images, as desired, to the Group-III transmission system. The remainder of the system of FIG. 2 operates in the same manner as the configuration shown and described in FIG. 1.

Figure 3:
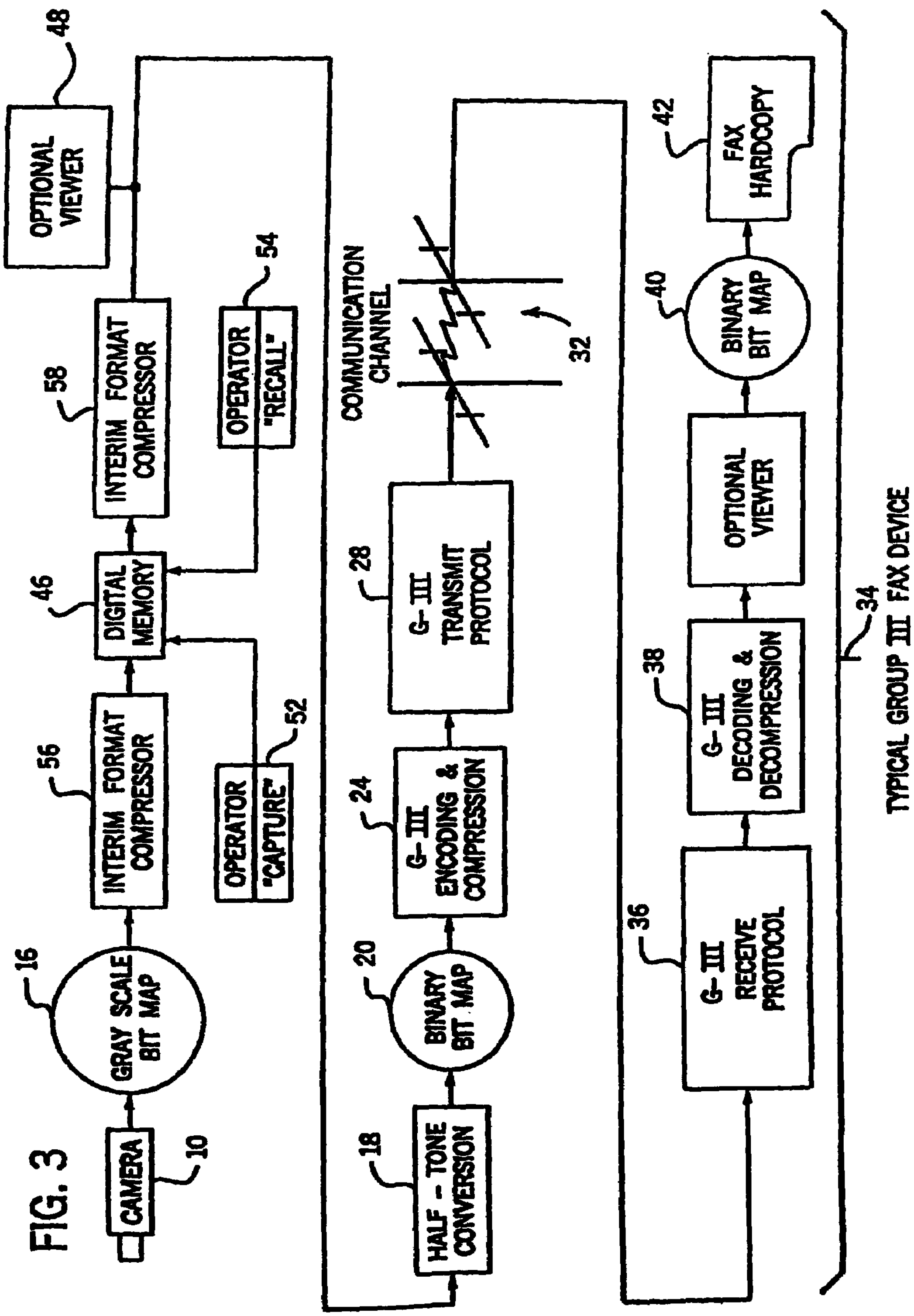
FIG. 3 is similar to FIGS. 1 and 2, but incorporates a data compression scheme for increasing the capacity of the memory and for increasing efficiency of transmission.

The configuration of FIG. 3 incorporates all of the features of FIGS. 1 and 2, and additionally, includes an interim data compression and decompression scheme to permit increased utilization of the memory or storage medium 46. As shown in FIG. 3, an interim format compressor 56 is inserted between the gray scale bit map 16 and the memory device 46. Insertion of the interim format compressor 56 between the gray scale bit map 16 and the memory device 46 permits compression and reduction of the data required to store the image, effectively increasing the capacity of the storage device or storage medium 46. Embodiments including the storage device or storage medium 46 can preserve the gray scale quality of the image for viewing at the location of capture. An interim format decompression device 58 is inserted between the output of the memory device or storage medium 46 and the rest of the system, whether the optional viewer 48 is utilized, or the output is entered directly into the half-tone convertor 18. The interim compression/decompression scheme is particularly useful when all of the image data is to be permanently archived, or when limited capacity portable media are used, such as, by way of example, floppy disks or a portable PCMCIA card. It will be noted that the remainder of the system shown in FIG. 3 is identical to the system shown and described in FIG. 2.

Figure 4:
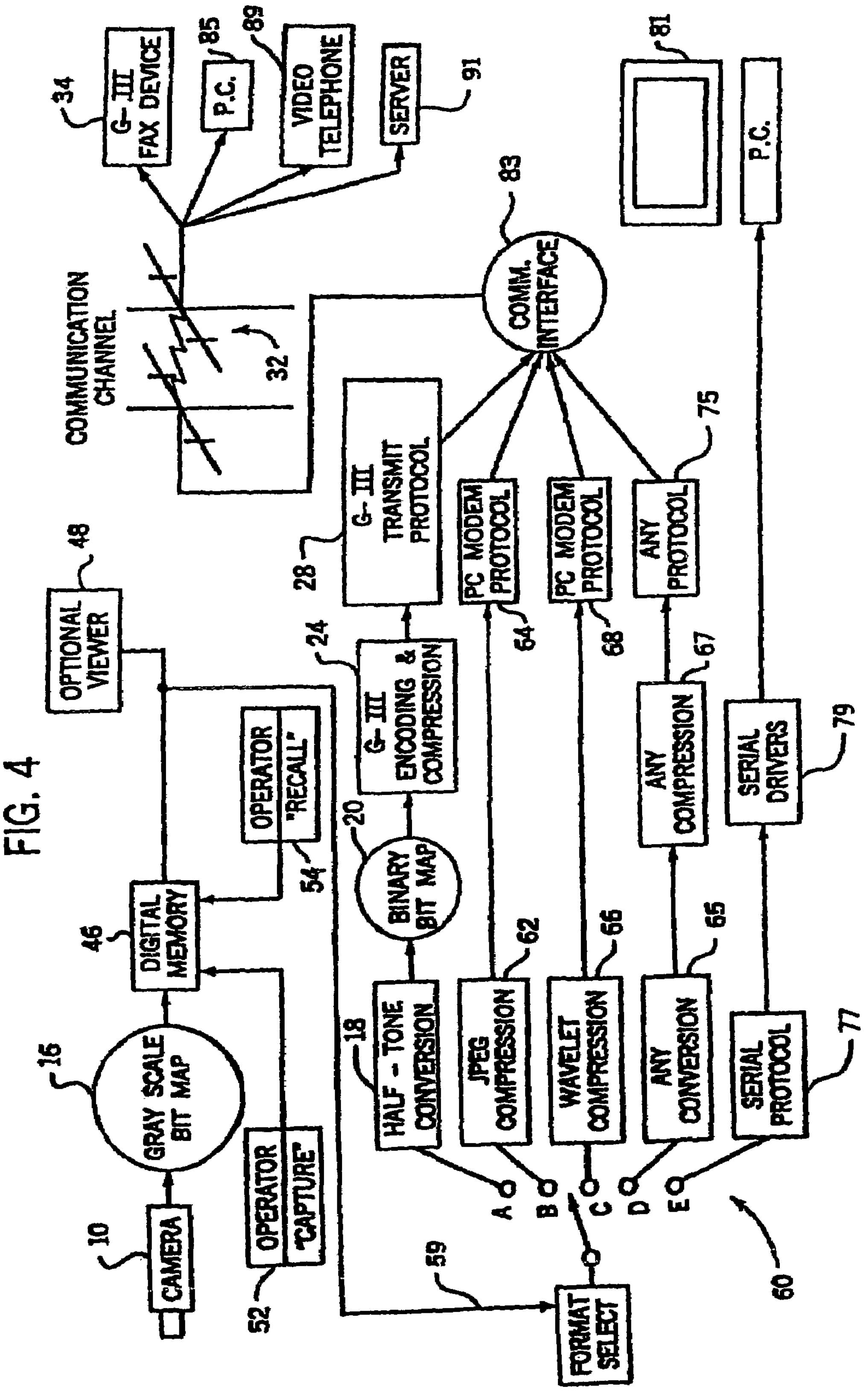
FIG. 4 includes the capture and transmission configuration of FIG. 2, with multiple transmission format capability including Group-III facsimile, personal computer, modem, parallel and serial transmission schemes.

FIG. 4 illustrates the use of the image capture and/or retention configured in any of the optional embodiments of FIGS. 1-3 and adapted for use in combination with any of a variety of transmitting and receiving schemes such as, by way of example, the Group-III system shown in FIGS. 1-3, a modem, direct connection to a personal computer, serial or parallel transmission, or any selected transmitting/receiving protocol. This illustration demonstrates the versatility of a system according to embodiments once the image has been captured, converted and conditioned by the image capture device of the disclosure. Specifically, once the image is captured by the camera 10 and conditioned by the gray scale bit map 16, it can be stored and transmitted, or transmitted "near real time" via any transmitting and receiving scheme. As shown in FIG. 4 the image capture device includes the memory device 46 and the optional viewer 48 for incorporating maximum capability. However, any of the schemes of FIGS. 1-3 would be suitable for producing a transmittable signal. In the embodiment shown, a format select interface switch 60 is positioned to receive the fully conditioned signal on line 59. The format select interface switch 60 can permit either automated or manual selection of the transmitting protocol, including the Group-III facsimile system previously described in connection with FIGS. 1-3, as indicated by selecting format select switch 60 position A; or PC modem protocol as illustrated by the JPEG compressor 62 and protocol generator 64, as indicated by selecting format select switch position B; or the wavelet compressor and PC modem protocol, as illustrated by the wavelet compressor 66 and PC modem protocol generator 68 by selecting switch position C; or any selected conversion network 65, (if needed) with a compatible compressor 67 (if needed) and compatible protocol generator 75 (if needed), as indicated by switch position D; or a serial protocol scheme 77, with serial drivers 79 directly to a hardwired personal computer 81 by selecting switch position E. Of course, it will be readily understood by those skilled in the art that one or a plurality of transmitting protocols can be simultaneously selected. Depending on the protocol selected, the signal output is generated at the selected output module and introduced to a communications interface module 83 via a modem or other device, as needed, for transmission via a transmission system to a compatible receiving station such as the Group-III facsimile device 34, the personal computer 85, the video telephone 89, and/or other server or receiving device 91 for distribution.

Figure 5:
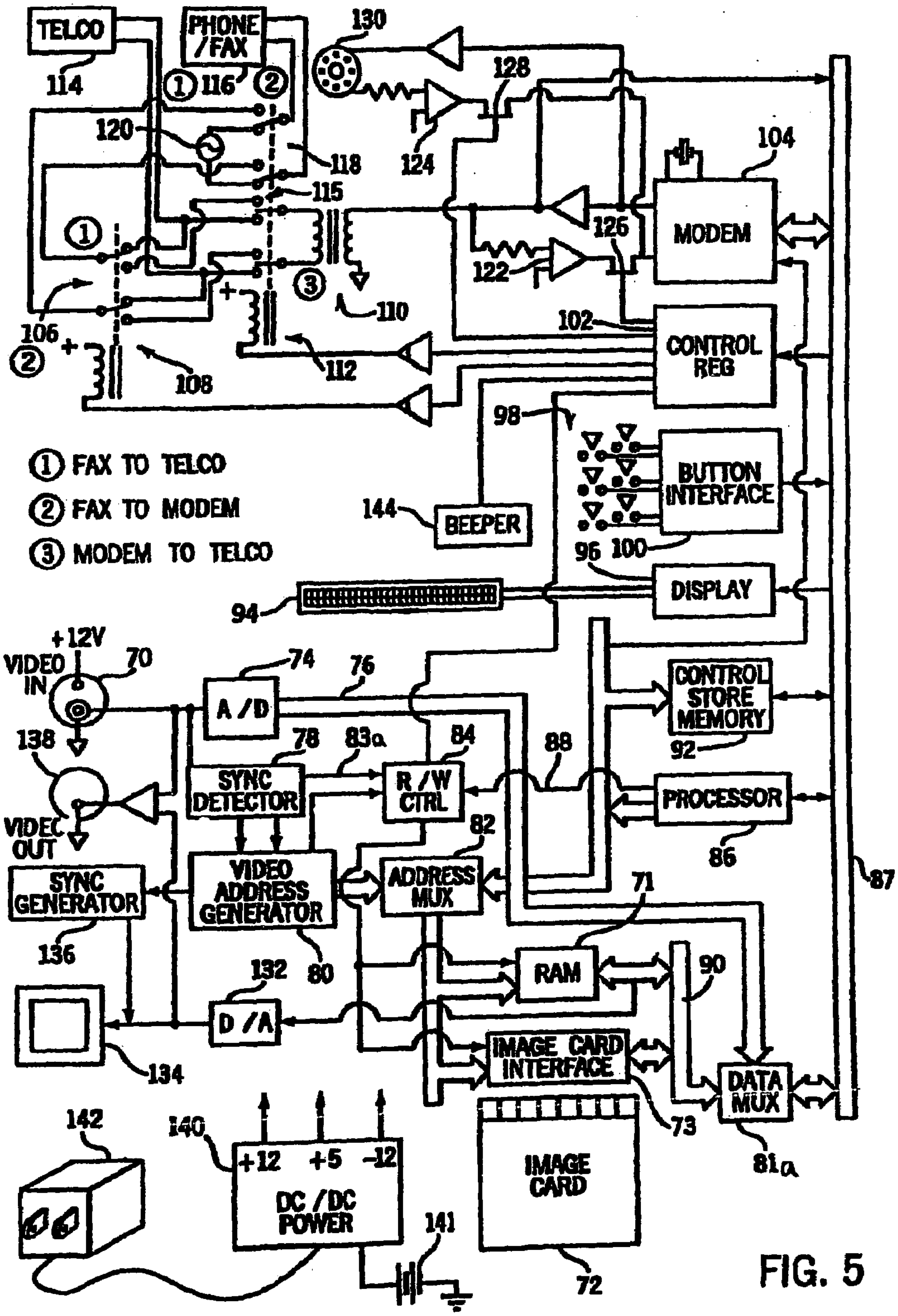
FIG. 5 is an exemplary schematic diagram supporting the configurations shown in each of FIGS. 1-4.

According to embodiments, an exemplary circuit supporting the configurations of FIGS. 1-4 is shown in FIG. 5. With specific reference to FIG. 5, an analog camera is indicated by the "video in" signal at 70. Typically, the video signal is a composite video/sync signal. The diagram shows all of the signal processing necessary to sync up to an NTSC signal 70 coming out of the analog camera and processed for introduction into an integral RAM memory 71 and/or a portable RAM memory via interface 73. An analog to digital (A/D) converter 74 converts the video portion of the analog signal from the camera and produces the digital signal for output at line 76. The digital output data on path 76 is introduced into a data multiplexer circuit 81 and into the RAM memory unit(s) 71, 72. In the exemplary embodiment, the portable RAM memory 72 is an image card such as, by way of example, a PCMCIA SRAM card or a PCMCIA Flash RAM card. However, it will be readily understood that any suitable RAM memory configuration can be used within the teachings of the disclosure. In an embodiment, it is desirable to store compressed rather than raw data in portable memory card 72 because of space and transmission speed factors.

As the signal at 70 is introduced into the circuit, the sync detector 78 strips the sync signal portion off of the video signal. The sync signal drives the video address generator 80 for providing a signal used to generate an address signal at the address multiplexer circuit 82 for synchronizing the scanned in video signal with the locations in RAM to define each frame to be captured. The read/write control 84 controls the coordination of the sync signal 93 with the video signal to define a full frame. Basically, when the camera is activated either by the operator or by automation, the system processor 86 detects the initiation of the camera and capture sequence and sends a signal via line 88 to the read/write control 84. The read/write control then monitors the incoming video signal 83*a* to find the horizontal and vertical sync pulse to identify the beginning of a frame. The read/write control then initiates writing to memory at the RAM devices to initiate capture of the frame. The read/write control continues to "write" to memory until the appropriate sync signal is received, indicating the end of the frame. At this point a single frame is captured in RAM 71 and/or on the portable medium RAM 72.

This frame can now be output from the system via any of the available transmitting schemes. In the exemplary embodiment, the processor 86 can be any processor or such as a microprocessor or DSP, with sufficient capability to perform the described functions. The processor bus is indicated at 87. The circuitry supporting the processor comprises the processor chip 86 and the control store memory (ROM, Flash RAM, PROM, EPROM or the like) 92 for storing the software program executed by the processor. It will be understood that other memory devices can be utilized without departing from the the disclosure. For example, a Flash RAM can permit flexibility and replacement of the program for upgrades and enhancements. The user interface commands are generated and interpreted by the software that is being executed by the processor 86.

The display unit 96 is connected through a typical interface 94, and provides a visual user interface at the camera body to give the operator a visual read-out of the status of the collection and transmission of a selected frame. In an exemplary embodiment, the display unit is a two line, multi-character LCD display, but other sizes or technology displays could be readily incorporated, depending, for example, on the amount of graphics desired in the display module. The bank of operator buttons and/or switches 98 are connected to the system through the button interface 100.

The general purpose control register 102 serves as a latch and permits control bits to be introduced from the processor 86 to the transmitting systems or to transfer status bits from the transmitting systems back to the processor in the well known manner. The modem 104 may be any of a variety of widely available modems or modem chip sets currently in commercial use. The modem should support CCITT Group III fax format for transmission to Group III fax machines. Once the signal is introduced into the modem 104, it is handled in typical fashion to provide input/output transmissions: (1) from the subject device to a hardwired telephonic line as indicated at 114, (2) from the subject device to the external facsimile machine as indicated at 116, or (3) from the subject device to an external wireless device telephone as indicated at 130. The specific selection is controlled by the user at button module 98 in conjunction with the processor 86.

An isolation transformer 110 is provided to isolate the circuitry connected to external communications circuit from the circuitry of the subject device. The relays at 108 and 112 permit patching directly into the hardwired telephonic line and to the telephone company system as indicated at 114, to an external handset or fax machine at 116, or to the modem 104, whereby facsimile data can be sent and received via the modem. These relays could be mechanical or solid state. The relay 118 is connected to a tone source 120 for providing an audible tone signaling to the user that the system is being used for transmitting or receiving a captured image.

With specific reference to the circuitry associated with relay 112, it will be noted that when the handset is switched away from the phone line to the tone source, the modem transformer 110 is switched to the telephone line 114. This blocks normal audio telephone service and permits the transmission of an image signal from the RAM devices 71 or 72, through the modem 104, and to the telephone line 114.

In the exemplary embodiment, a stand alone facsimile machine can be connected through the external handset jack at 116. With relay 112 set to activate telephone service and the tone generator 120 disconnected, the relay 108 can be set in either of two positions. The first position, as drawn, connects the facsimile machine at jack 116 to the telephone line, permitting standard facsimile transmission. The second or alternative position permits the modem 104 to transmit the image data signal directly to the facsimile machine at jack 116, for providing an archive copy or the like. In this configuration, the facsimile machine will operate as a local printer for printing the captured images. Signal source 120 may be used as a ringing voltage generator for signaling such facsimile machine prior to connection.

A system of the present disclosure also contemplates wireless transmission over a cellular telephone, radio frequency, satellite transmission or the like. In an exemplary embodiment, the specific configuration for a cellular telephone interface is shown in detail. The amplifiers 122, 124 amplify the input of the modem 104 and are controlled by the FETs 126, 128, respectively. The FETs are controlled by the control register 102 and allow selection of the audio either coming in from the cellular interface 130 or from the telephone line 104 to the modem. This permits the cellular phone to be used for three distinct functions: (1) as an audio telephone, (2) as a transmitting system for transmitting the captured image and related signals via a cellular system, and (3) for receiving incoming transmissions to the processor such as remote control, remote configuration, or images.

In the exemplary embodiment, the image card 72 is a DRAM card or non volatile storage card such as a Flash RAM or the like and provides a removable medium for storing the image data as either raw or compressed data. The card can also be used to store compressed data sent into the system via external facsimile transmission. As illustrated, the system is capable of both sending and receiving image data via Group-III fax or other protocol. By incorporating the digital to analog (D/A) converter into the system and pulling the signal from the RAM 71 (or portable RAM 72), the signal can be displayed right at the camera viewfinder 134 or other display device connected at port 138. A sync generator 136 is incorporated to provide synchronization of incoming data in the same manner. The sync detector 78 is utilized to define a frame-by-frame correlation of the data generated by the camera at the video input 70 for storage to memory 71 or 72.

Any standard power source may be utilized, including replaceable or rechargeable batteries 141, or an AC adapter 142. The AC adapter is particularly suitable for desktop applications.

The exemplary embodiment includes a speaker or other audio transducer 144 for emitting a detectable signal whenever the user interface merits its use, such as user induced errors, system errors, user attention getting and the like.

In order to send a facsimile transmission over a typical Group-III Facsimile system, the multiplexer 82 is switched to the processor 86 such that the RAM address is generated by the processor 82 instead of the video address generator signal. In the facsimile transmitting mode, the processor accesses the RAM and manipulates the data representing each frame image. For example, the processor will perform the gray scale to halftone conversions described in connection with FIGS. 1-4 to prepare the signal for facsimile transmission. The processor can also perform image compression and output the image as a gray scale. In the facsimile transmission mode, once the half tone conversion is completed, the processor executes a code for performing a bi-level compression of the data and the signal representing the frame data is output over line 90, through the multiplexer 81*a* and over the processor bus 87 to the processor 86, then to modem 104 for transmission. Other memory and processor configurations could be used without departing from the scope and spirit of the invention, as will be recognized by those skilled in the art.

Figure 6A:
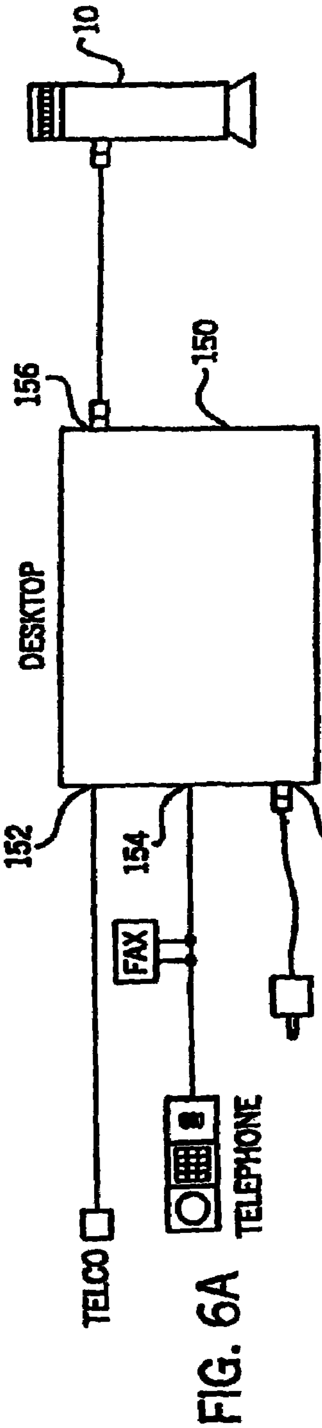
FIGS. 6A, 6B, and 6C, are block diagrams of the physical components of desktop, portable and comprehensive console embodiments of the invention, respectively.
Figure 6B:
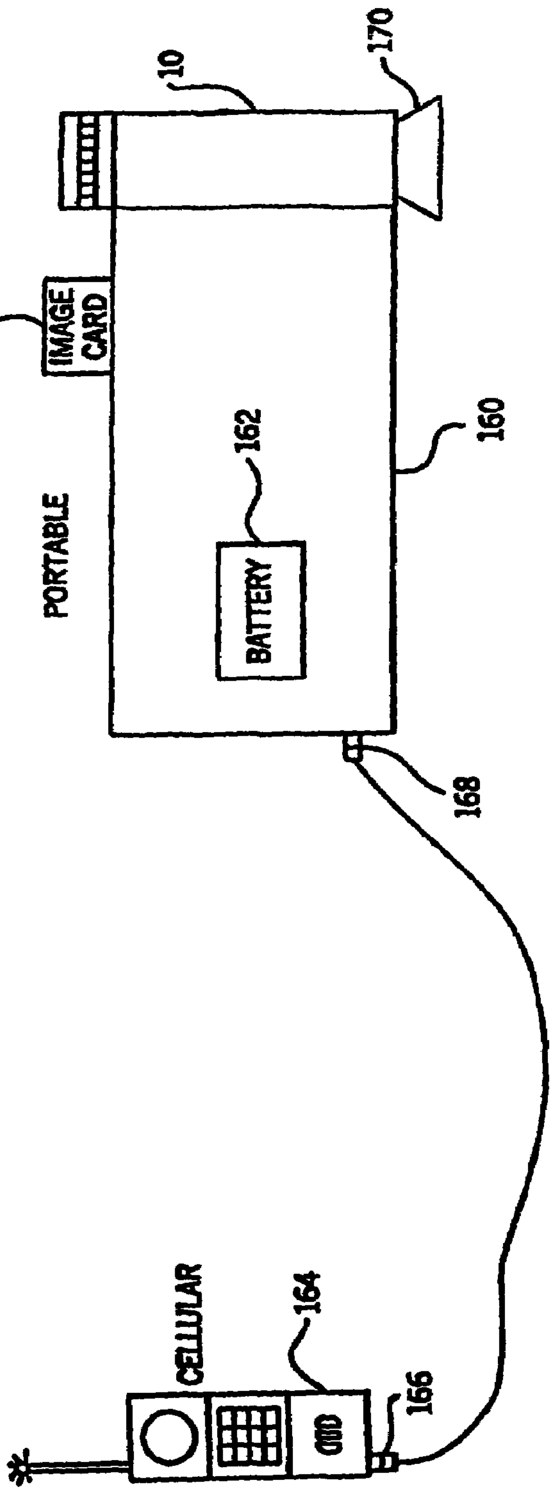
Figure 6C:
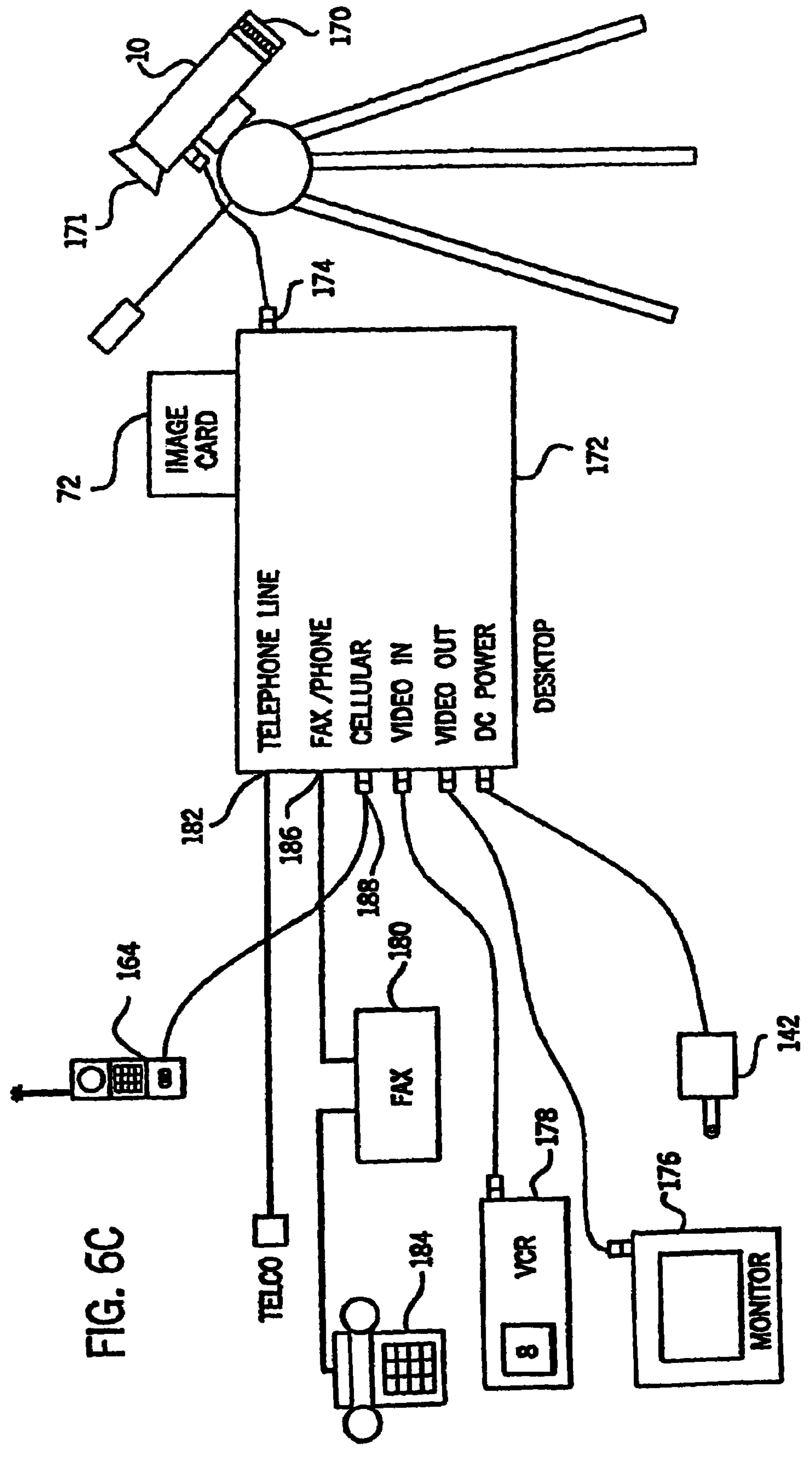
Figure 7A:
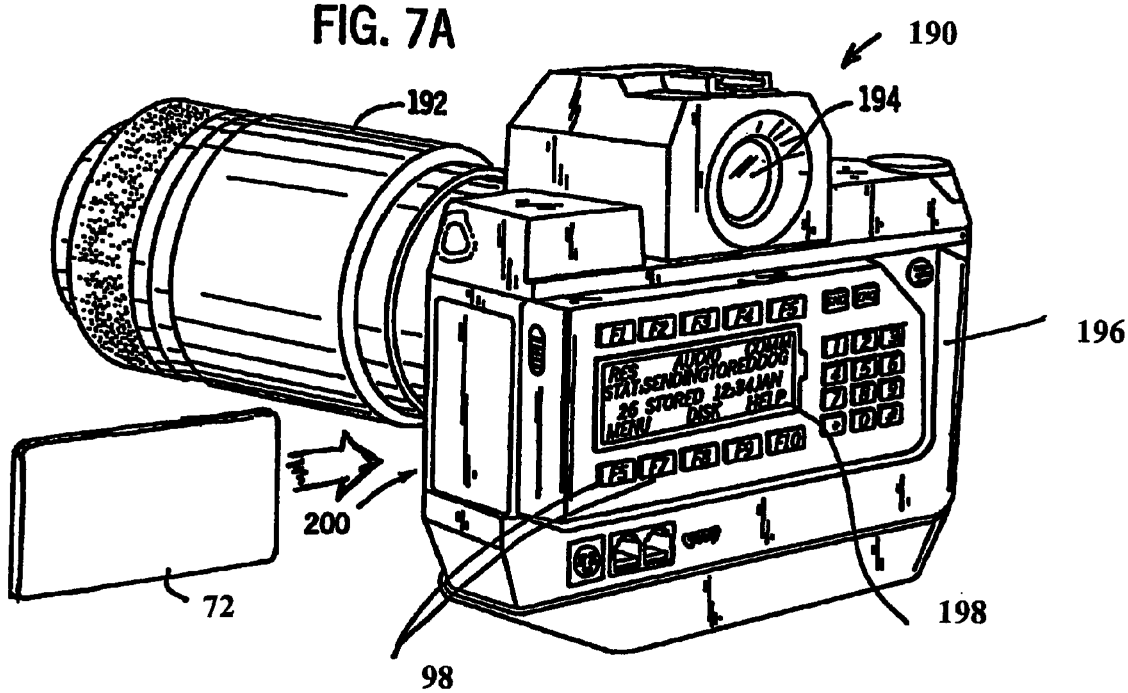
FIG. 7A and 7B are perspective drawings of a hand held device for capturing, storing and transmitting an image in accordance with the invention.
Figure 7B:
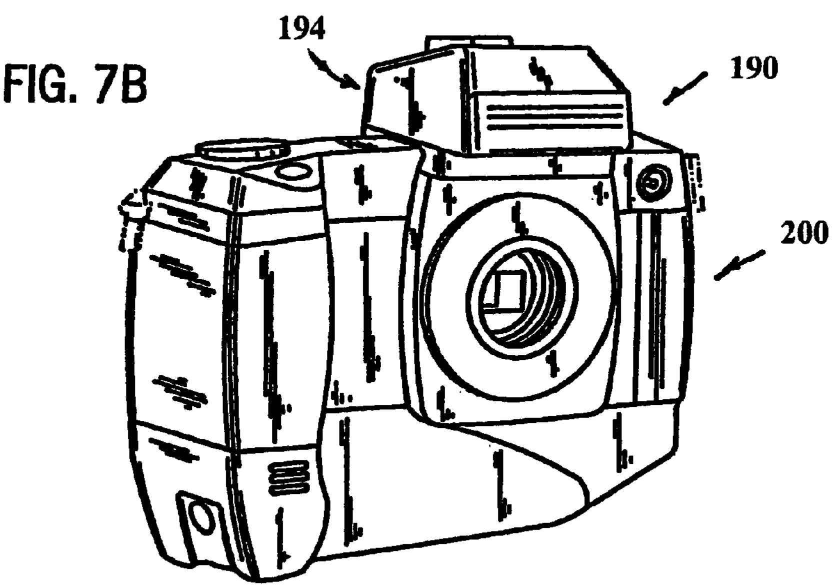

Various physical configurations of embodiments are shown in FIGS. 7A & 7B. FIGS. 6A, 6B and 6C are block diagrams for desktop and portable units. FIGS. 7A and 7B illustrate embodiments as incorporated in a standard 35 millimeter type camera housing.

A basic desktop system according to embodiments is shown in FIG. 6A, and includes a console unit having a telephone jack 152, an external telephone connection 154 and a video input/camera power jack 156 for connecting the analog camera 10. A facsimile machine can also be connected at jack 154 to provide local printer capability. The configuration shown in FIG. 6B is a basic portable system, with a battery powered portable module 160 having a self-contained power source 162. The system can include an integral RAM and/or the removable memory module as indicated by the image card 72. The camera 10 can be an integral feature of the portable module 160, or can be a detached unit, as desired. In the illustrated embodiment, a cellular telephone 164 is provided with a data jack 166 for connecting to the output jack 168 of the module, whereby the image data signal can be transmitted via the cellular telephone to a remote facsimile machine over standard cellular and telephone company facilities. When incorporating the circuitry of FIG. 5, the cellular phone can be used as both an input and an output device, and incoming data or stored images can be viewed through the viewfinder 170.

FIG. 6C shows a comprehensive desk or stationary configuration incorporating all of the features supported by the circuitry of FIG. 5. As there shown, the control module 172 is adapted for receiving the image card 72 and is powered by an AC power adapter as indicated at 142. The camera 10 is connected to the module via a hardwired connection at jack 174. A monitor 176 is provided for viewing data images. A video cassette recorder 178 is provided and may be used as an auxiliary input device for the images transmitted from the system. The facsimile machine 180 can be used as a local printer, or can be used to send facsimiles transmissions in the well-known manner. Direct connections to the telephone line system are provided at jack 182. The FAX/phone jack 186 can be connected to a facsimile machine 180 and/or a standard telephone 184, where the public telephone system can be accessed. A data jack 188 is used to connect to a cellular telephone or the cellular modem, or other wireless device for transmission or reception of image data.

According to an embodiment illustrated in FIGS. 7A and 7B, the camera body 190 is similar to a standard 35 millimeter camera housing and is adapted to receive a standard lens 192 with a viewfinder 194. The electronics are housed in the casing in the area normally occupied by the film and film advancing implements. The operator interface button keys 98 are housed within the housing and can be positioned on the back plate 196 of the body. The LCD unit can be positioned to be visible through the viewfinder 194 or can be in a separate back window 198. The memory card 72 is positioned in a slot 200 provided in a sidewall of the camera body. In the illustrated embodiment, camera body 190 has the appearance of a standard SLR 35 millimeter camera. In addition, where desired, an integral cellular phone can be incorporated in the camera housing and transmission can be sent directly from the camera housing to a remote receiving station. The keypad for the telephone is indicated at 202.

Figures 1, 8A:
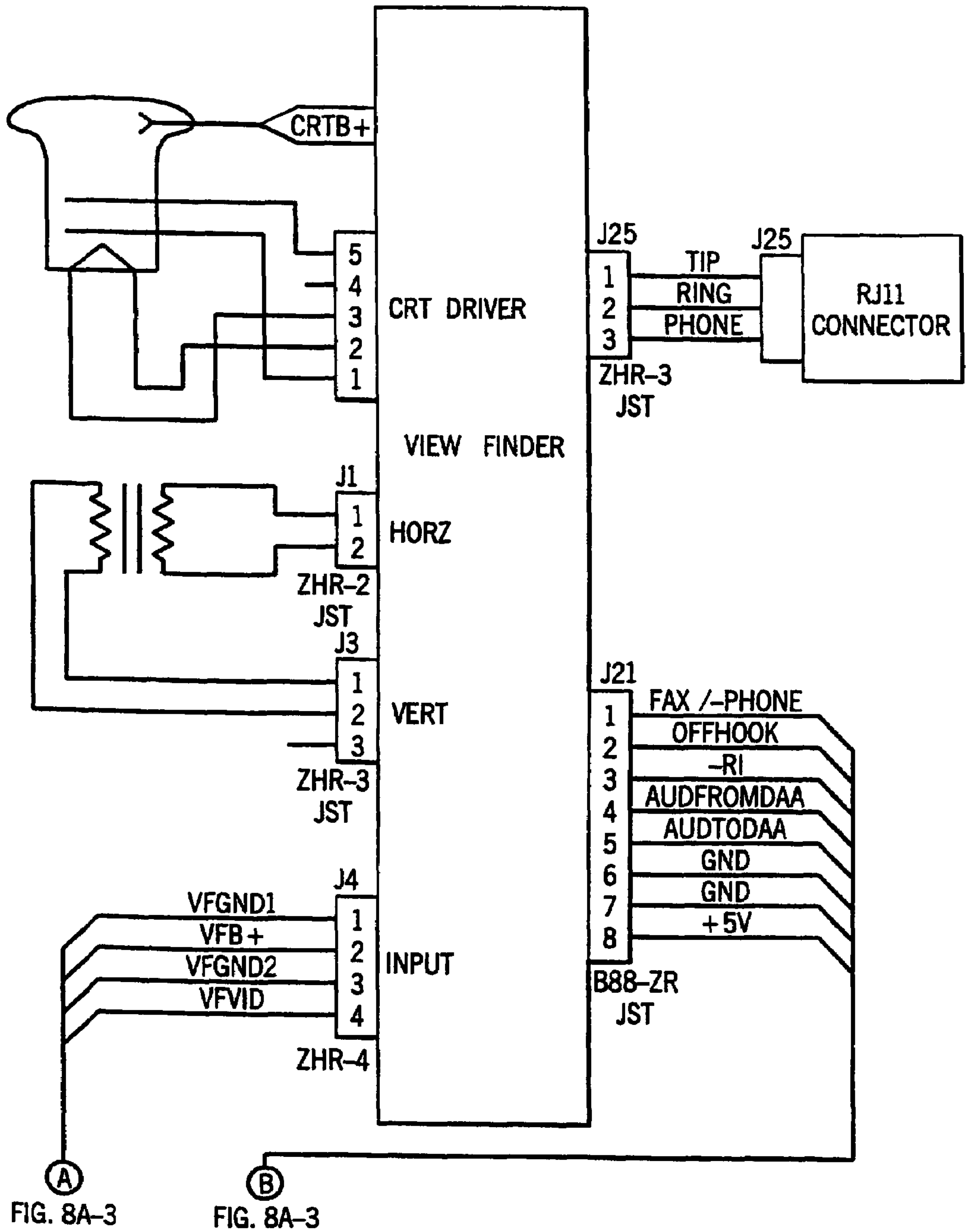
Figures 2, 3, 8A:
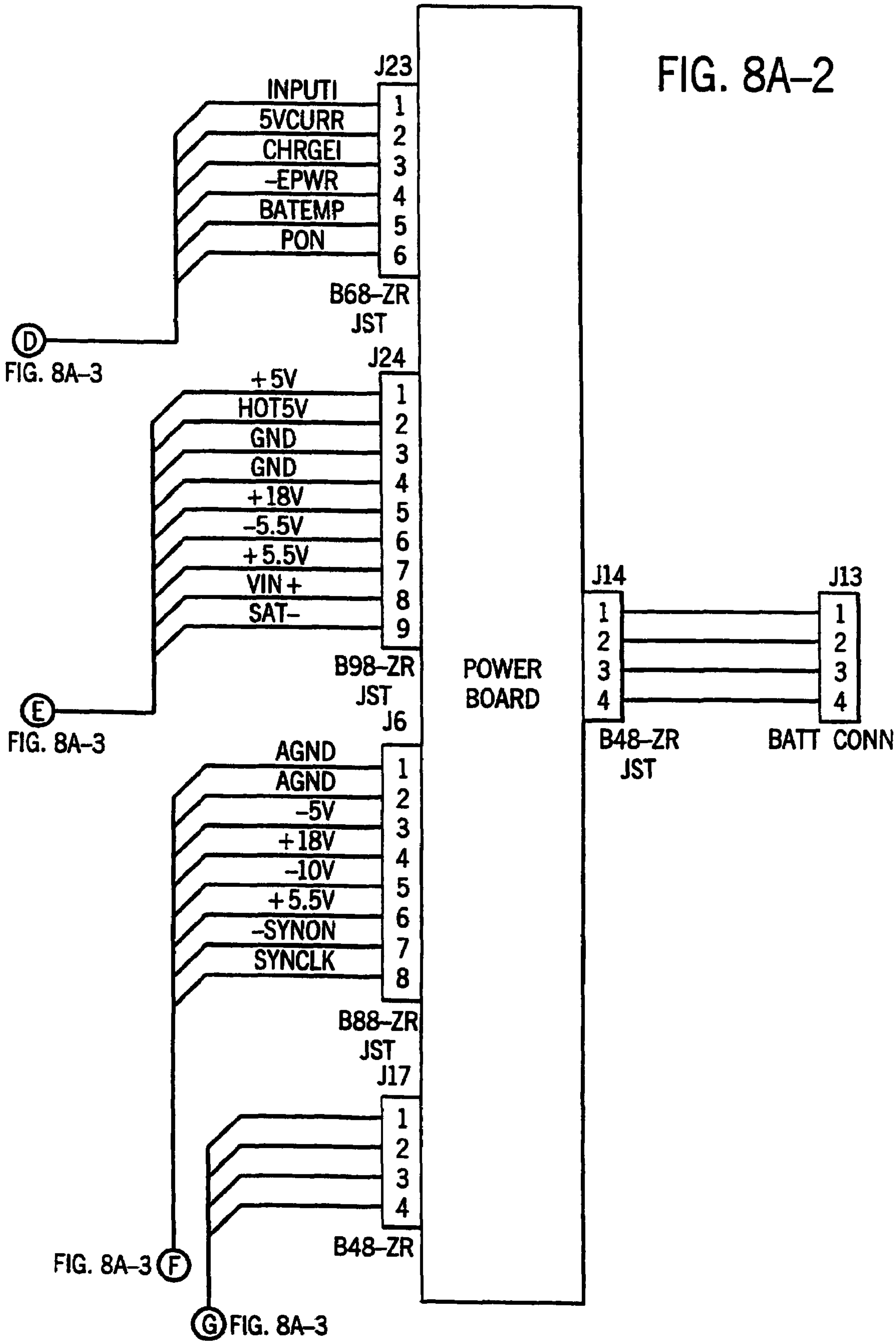
Figures 3, 8A:
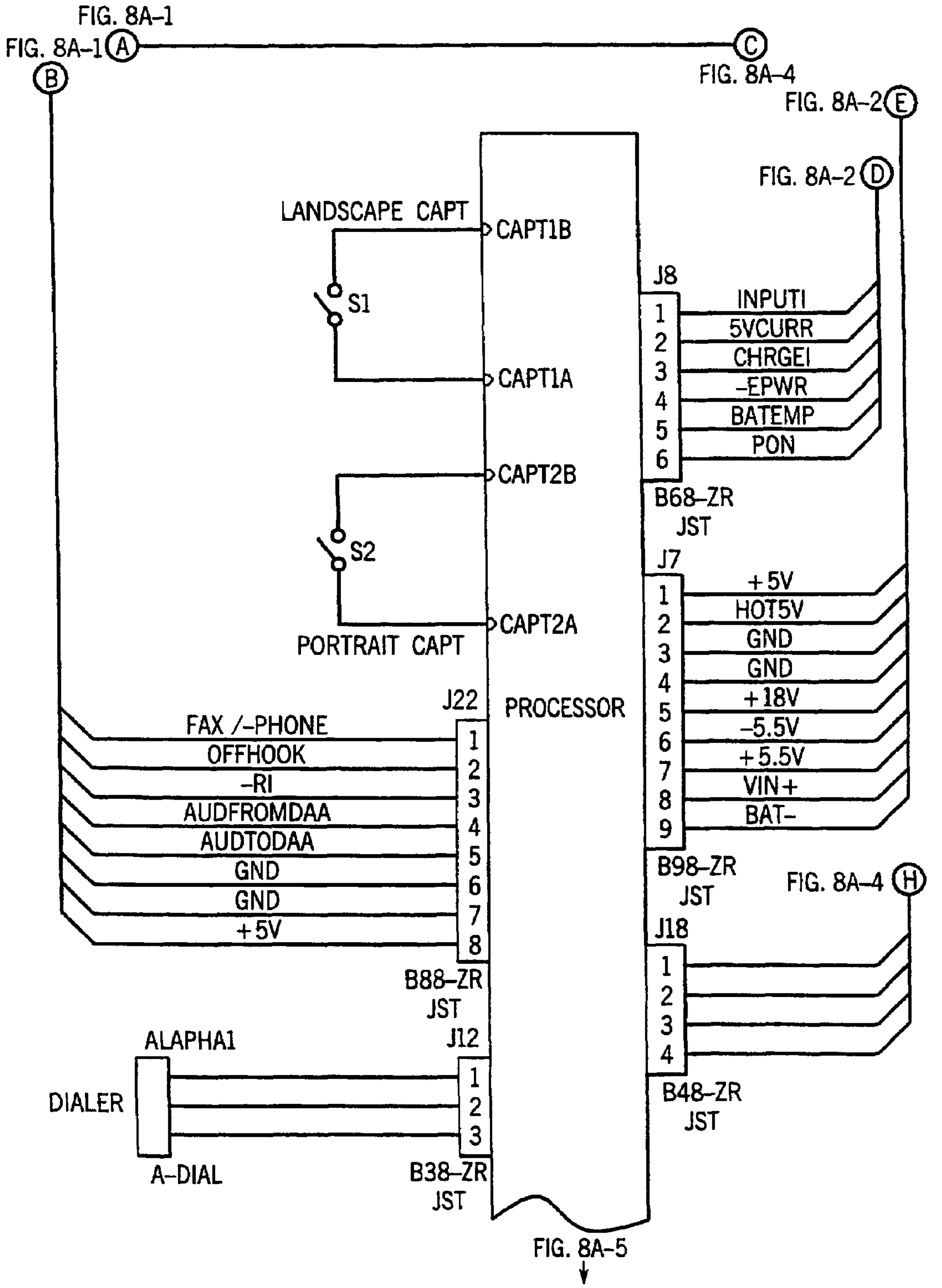
Figures 4, 8A:
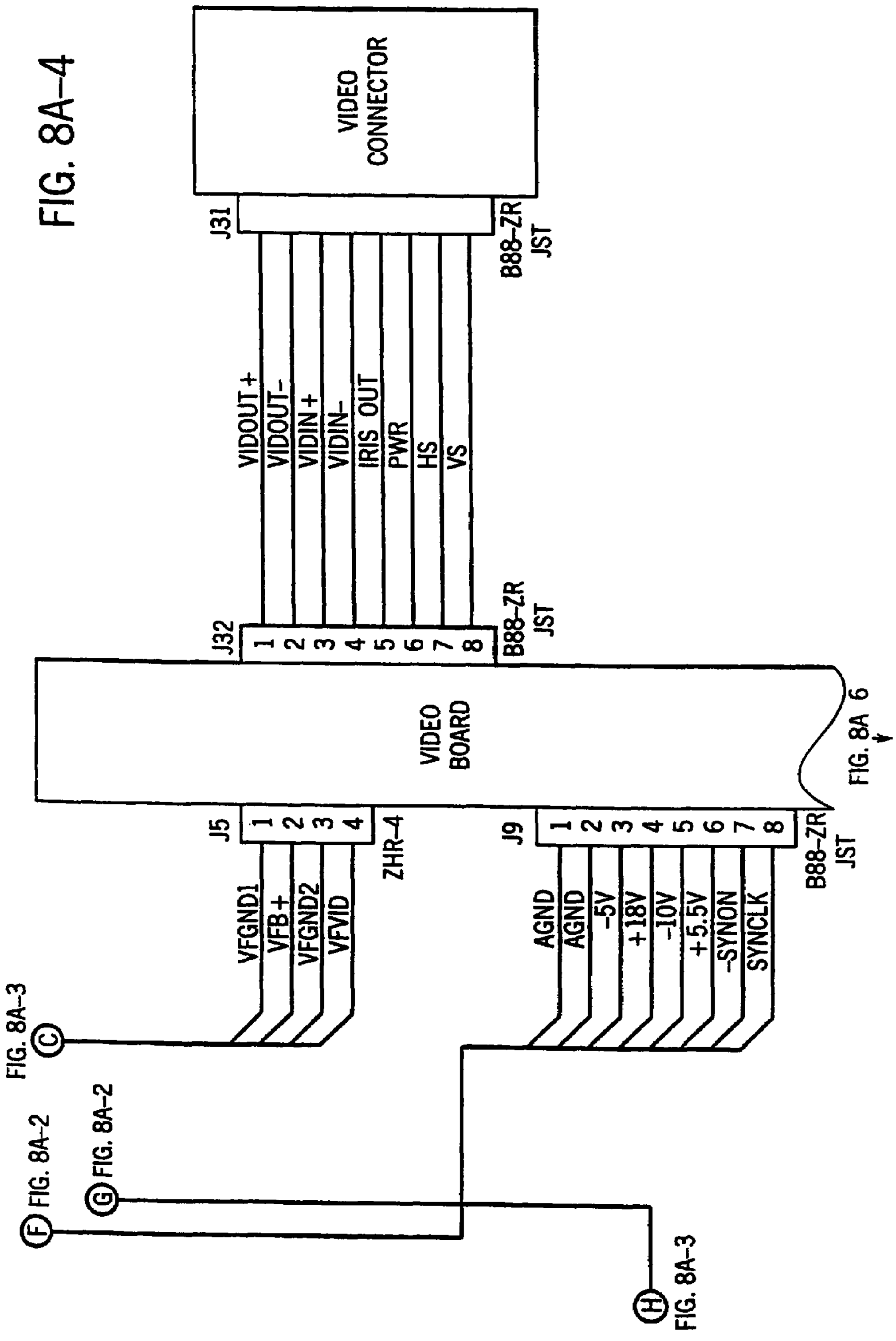
Figures 5, 8A:
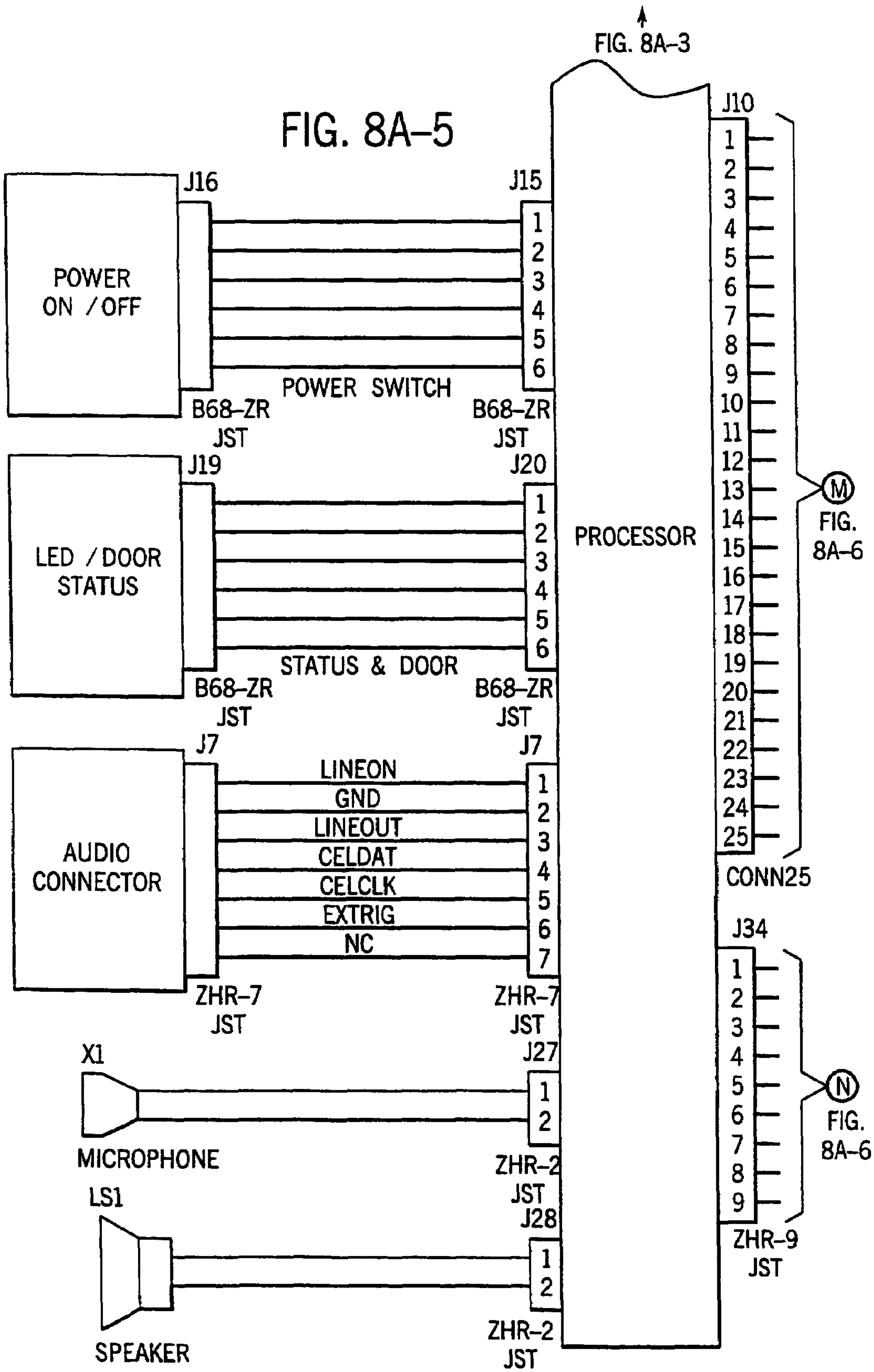
Figures 6, 8A:
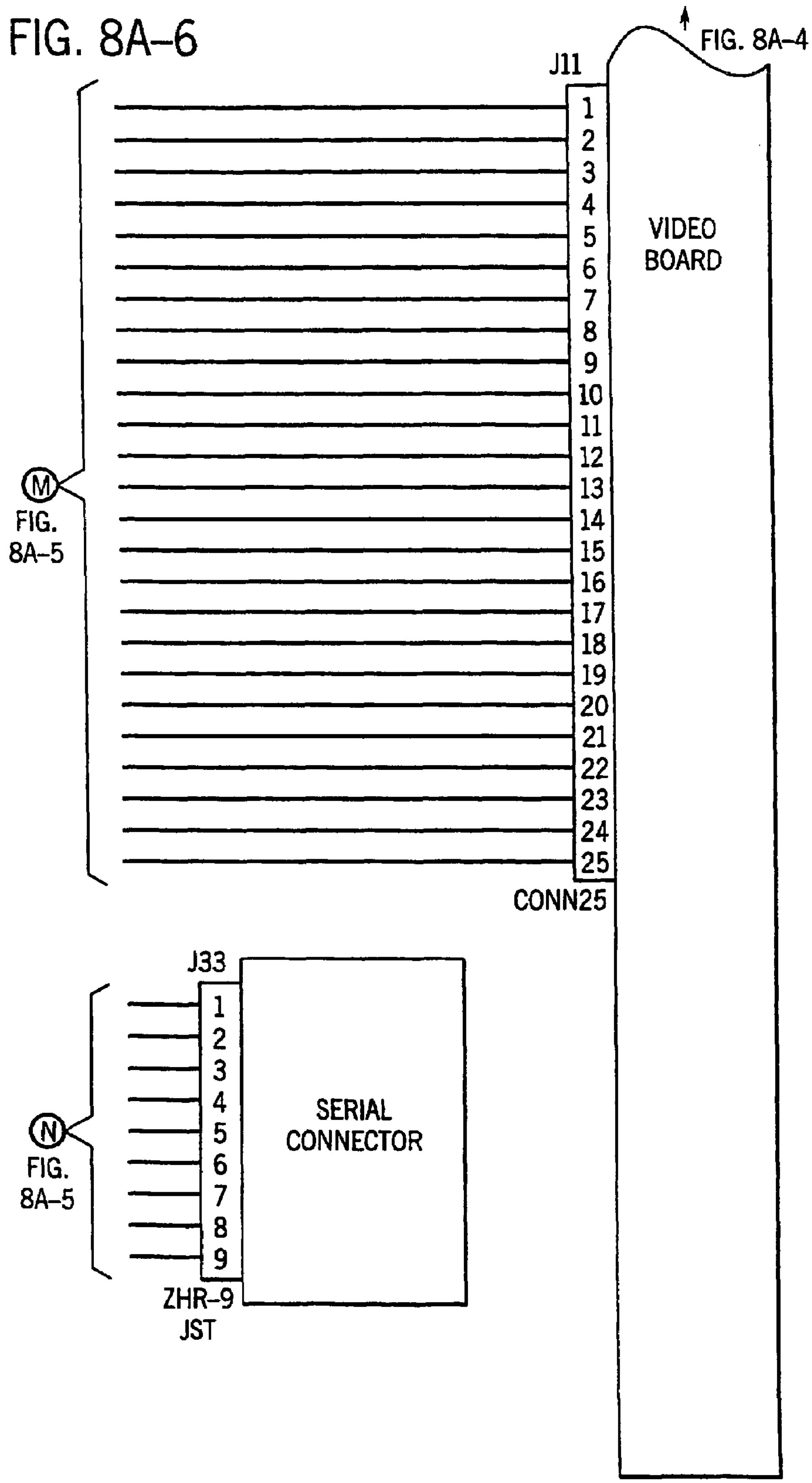
Figures 1, 8B:
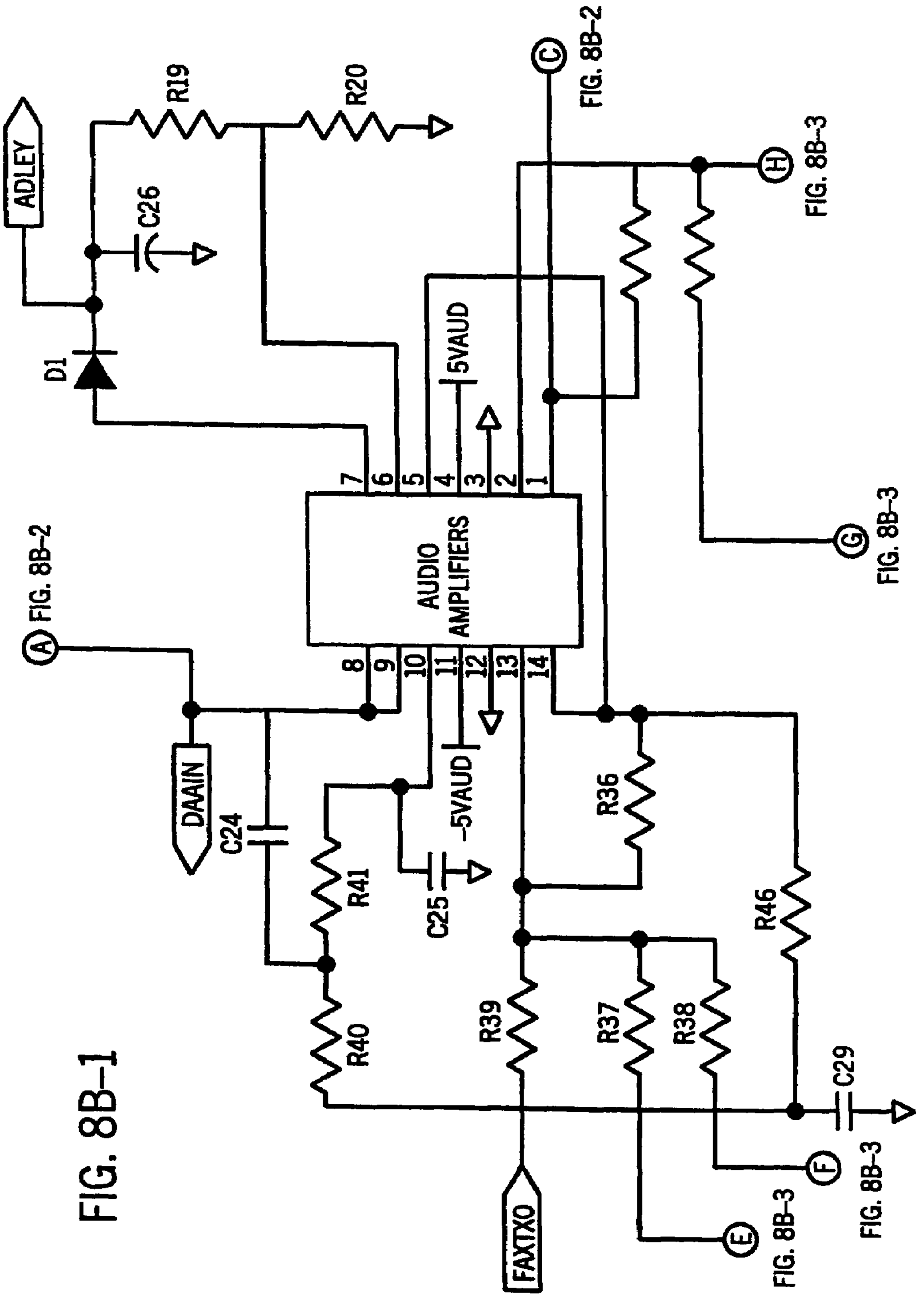
Figures 2, 8B:
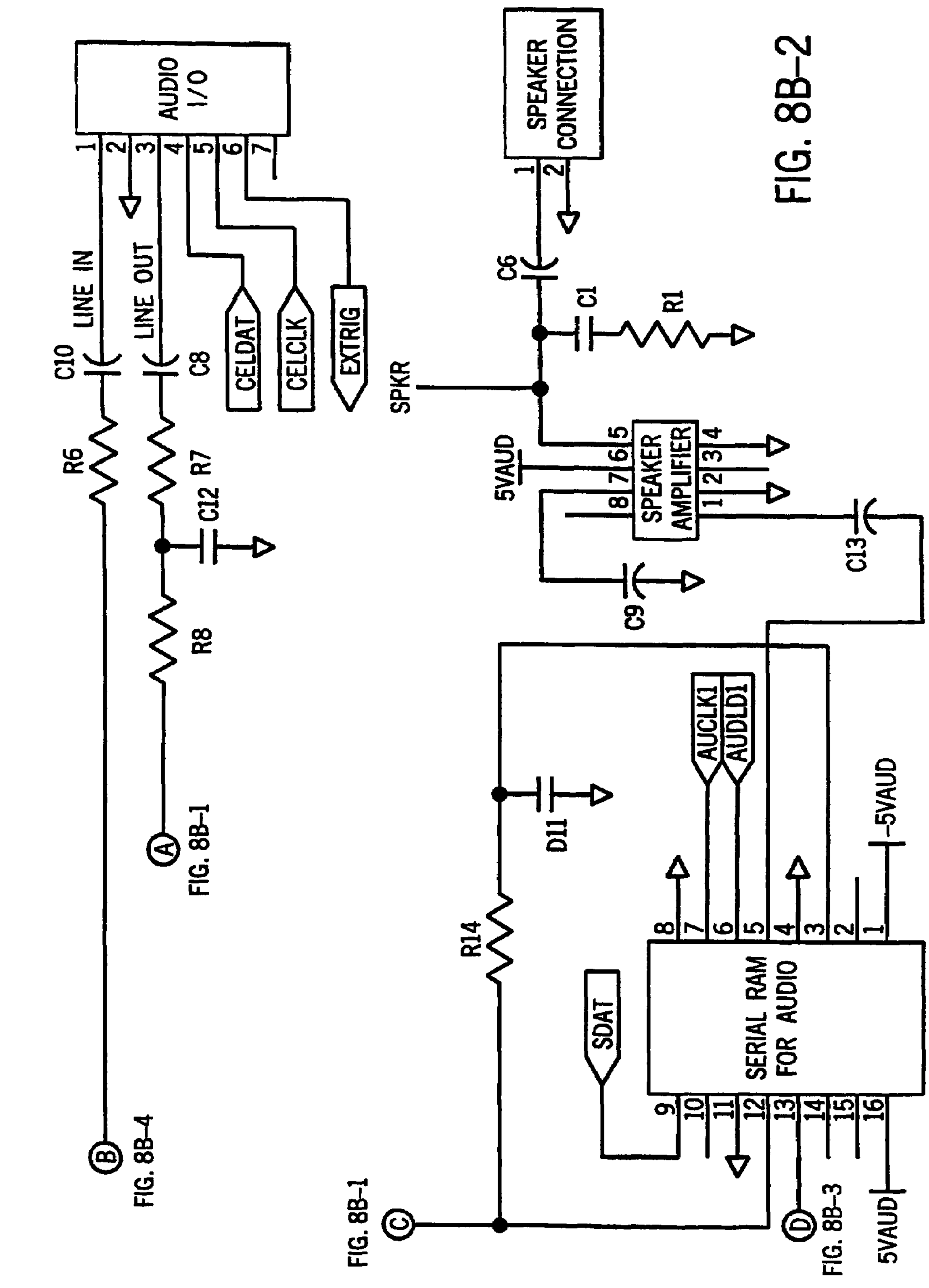
Figures 3, 8B:
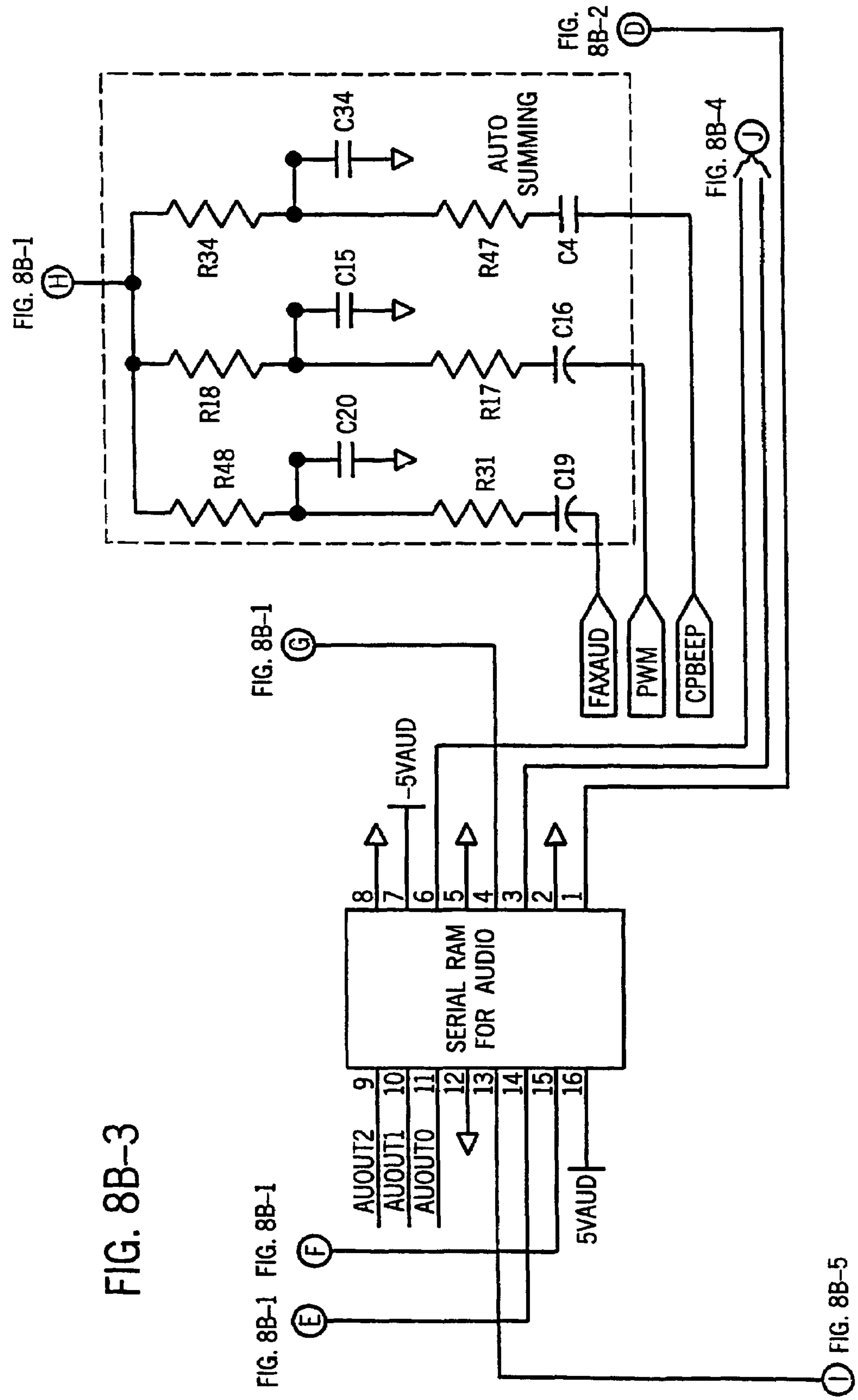
Figures 4, 8B:
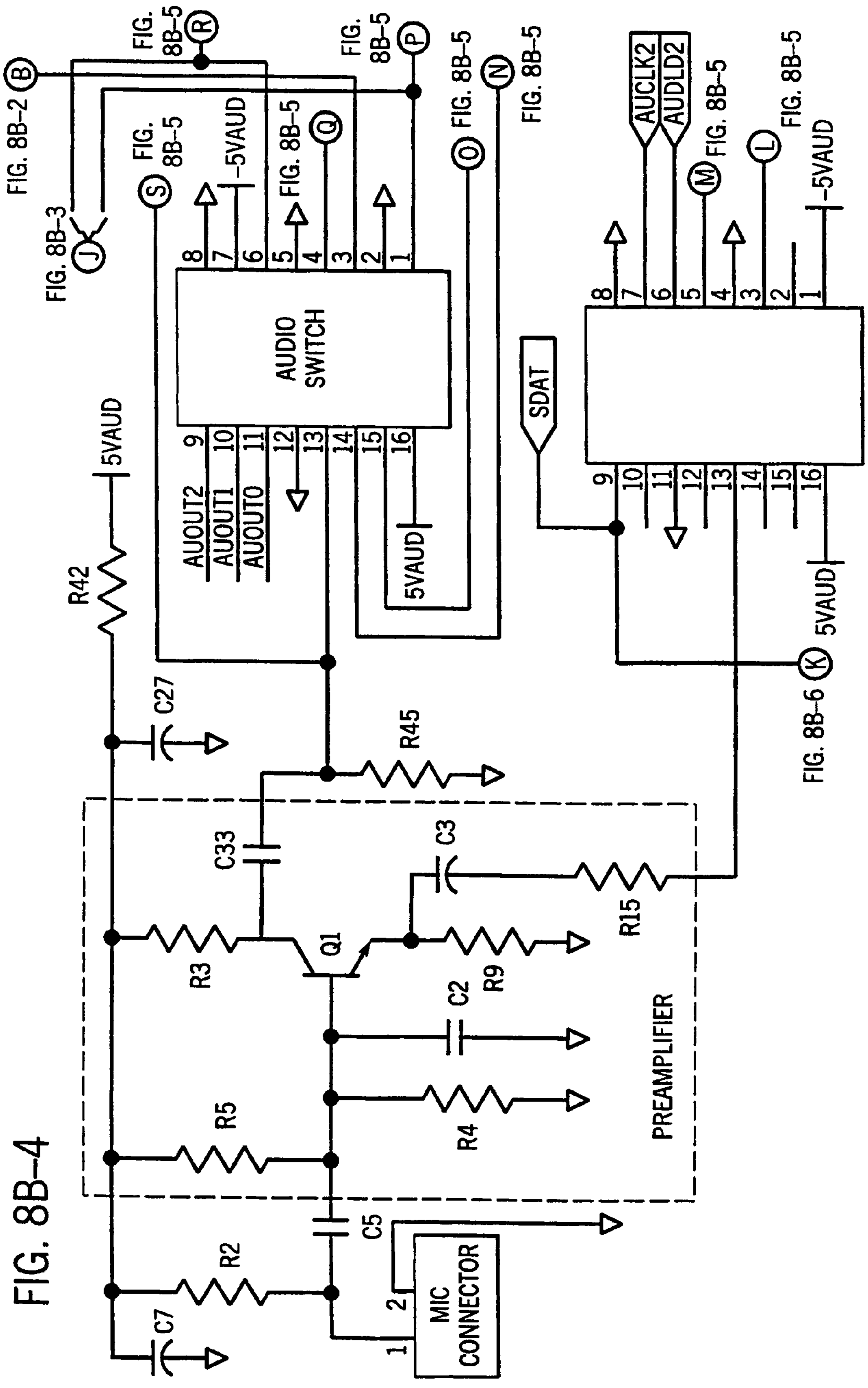
Figures 5, 8B:
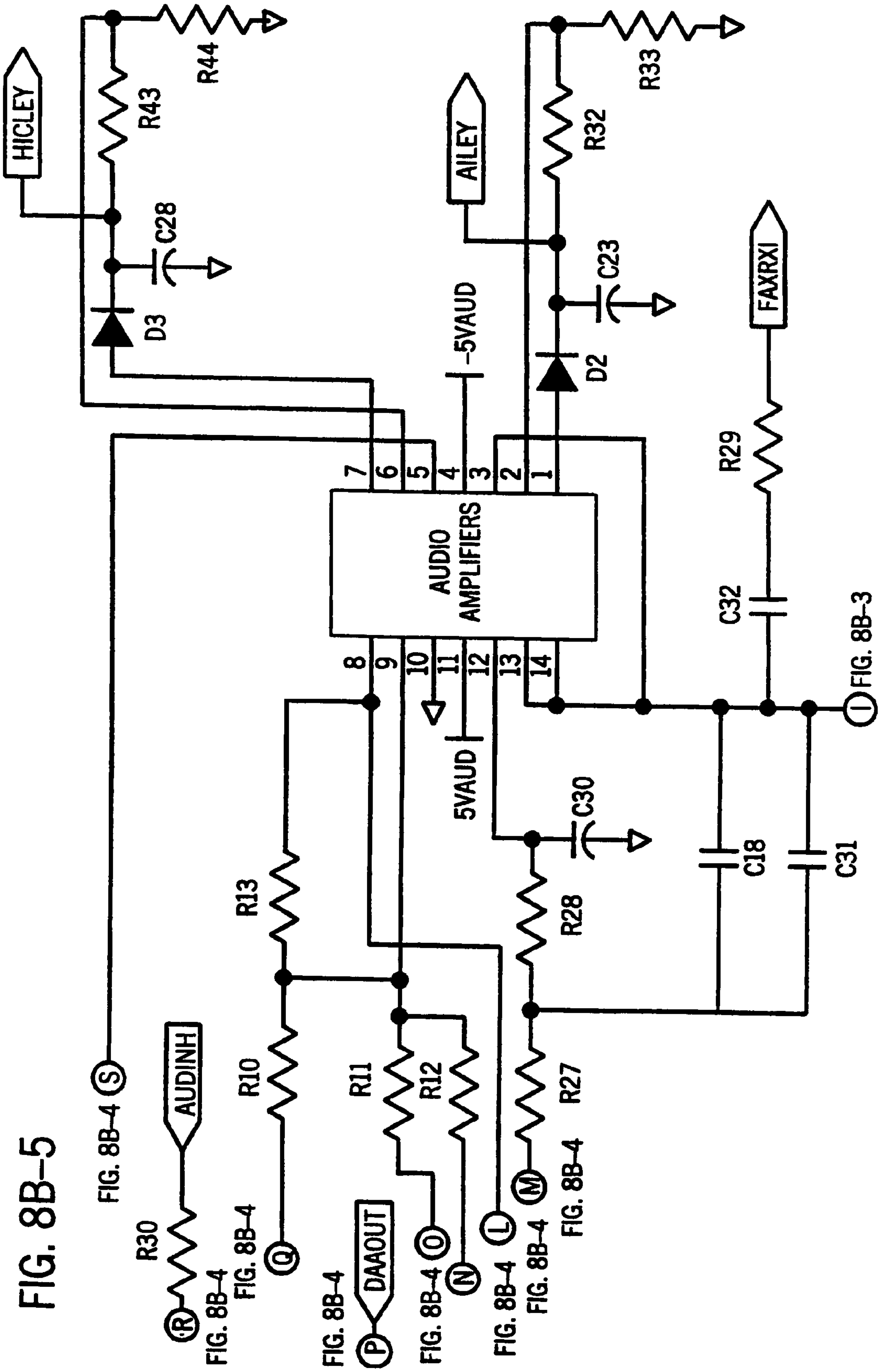
Figures 6, 8B:
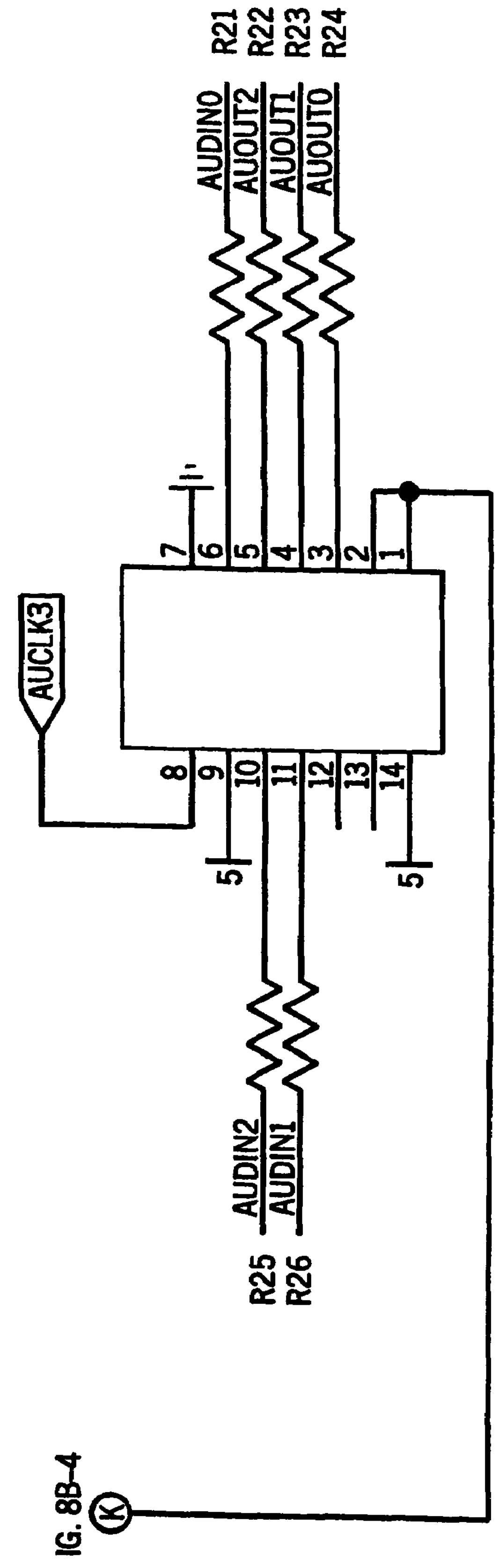
Figures 1, 8C:
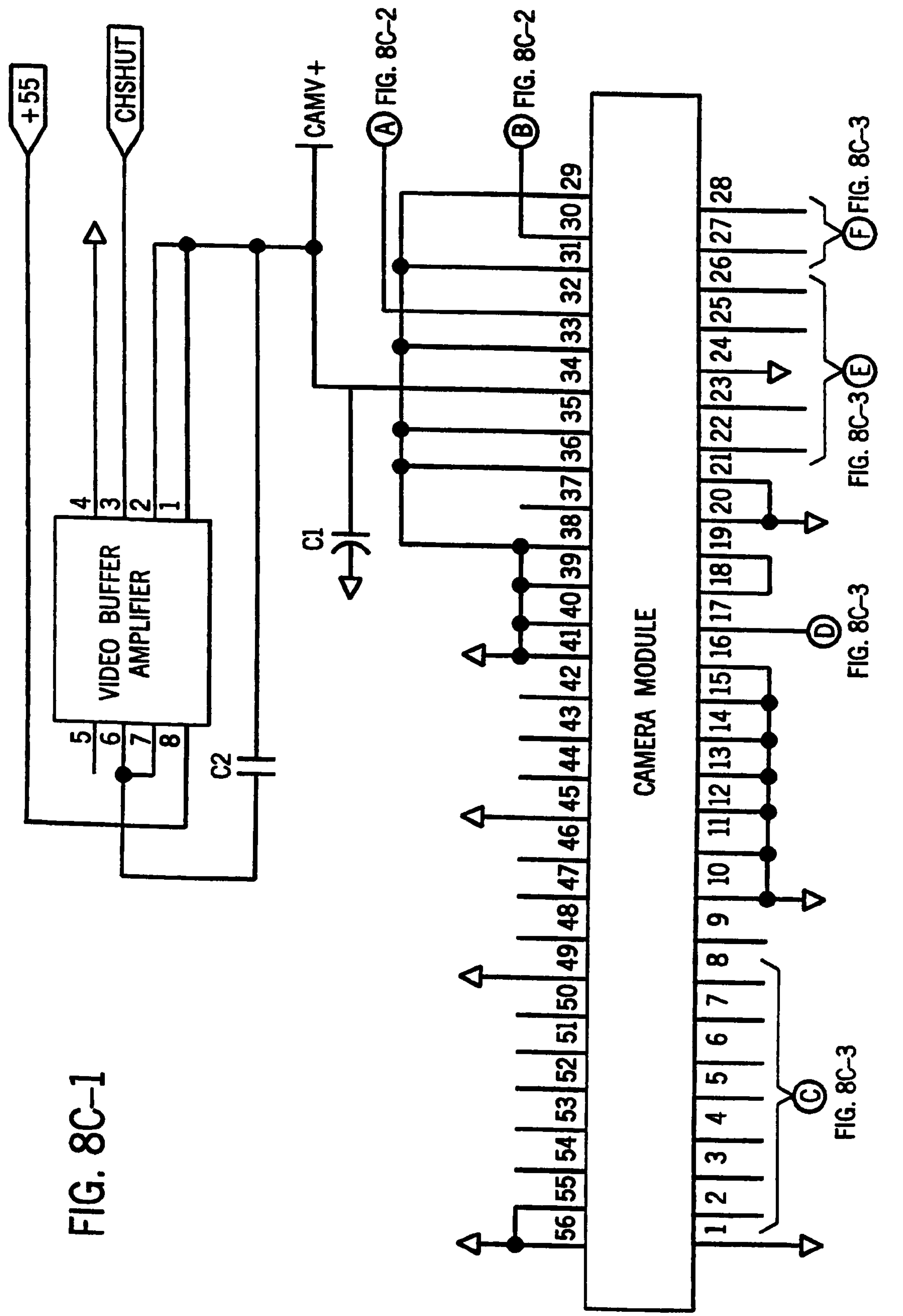
Figures 2, 8C:
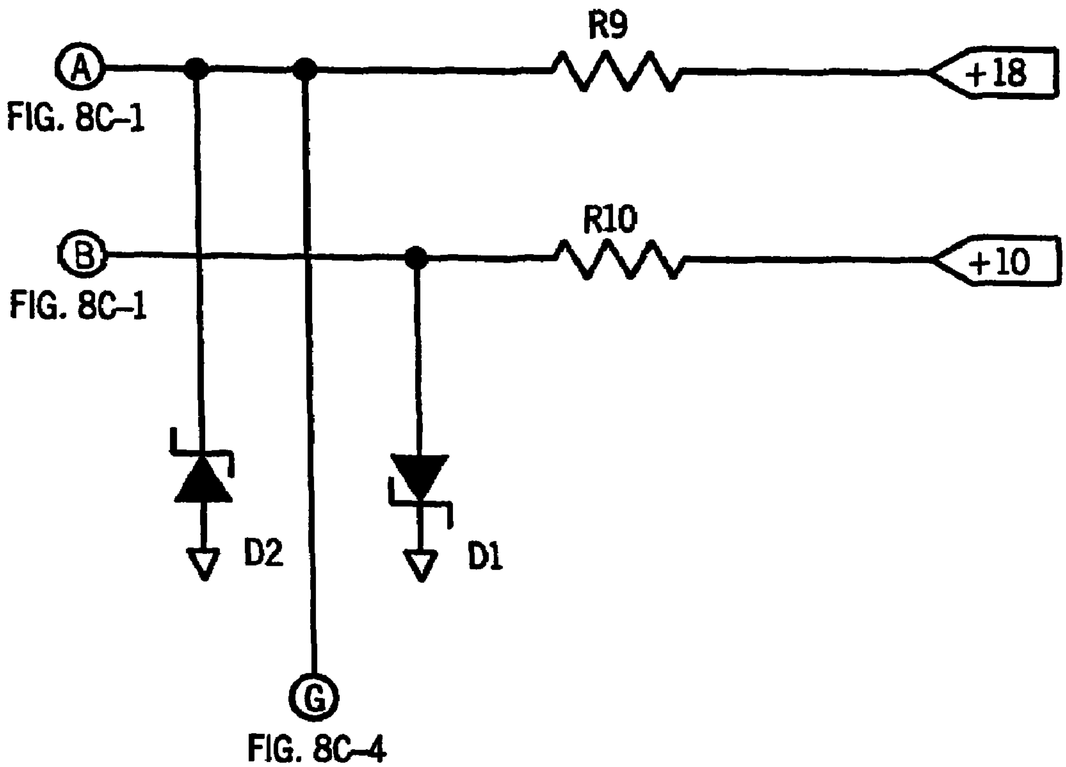
Figures 3, 8C:
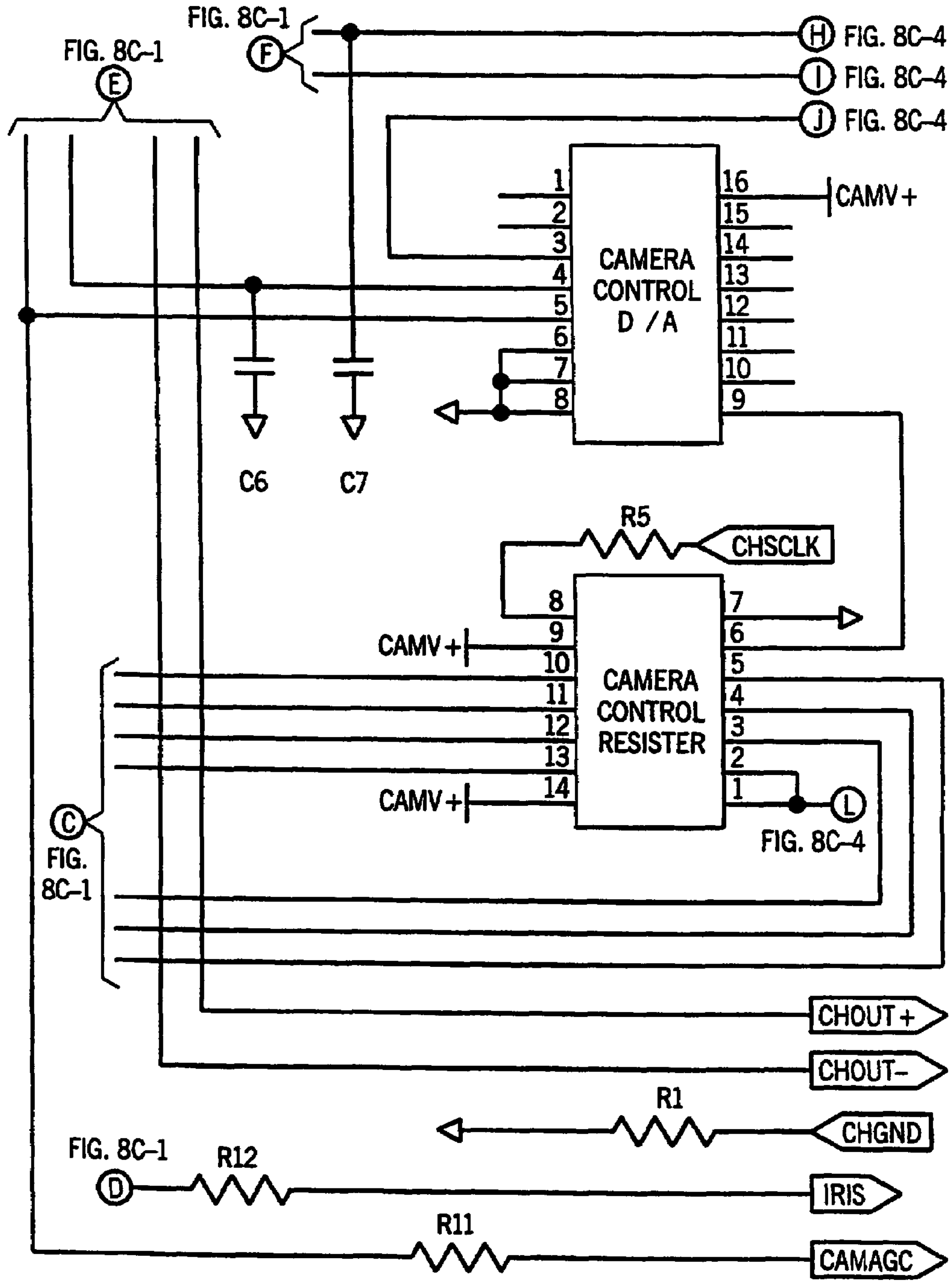
Figures 4, 8C:
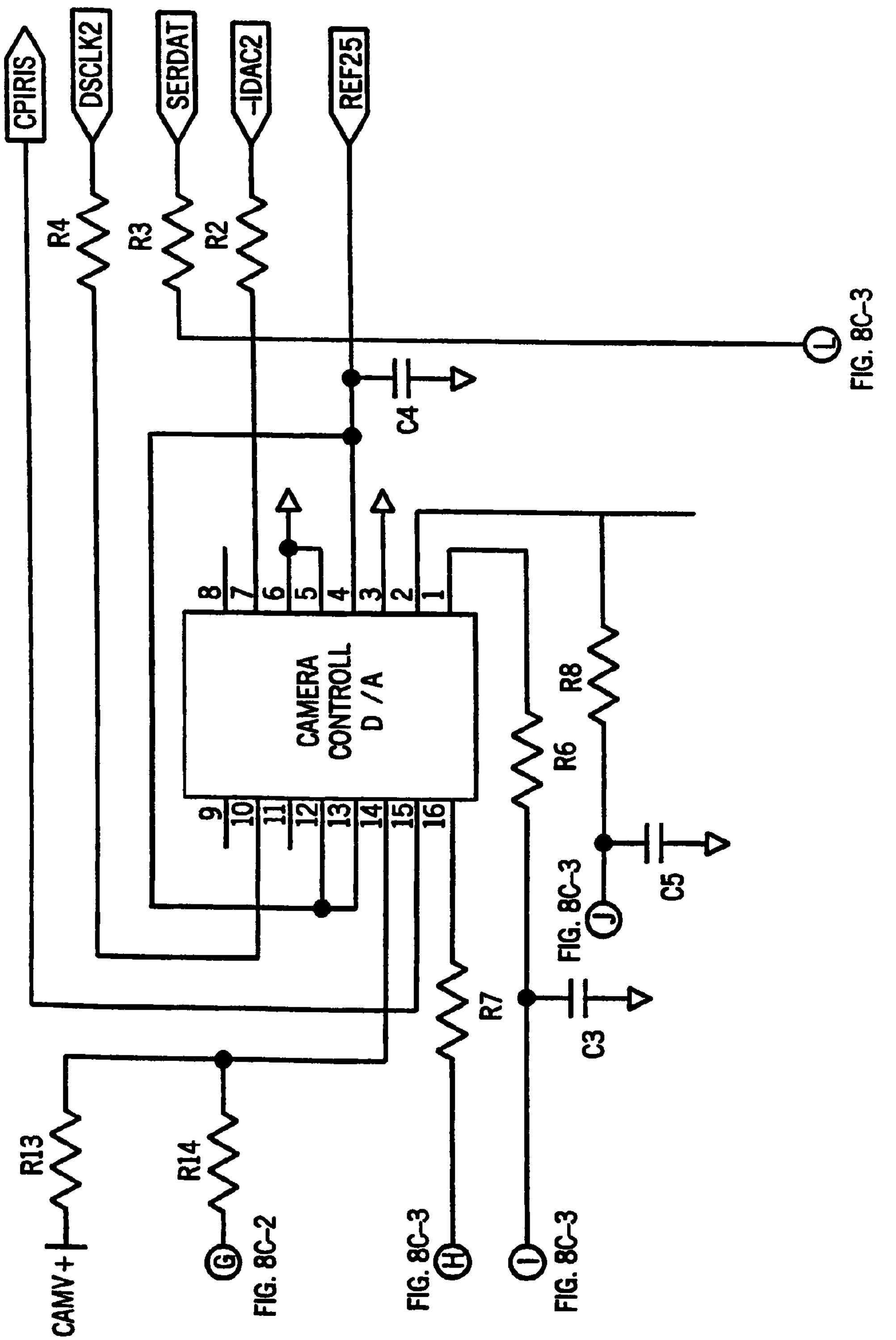
Figures 1, 8D:
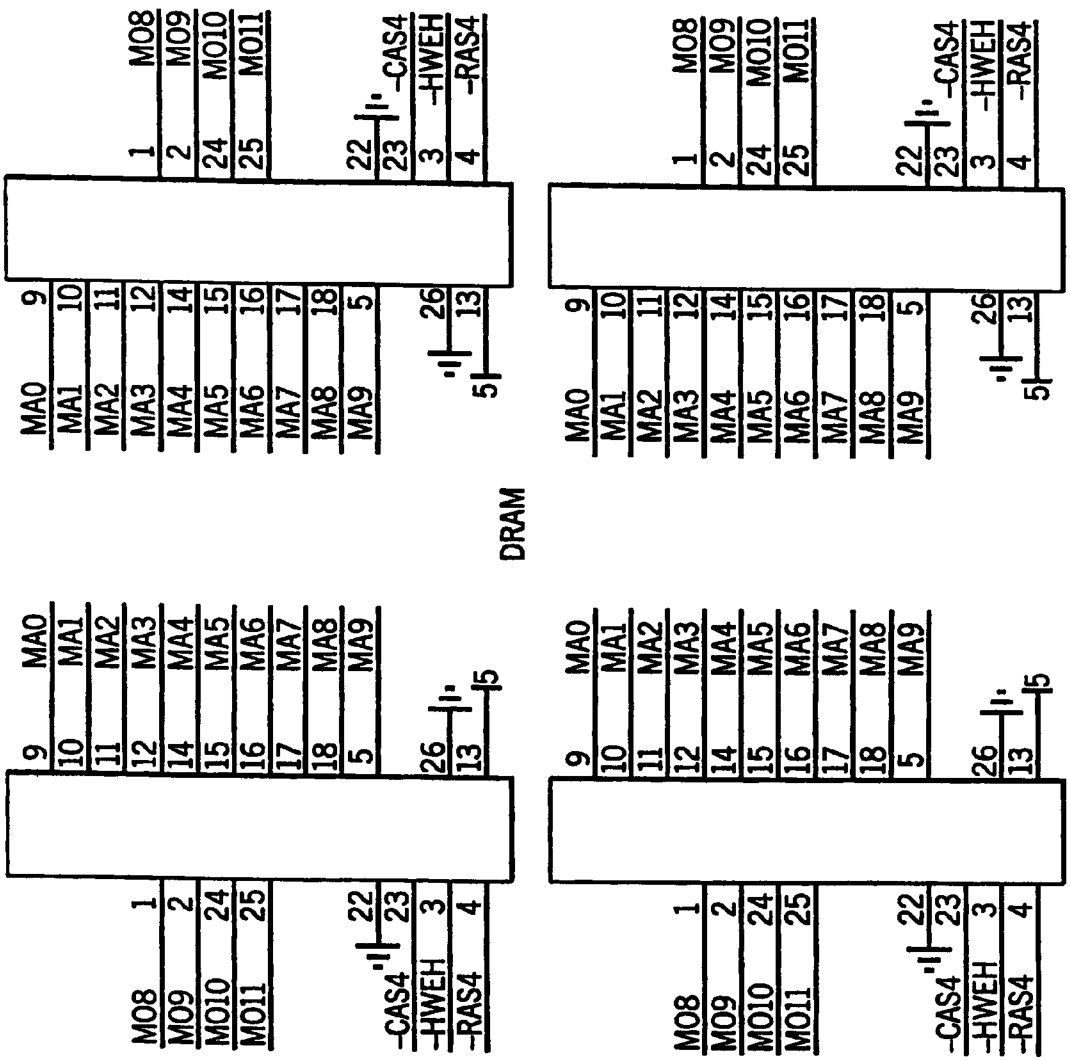
Figures 2, 8D:
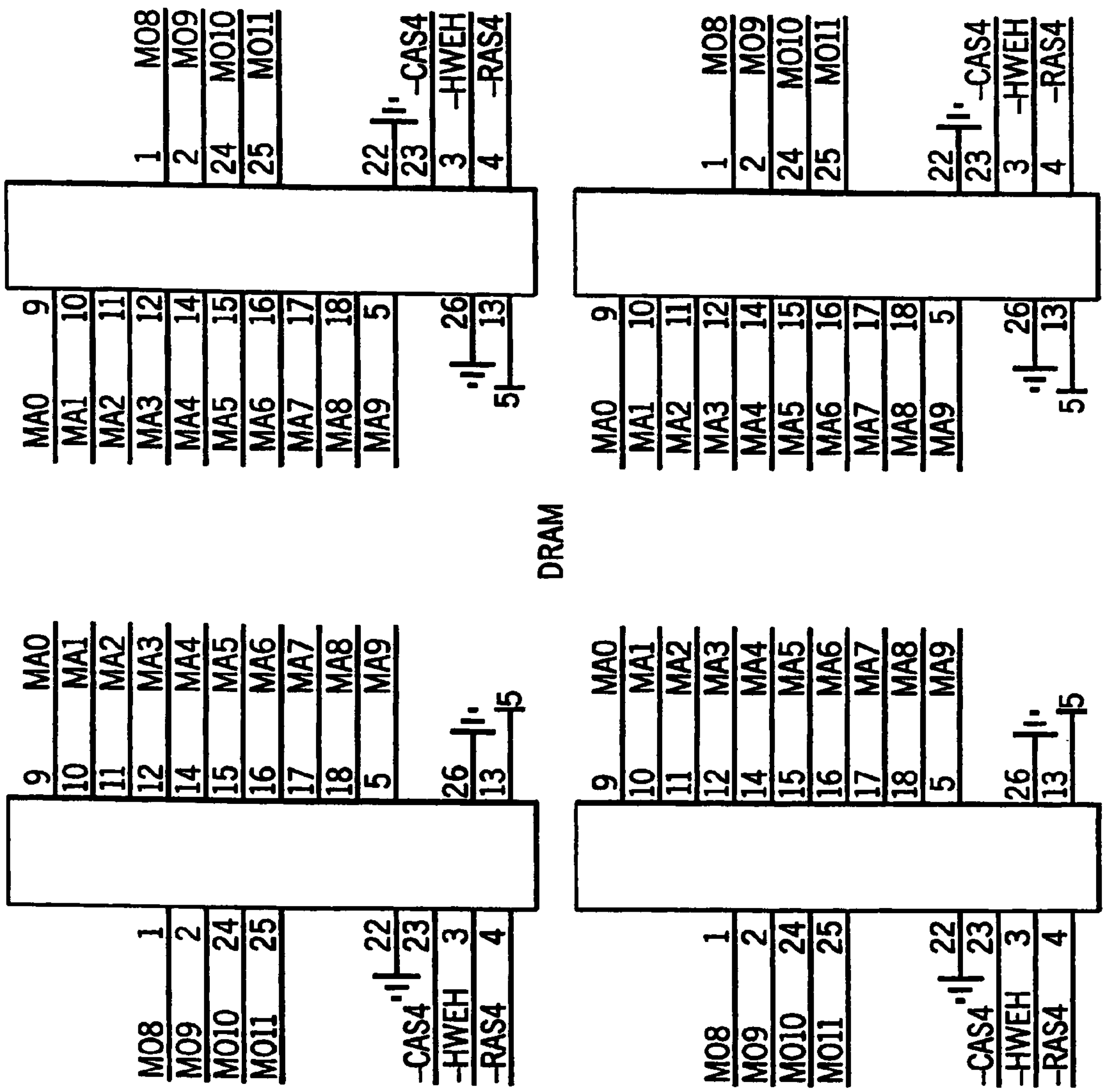
Figures 3, 8D:
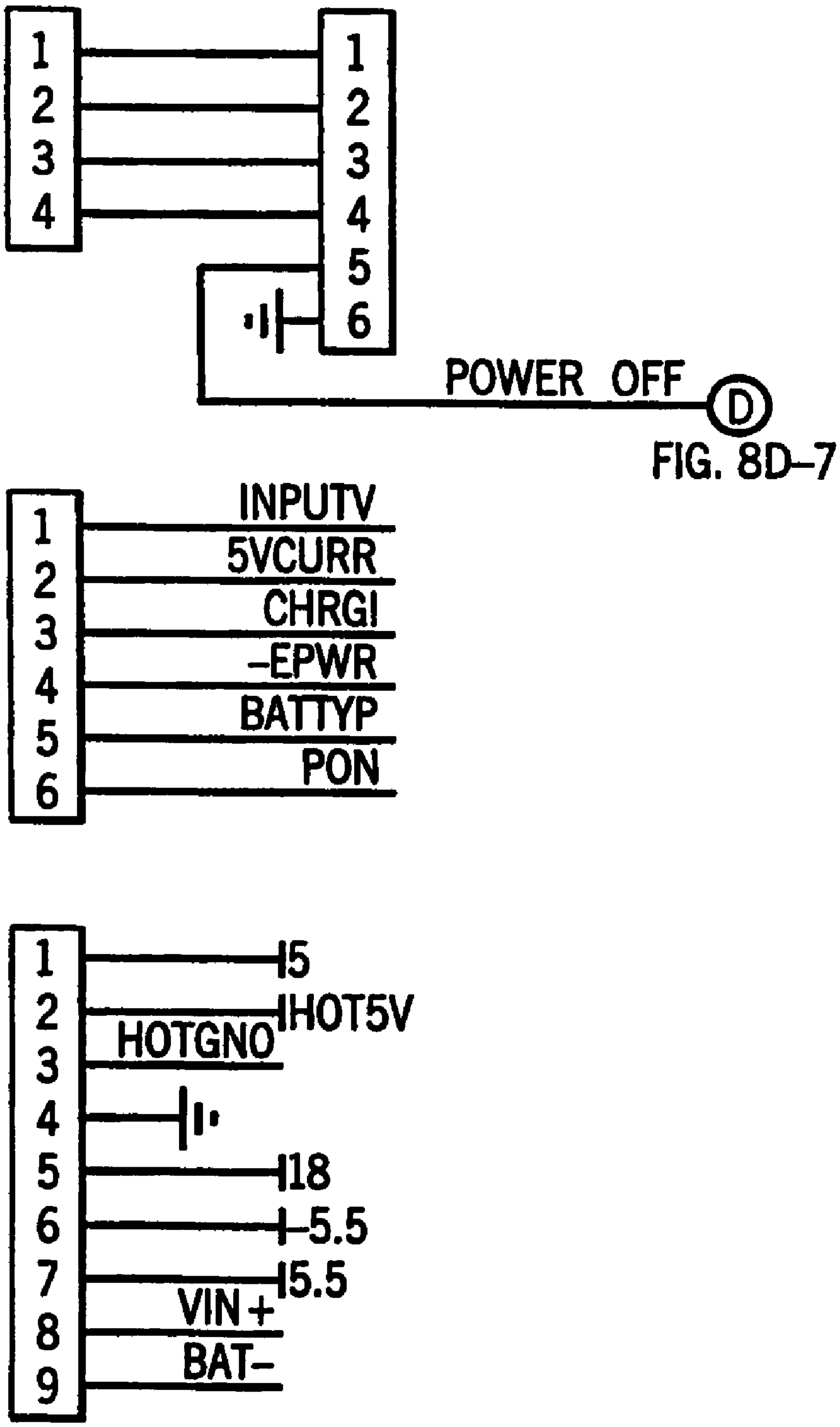
Figures 4, 8D:
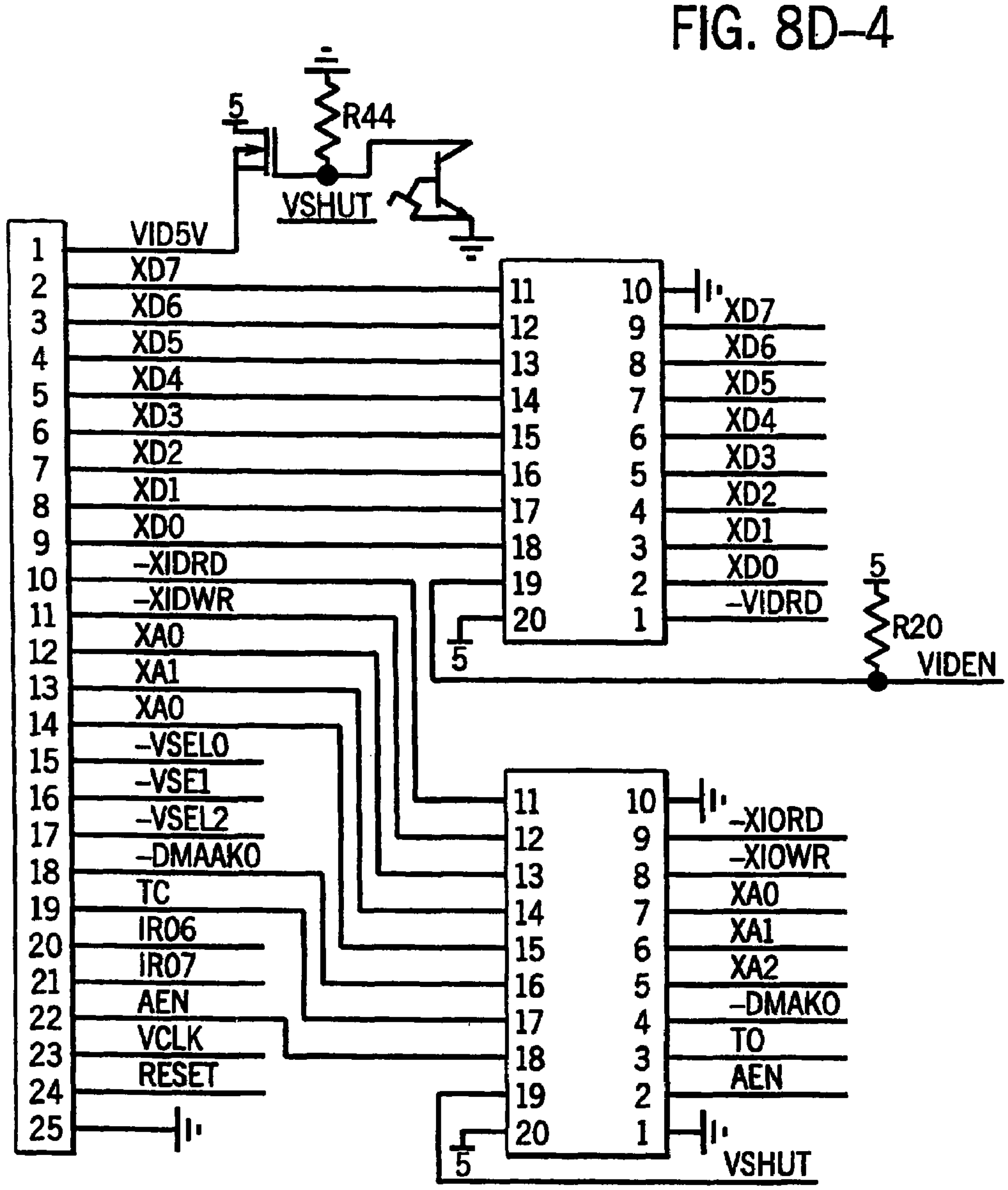
Figures 5, 8D:
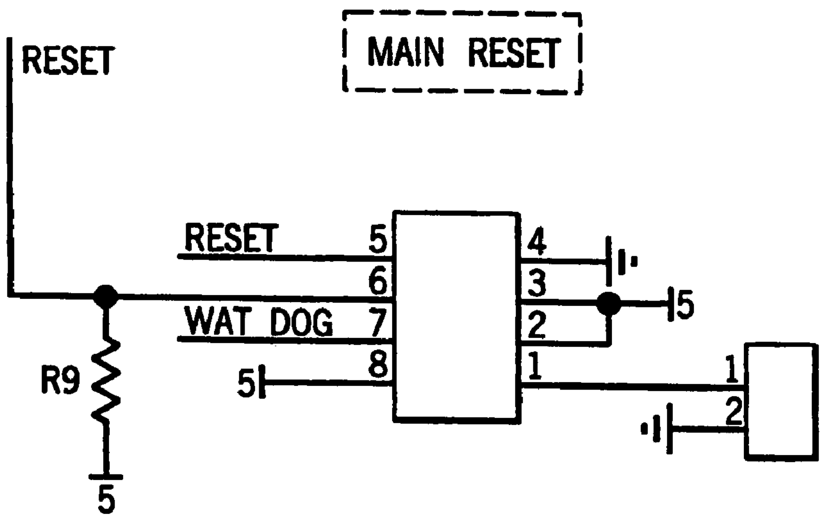
Figures 6, 8D:
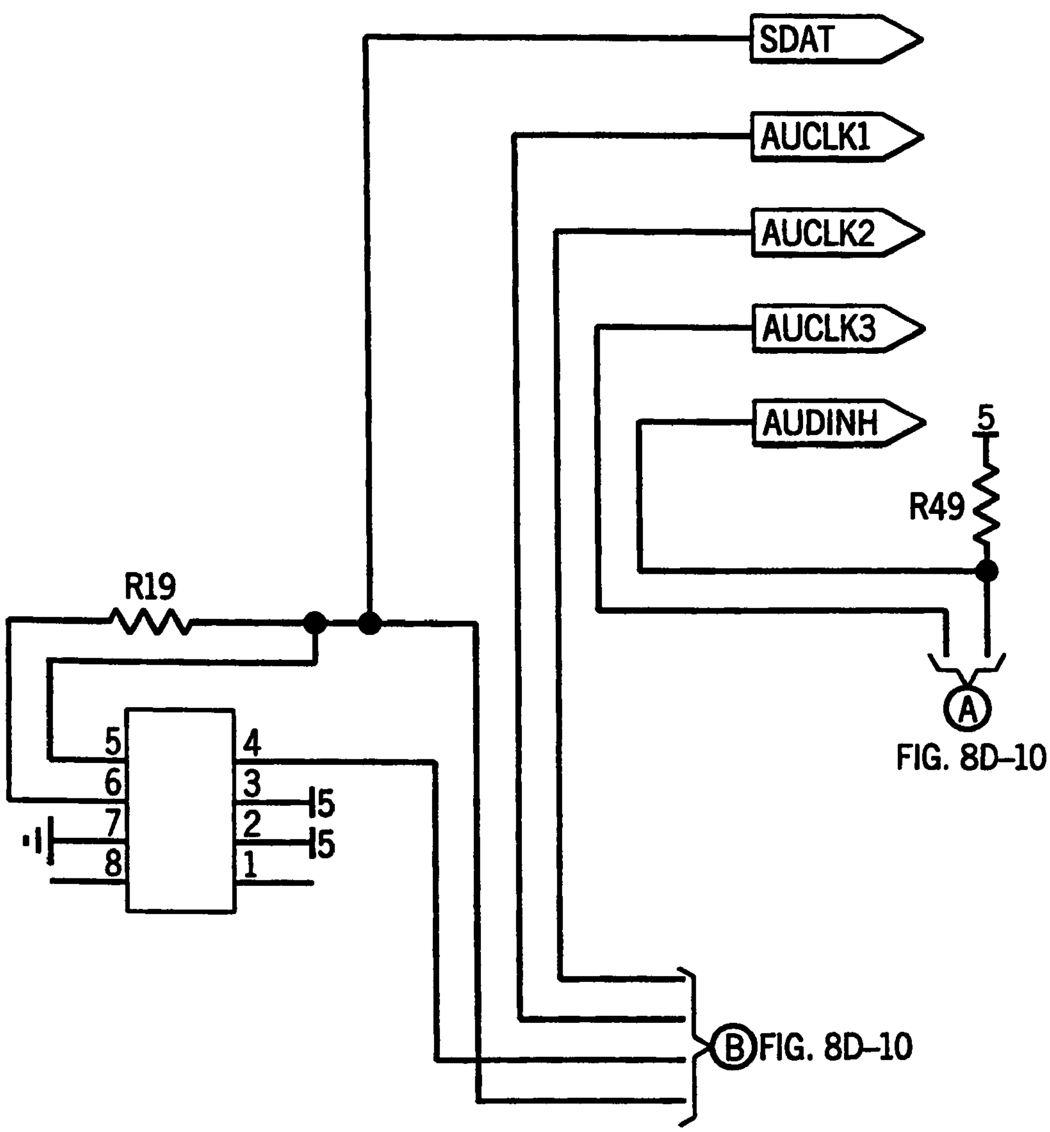
Figures 7, 8D:
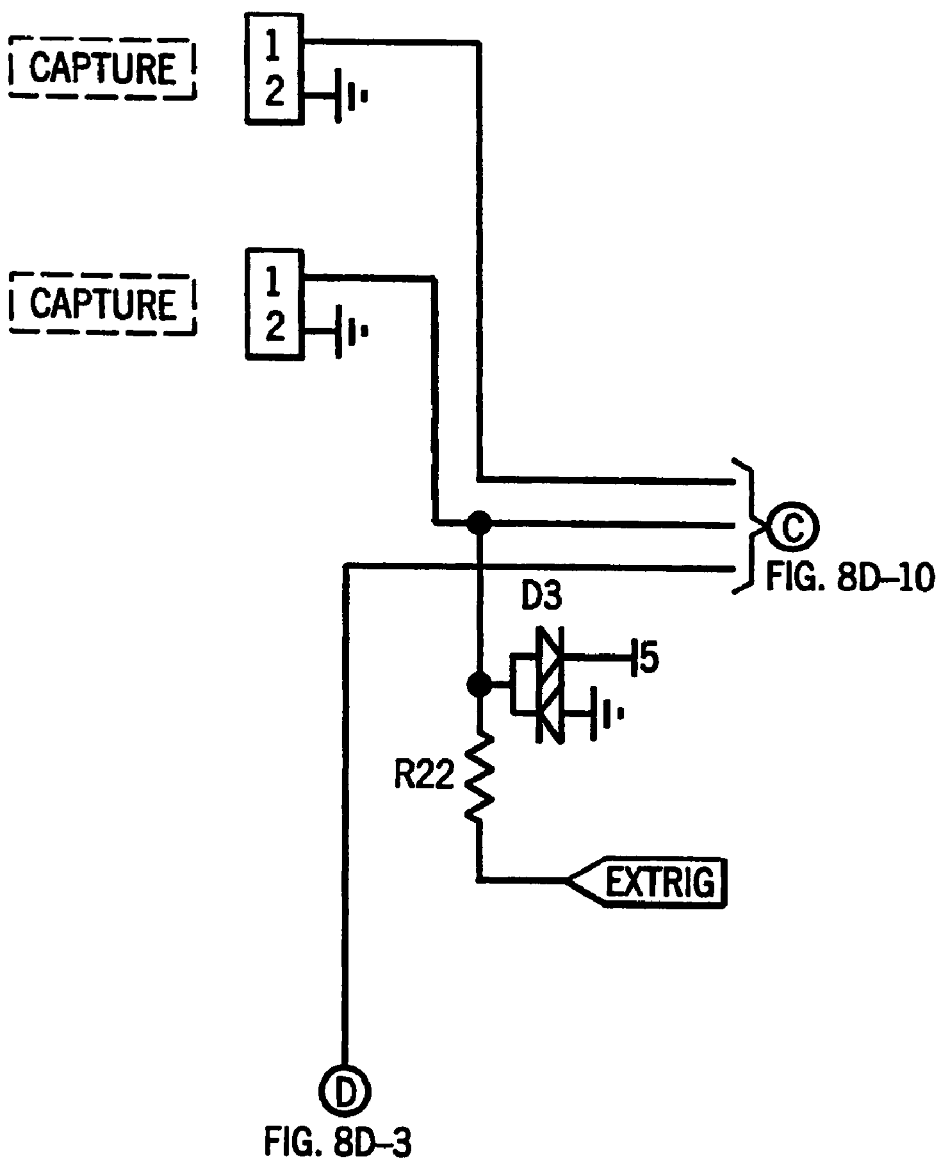
Figures 8, 8D:
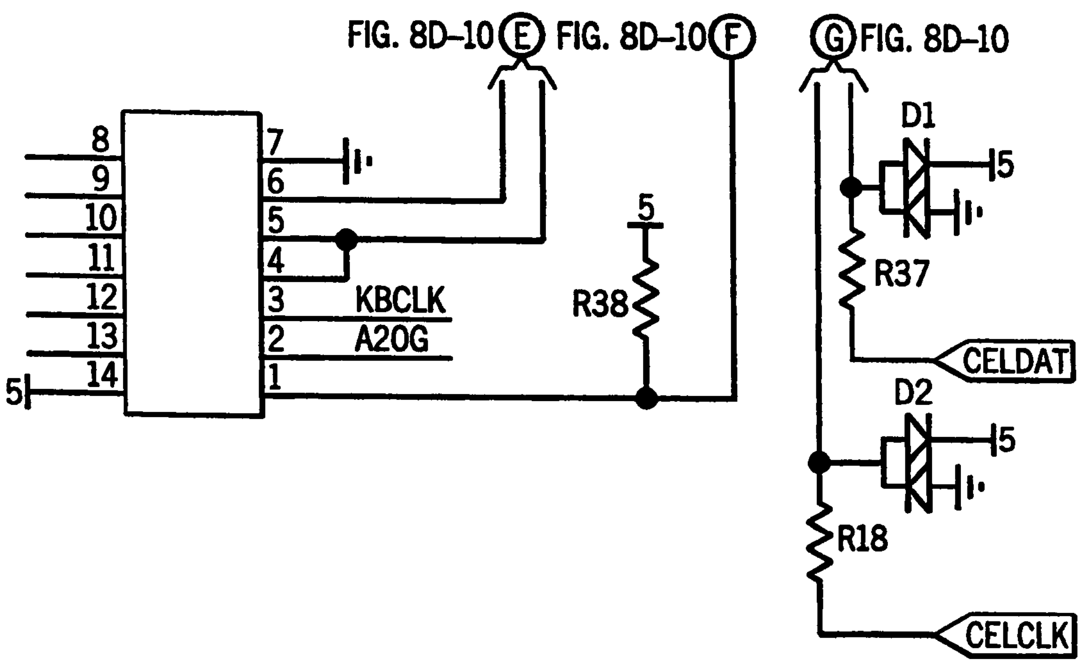

FIG. 8 is an illustration of an exemplary schematic diagram for the circuit of a system according to embodiments as specifically taught in the diagram of FIG. 5. Pin numbers, wiring harnesses and components are as shown on the drawing. FIG. 8, part A, is the system interconnect and shows the central processor board 300, the video board 302, the power board 304 and the CRT electronic interconnect board 306. The telephone interface is provided at 307. Board 308 is the audio connector board. Board 310 is the serial connector board and board 312 is the video connector board. FIG. 8, part B contains the audio logic, with audio I/O at 314. The audio amplifiers are designated 316 and 318. A microphone connector is provided at 320, with preamplifier circuit 322. Audio switches are provided at 324 and 326. Summing circuit 328 provides audio summing. The serial RAM for audio is designated 330. FIG. 8, part C includes the camera module 332 and the camera control digital to analog convertor 334. Amplifier 336 is the video buffer. Module 338 is the camera shutter control resistor.

FIG. 8, part D contains the central processor unit 340. Voltage in is at 342, with the power switch at FET 344. Power shutdown is provided at the video shutdown bit 346. The video connector is designated at 348. Pin I is switched five volts out to video logic. Pins 2-9 are connected to the video data bus and pins 10-22 are video control signals. Buffers 350 and 352 are the video board I/O isolation buffers. As shown, pin 19 of buffer 352 is the output enable and is connected to the video shutdown bit 346. Line 354 is bus enable. Pin A0 of buffer 350 is the direction control signal and pins A1 A7 are connected to the processor data bus. Pins 10-17 of buffer 352 are also connected to the processor bus.

The system DRAM memory is designated 356. The processor I/O module is designated 358 and the I/O decoder is provided at 360. A non-volatile RAM 362 provides system parameters. The processor oscillator is shown at 364 and a real time clock at 366. Controller 368 is the RAM card controller. The PCMCIA socket for the RAM card is shown at 370*a* and 370*b*. The modem is designated 372. The serial controller is shown at 374 with serial controller oscillator 376. Module 378 is a memory module. A signal buffer is provided at 380, and an address decoder at 382. Connectors are designated at 384, 386 and 388.

FIG. 8, part E shows the modem board connector at 390, the glue logic PLD at 392 and the glue logic module at 394. Module 396 is the synchronous/asynchronous serial controller. Circuit 398 is the signal multiplex relay and circuit 400 is the transmit/PTT relay. Bypass relays are shown at 402. Relay 404 is the digital mode relay. Transformer 406 is the audio isolation transformer. Circuit 408 provides a low speed data filter. The line drivers are designated 410 and the line rectifiers are designated 412, respectively. Connector 414 provides radio/serial data connection.

FIG. 8, part F shows the status LED's 416 and the PCMCIA door open switch 418. FIG. 8, part G shows the power switches 420. FIG. 8, part H is the battery pack 422.

FIG. 8, part I is the power supply. The rechargeable battery connection is shown at 424, with DC power input at 426. An internal battery/external DC input transfer relay is provided at 430. The signal for the power switch on the removable disk drive access door is on pins 3, 4 of connector 428. The voltage IN regulator is designated at 432, with the processor voltage regulator designated 434. The processor power control bit is at 436. The system power control bit is at 438, with the system voltage regulator at 440. The video power control bits are at 442 and 444, with the video voltage regulators at 446 and 448, respectively. Battery 450 is the real time clock battery. Connector 452 is the battery charger connector. Connector 454 connects processor power, system power, regulated battery power and real time clock power, as shown. Connector 456 connects video power. The power sequencer circuit is at 458.

FIG. 8, part J shows the direct access arrangement to a land line telephone at 460 and the video viewfinder circuitry (CRT electronics) at 462.

FIG. 8, part K is the video control circuitry. The video input amplifier is designated at 464. The composite video sync stripper is designated at 466. The video H/V timing pulse generator is at 468 and the video phase lock loop at 470. The register 472 is the video control register. Circuit 474 provide programmable video filters—edge enhancers, with the FET switch designated at 476. The video filter circuit is at 478 and the video filter is at 480. The video reference digital to analog circuit-is shown at 482, with the video analog to digital circuit at 484 and the video analog to digital data out buffer at 486. The voltage reference circuit is designated at 488.

FIG. 8, part L shows the push button control switches as 490 and 492. The keyboard display is designated 494, and the microcontroller 496 is the keyboard and keyboard display microcontroller. The backlight circuitry is designated at 498, with the back light control at 500. Module 502 is the LCD module.

The circuitry supports any of the configurations such as, for example, a basic near real time transmission system via Group-III fax or a comprehensive system supporting both land line and wireless transmission of image, audio and documentary data at both a local and remote station.

Embodiments permit digitized collection of audio signals through the use of an internal microphone, and external input device, a cellular telephone, land line telephone, wireless radio or other communication system, and digitized audio playback, as well. The playback can be via an internal speaker, out an external out jack to a remote device or via a cellular telephone, land line telephone, wireless radio or other communication system.

The digitized image and audio capture features permit association of audio with an image, as well as data with the image. Useful data associated with the image includes GPS from either internal or external GPS devices, date and time, and text which may be input from an integrated keyboard or from a remote location.

It is an important feature of the invention that the system supports storage of images in an interim storage format including raw video, interim gray scale format and/or half tone format. The image can also be stored in the selected output mode, such as by way of example, a Group III facsimile mode. The versatile capability of the system permits transmission of captured data to a standard bi-level facsimile machine such as Group III, to gray scale facsimile systems or full color facsimile systems, as well as to other remote receiving devices such as, by way of example, personal computers and network servers. The data may be transferred in any of a variety of formats and protocols including JPEG, FAX, emerging imagery formats, wavelets and data.

According to embodiments, a system supports storage of images in an interim storage format including raw video, interim gray scale format and/or half tone format. The image can also be stored in the selected output mode, such as by way of example, a Group III facsimile mode. The versatile capability of the system permits transmission of captured data to a standard bi-level facsimile machine such as Group III, to gray scale facsimile systems or full color facsimile systems, as well as to other remote receiving devices such as, by way of example, personal computers and network servers. The data can be transferred in any of a variety of formats and protocols including JPEG, FAX, emerging imagery formats, wavelets and data protocols. Embodiments are adapted to operate in multiple modes, with a unitary capture and send mode or separate capture and store, and send modes. In an embodiment, the system is adapted for tagging a collected image, video, audio, and other data such as a GPS signal, with a real time clock and added text. This permits complete historical data to be transmitted simultaneously with the image signal.

It is contemplated that a system according to embodiments can be self-contained with an integral power unit such as a rechargeable battery source or the like. Therefore, the system can be adapted to power up when in use and power down when not activated, preserving power during idle time. The power systems for the video camera, the video input circuits and converters, the modem or other transmission devices and other high drain components can be isolated and only powered when needed. This also permits use of ancillary functions, such as use as a cellular telephone, to proceed without draining the power source by powering idle components. The processor clock rate can also be slowed down during idle mode to further conserve power.

Where desired, a system according to embodiments also includes camera operation control capability through the use of a digital/analog network for converting digital commands to analog signals for controlling the gain, pedestal, setup, white clip, lens focus, and other functions of the camera from a local input device, a remote device or as programmed functions. The central processor can also be used to control camera shutter. Camera features and parameters which can be controlled in this manner are compressor resolution (high, medium, low), field/frame mode, color or monochrome, image spatial resolution (640×430, 320×240, for example), lens and camera adjustments, input selection where multiple cameras are used and the like.

When an integrated communications device is used, such as by way of example, a cellular telephone, the telephone can be isolated from the rest of the system to permit independent use, and independent power up and power off and other cellular phone functions.

In operation, a system according to embodiments permits the manual capture, dial (select) and send of images, and can also be fully automated to capture, dial and send, for example, on a timed sequence or in response to a sensor such as a motion sensor or from a remote trigger device. The remote trigger can be activated by an incoming telephone signal, for example. The remote device can also be use for remote loading and downloading of firmware, and of the programmable devices, as well as to provide remote configuration of sampling modes during both the capture and the send functions.

Figures 8, 8D, 9:
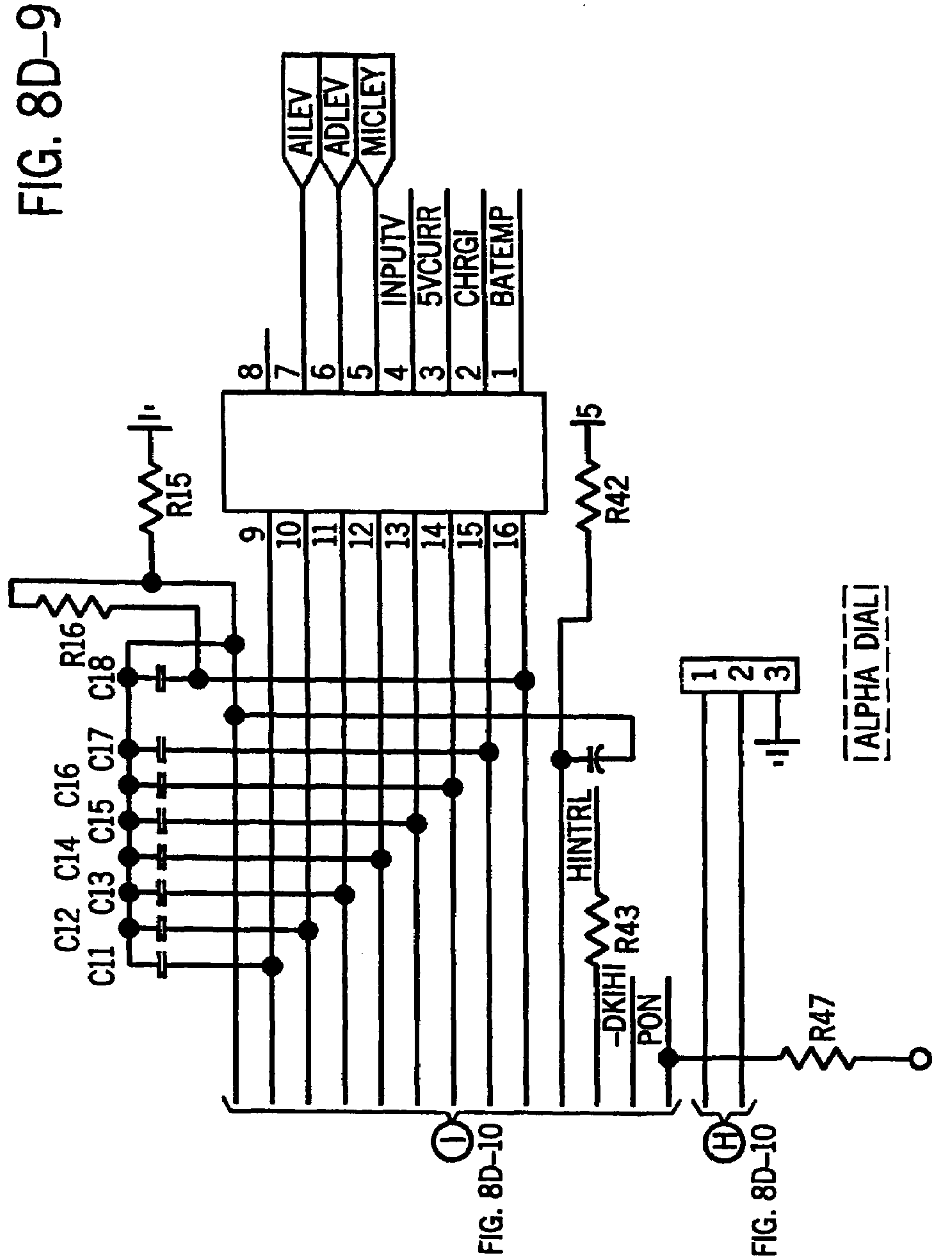
Figures 8, 8D, 9, 10:
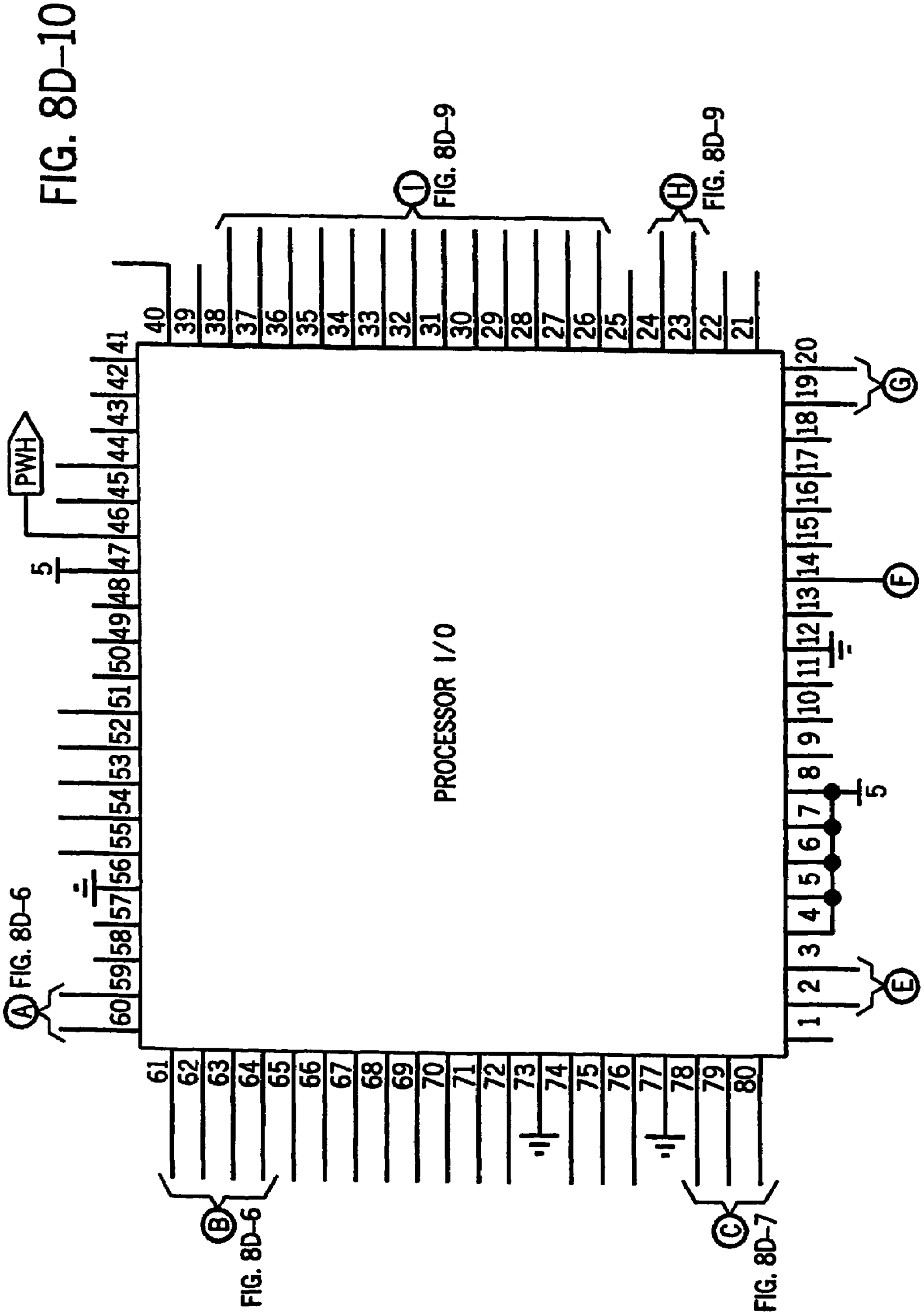
Figures 8, 8D, 9, 10, 11:
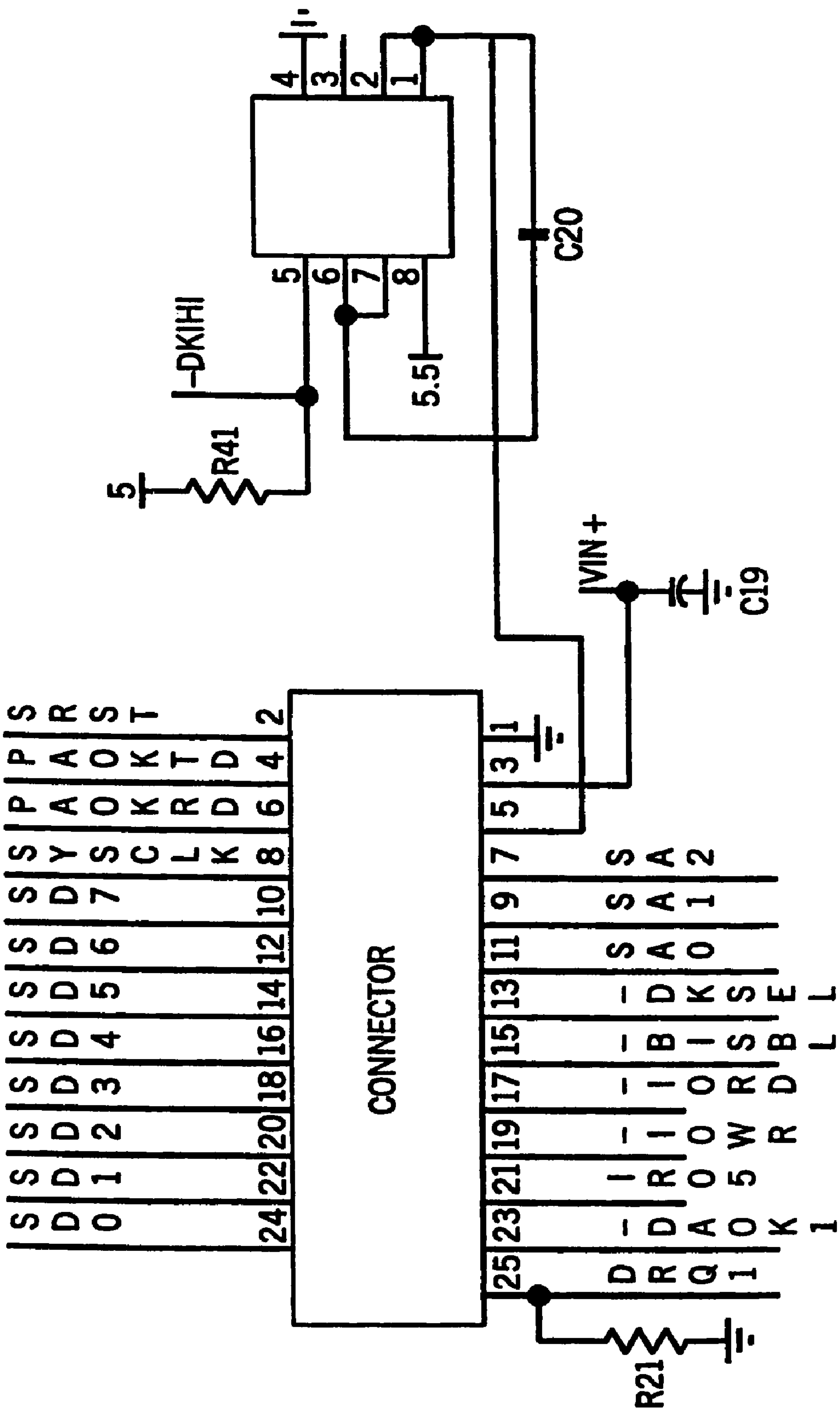
Figures 8, 8D, 9, 10, 11, 12:
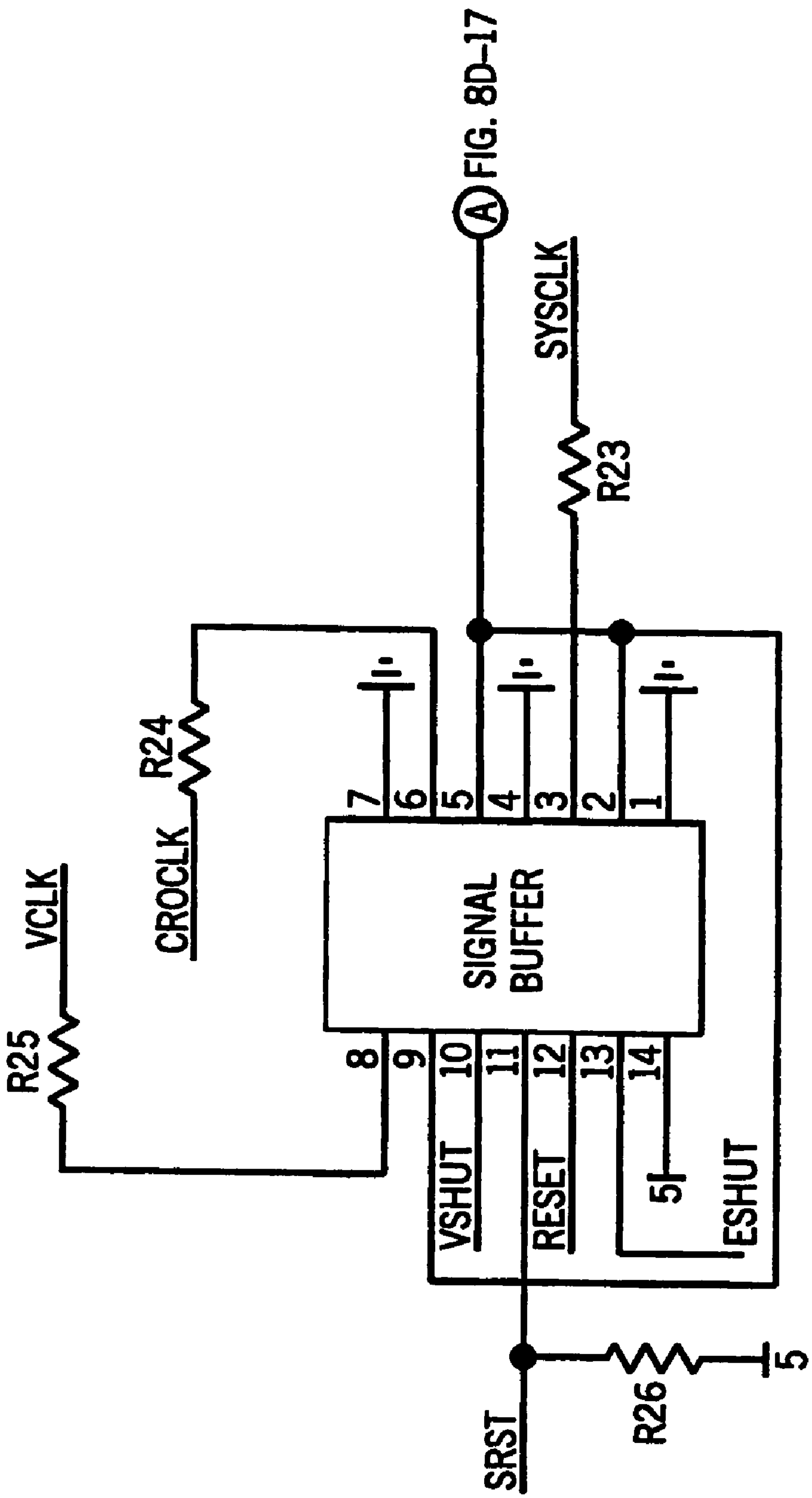
Figures 8, 8D, 9, 10, 11, 12, 13:
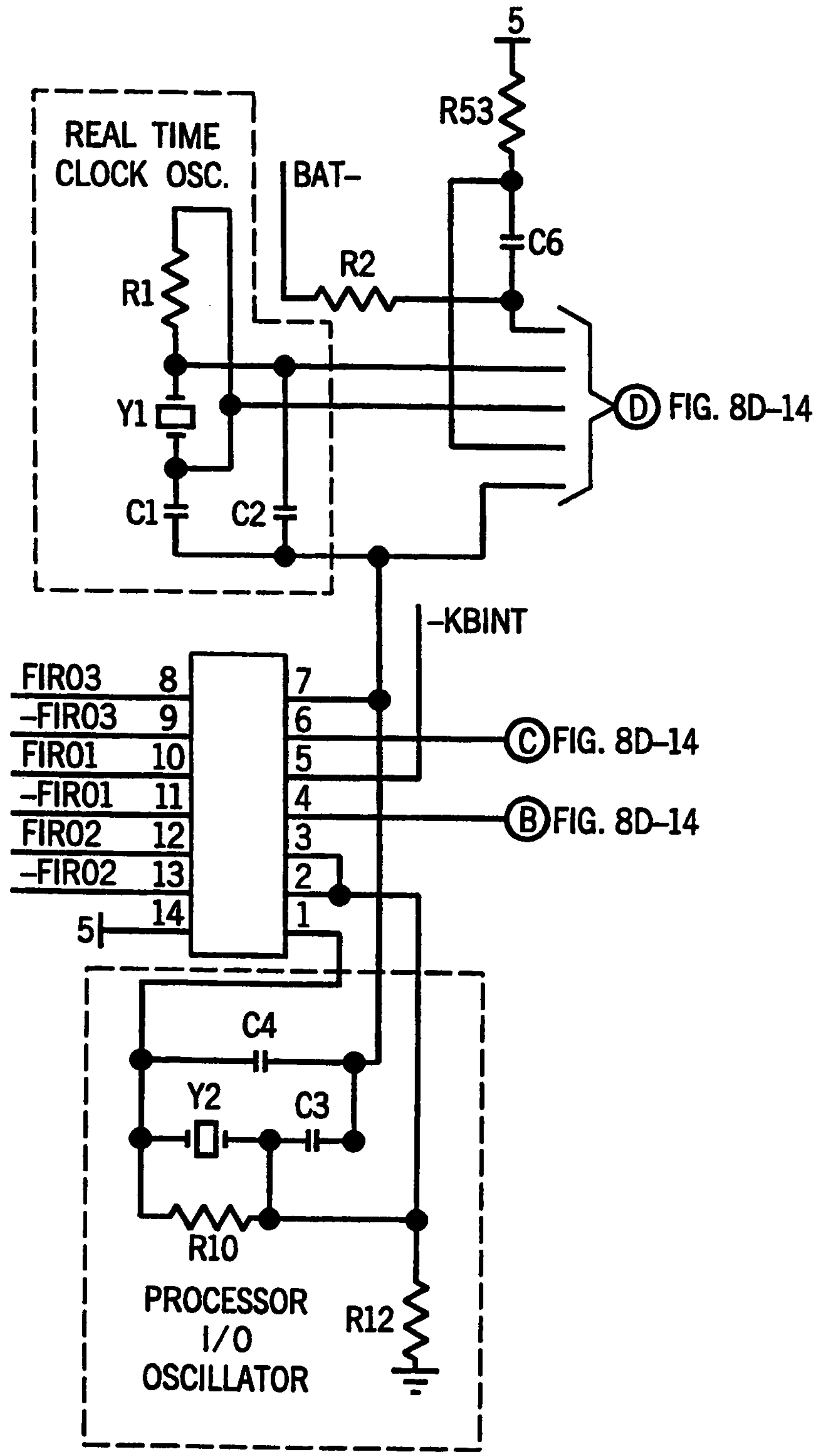
Figures 8, 8D, 9, 10, 11, 12, 13, 14:
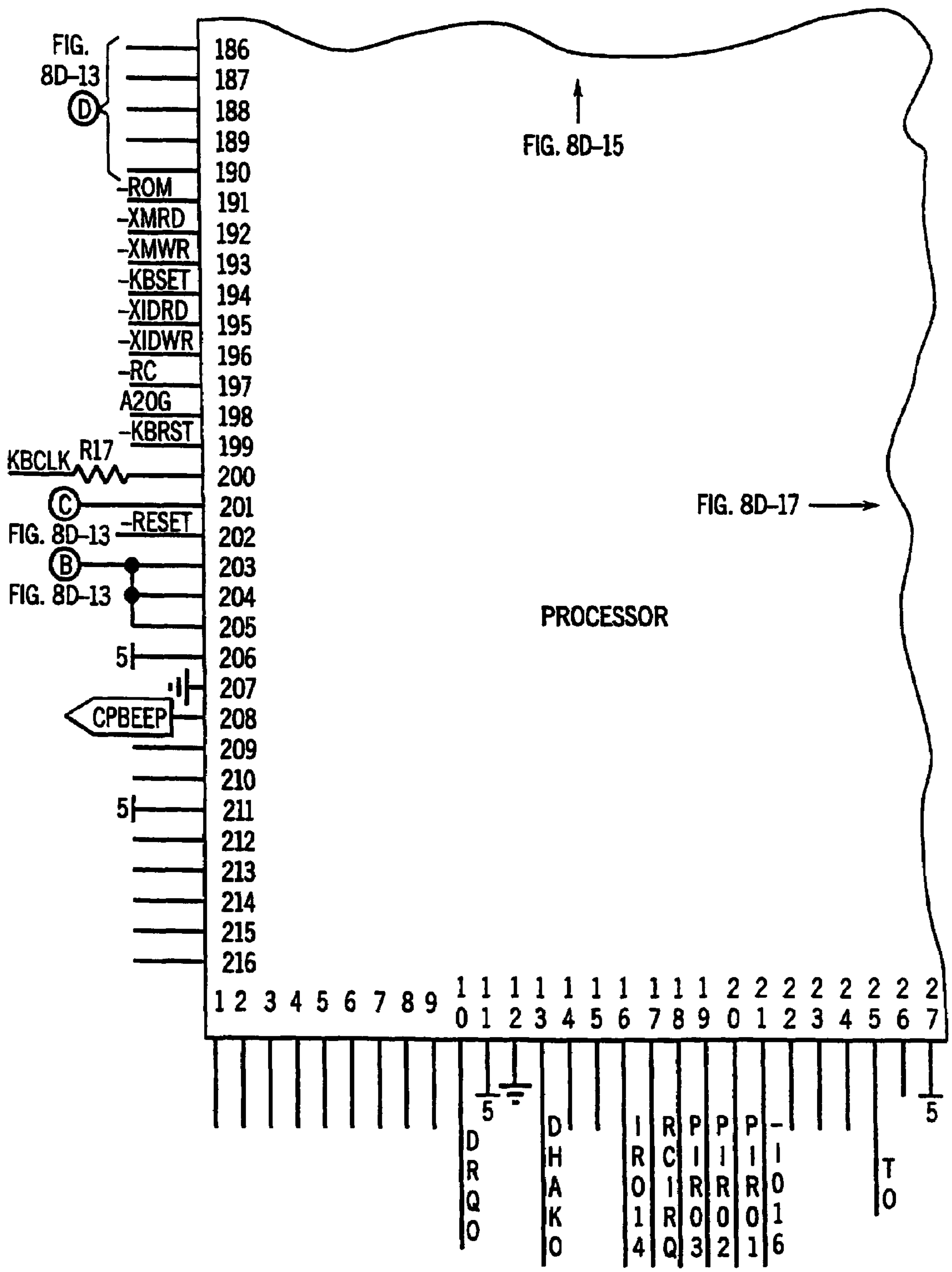
Figures 8, 8D, 9, 10, 11, 12, 13, 14, 15:
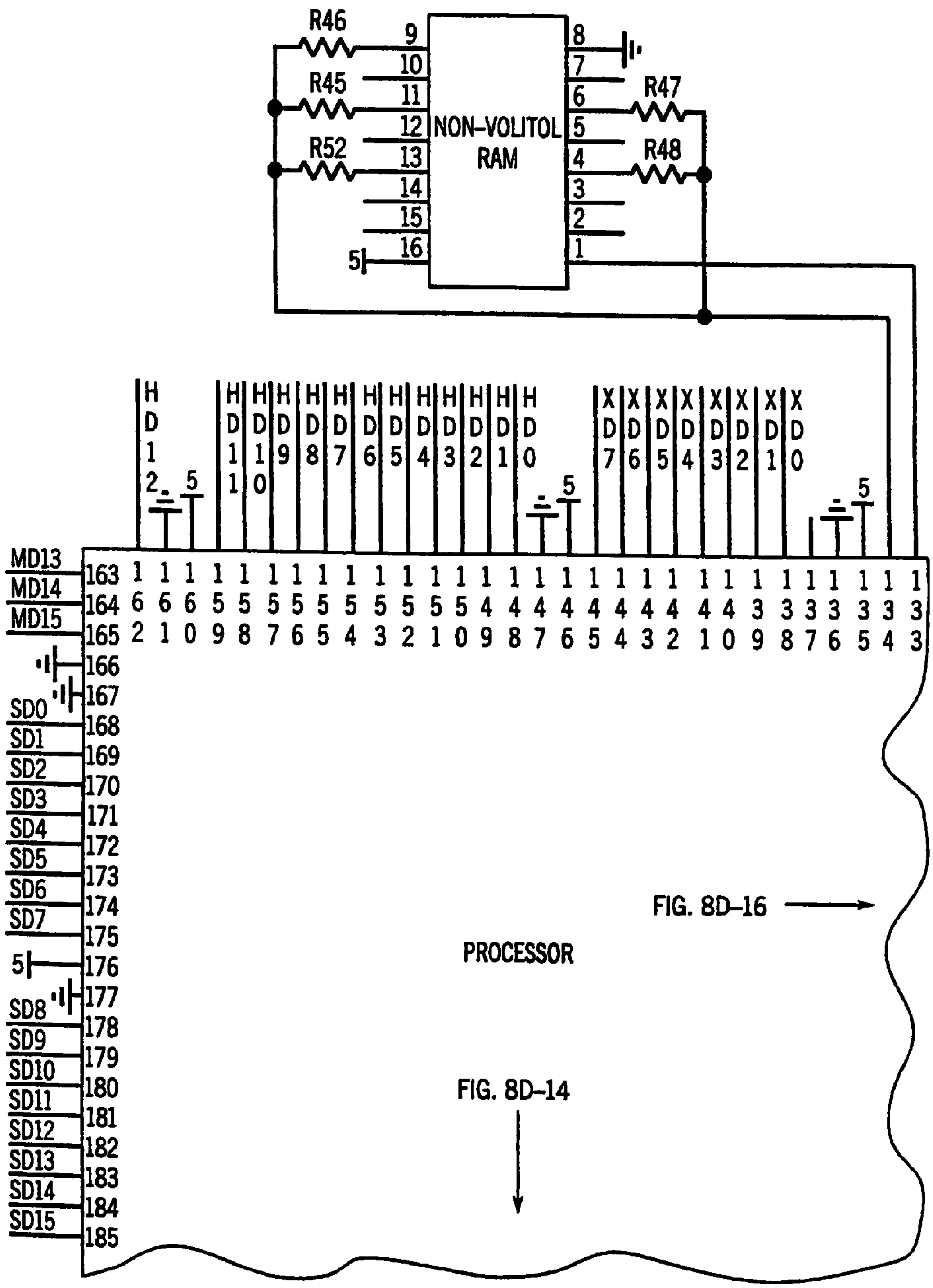
Figures 8, 8D, 9, 10, 11, 12, 13, 14, 15, 16:
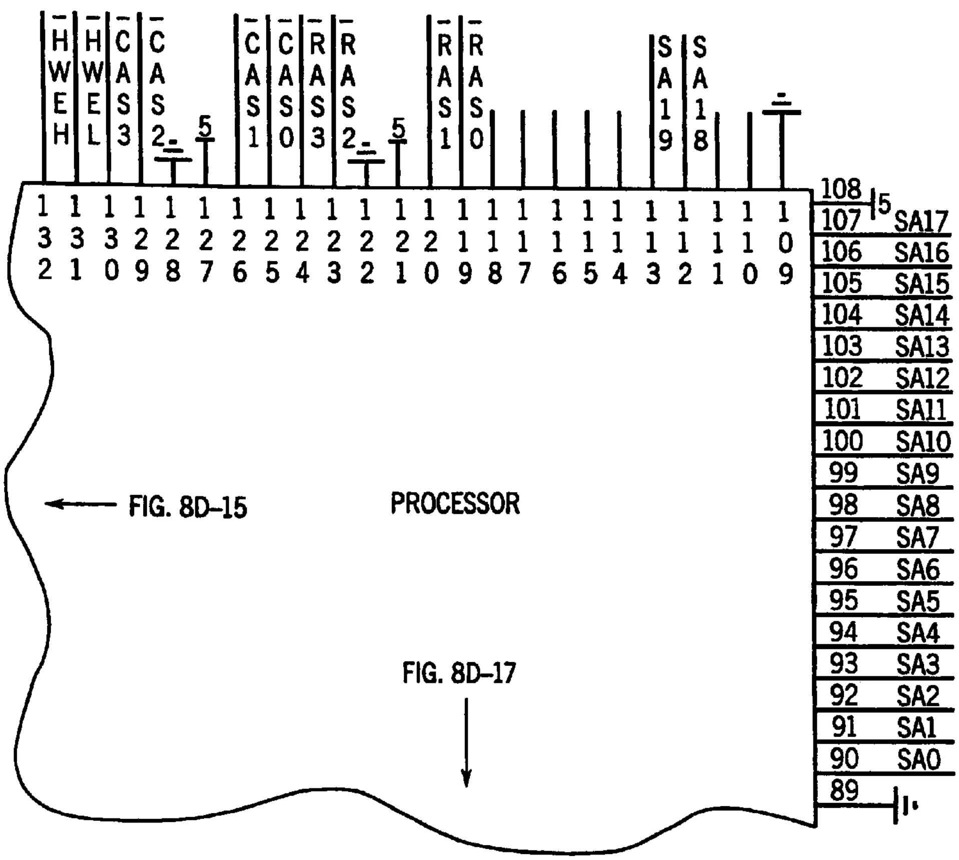
Figures 8, 8D, 9, 10, 11, 12, 13, 14, 15, 16, 17:
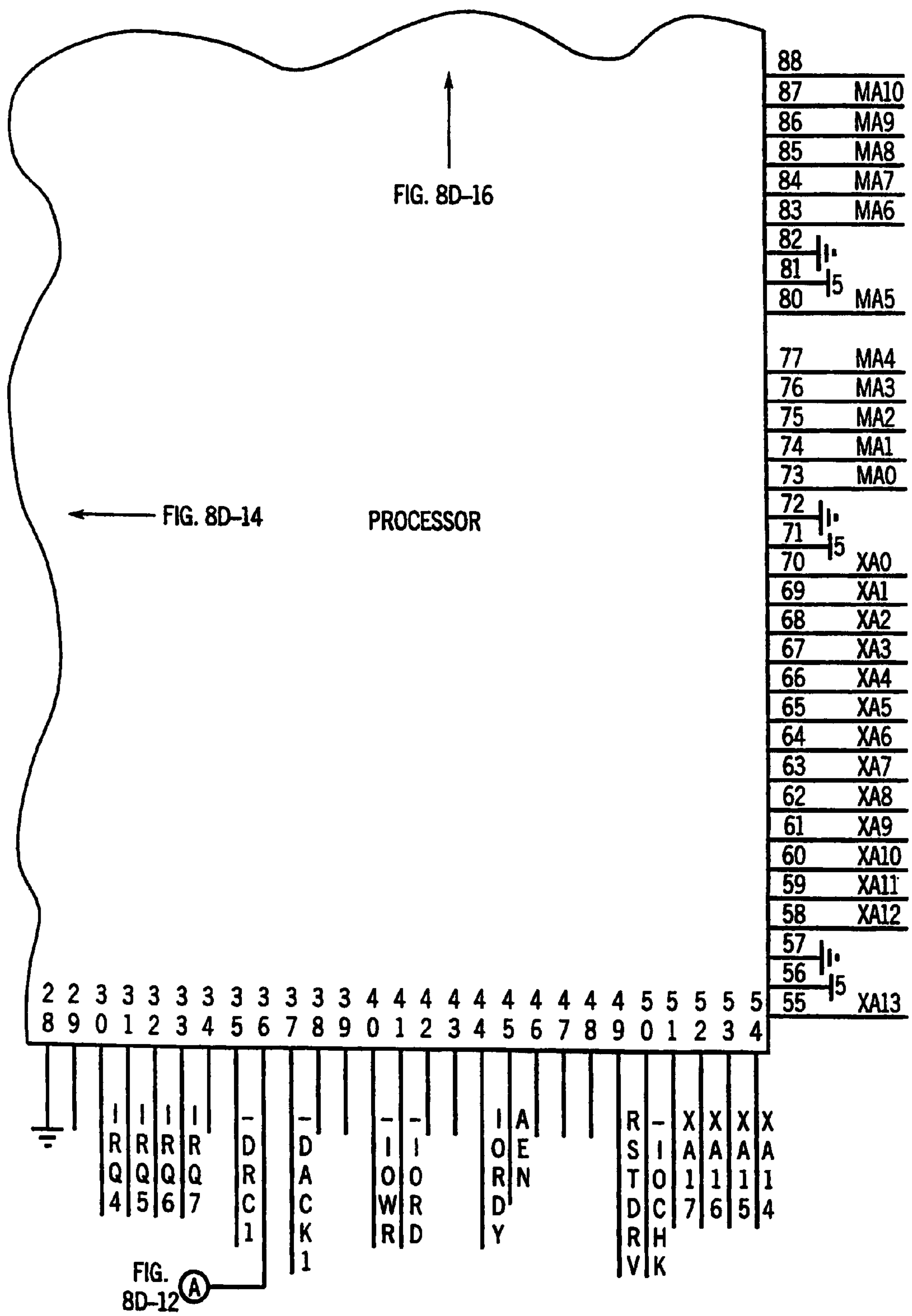
Figures 8, 8D, 9, 10, 11, 12, 13, 14, 15, 16, 17, 18:
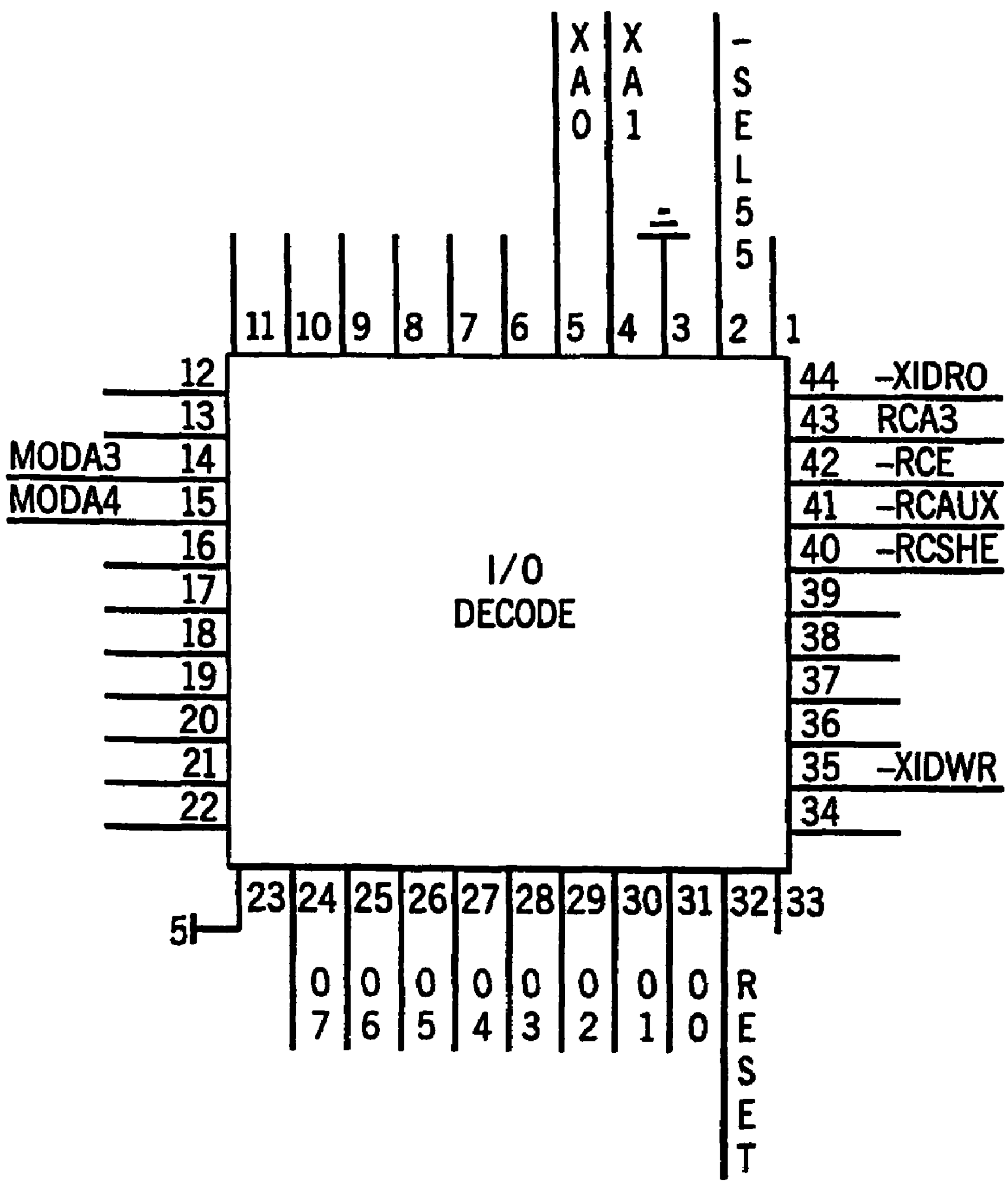
Figures 8, 8D, 9, 10, 11, 12, 13, 14, 15, 16, 17, 18, 19:
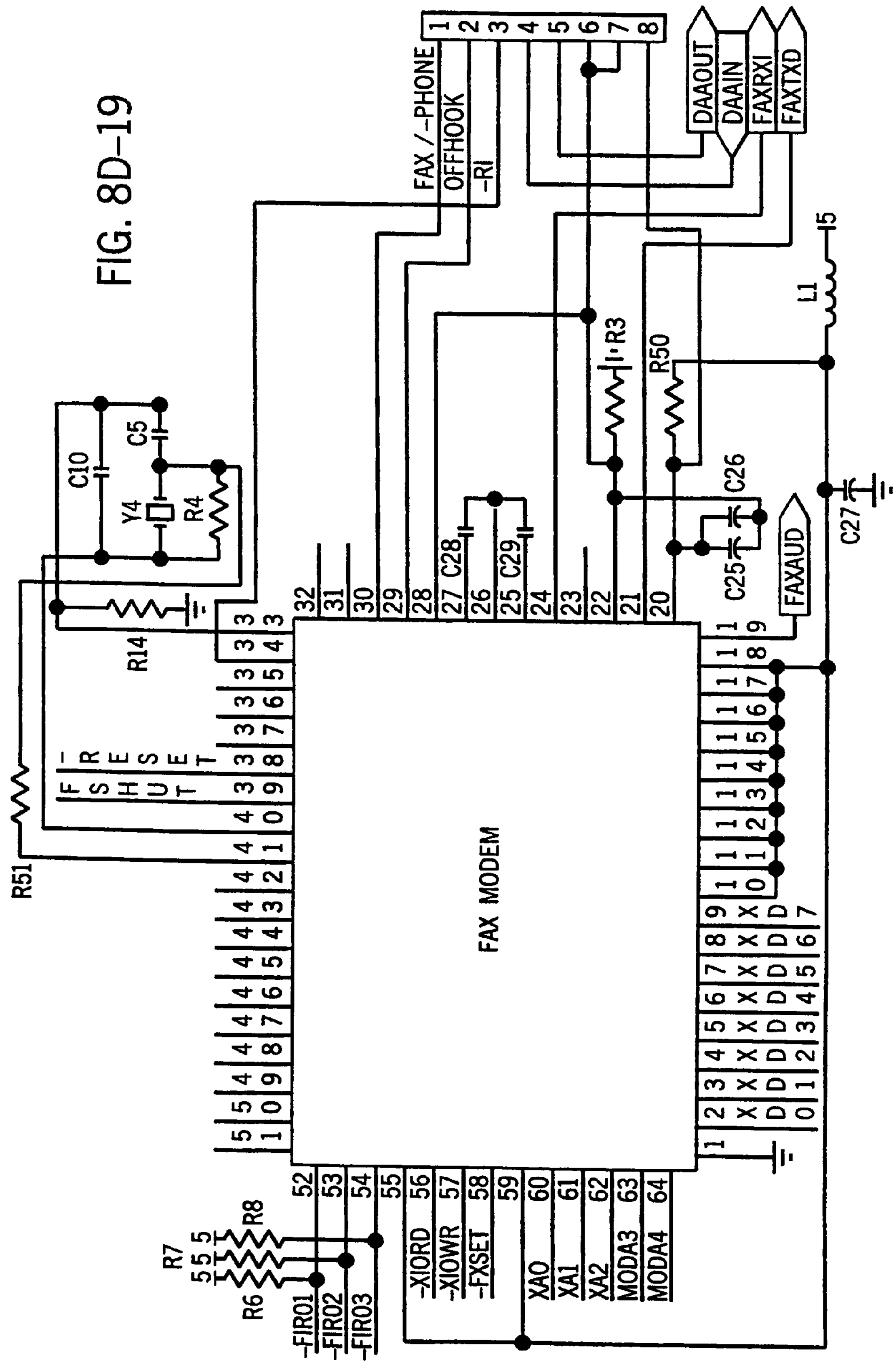
Figures 8, 8D, 9, 10, 11, 12, 13, 14, 15, 16, 17, 18, 19, 20:
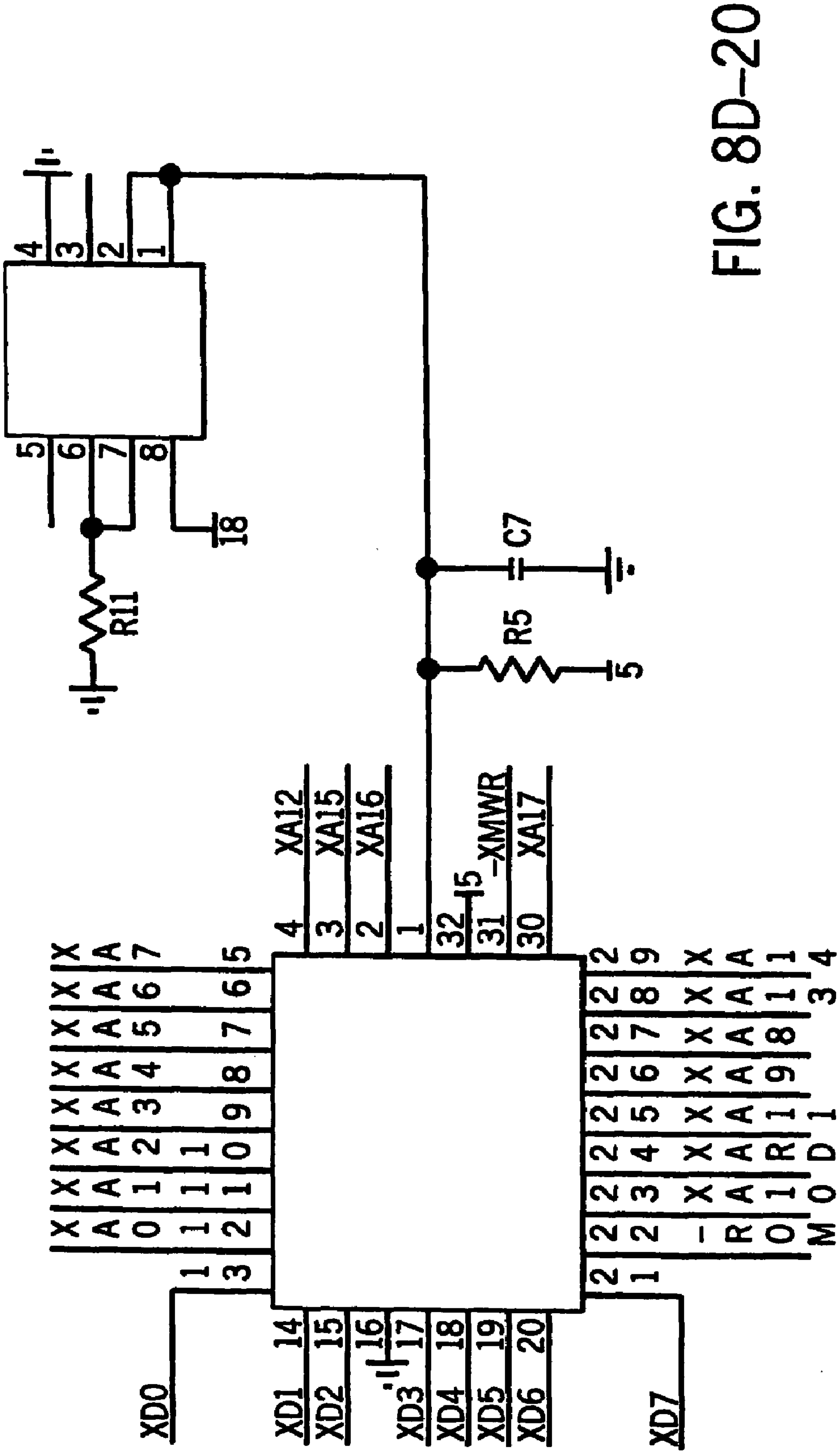
Figures 8, 8D, 9, 10, 11, 12, 13, 14, 15, 16, 17, 18, 19, 20, 21:
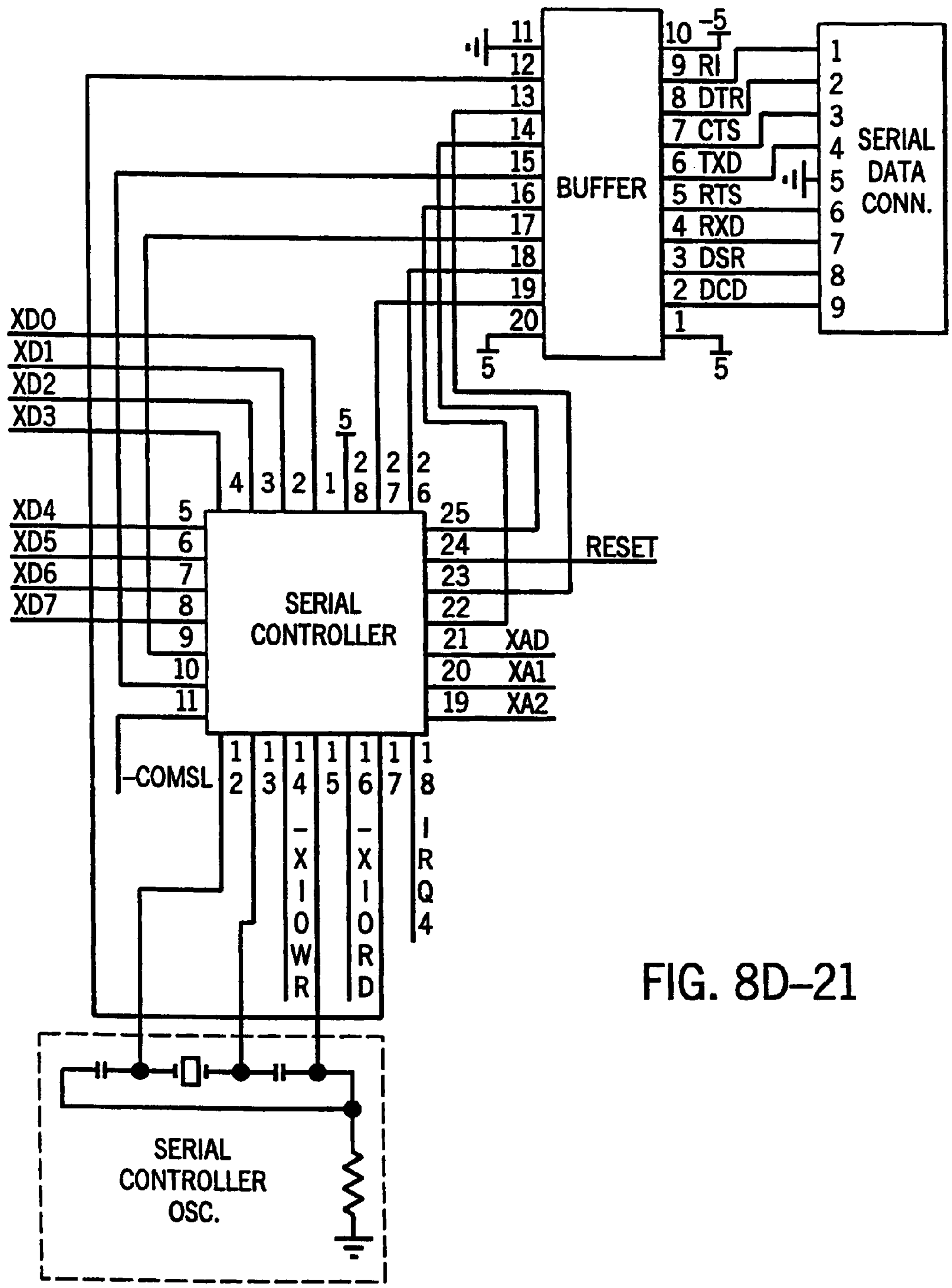
Figures 8, 8D, 9, 10, 11, 12, 13, 14, 15, 16, 17, 18, 19, 20, 21, 22:
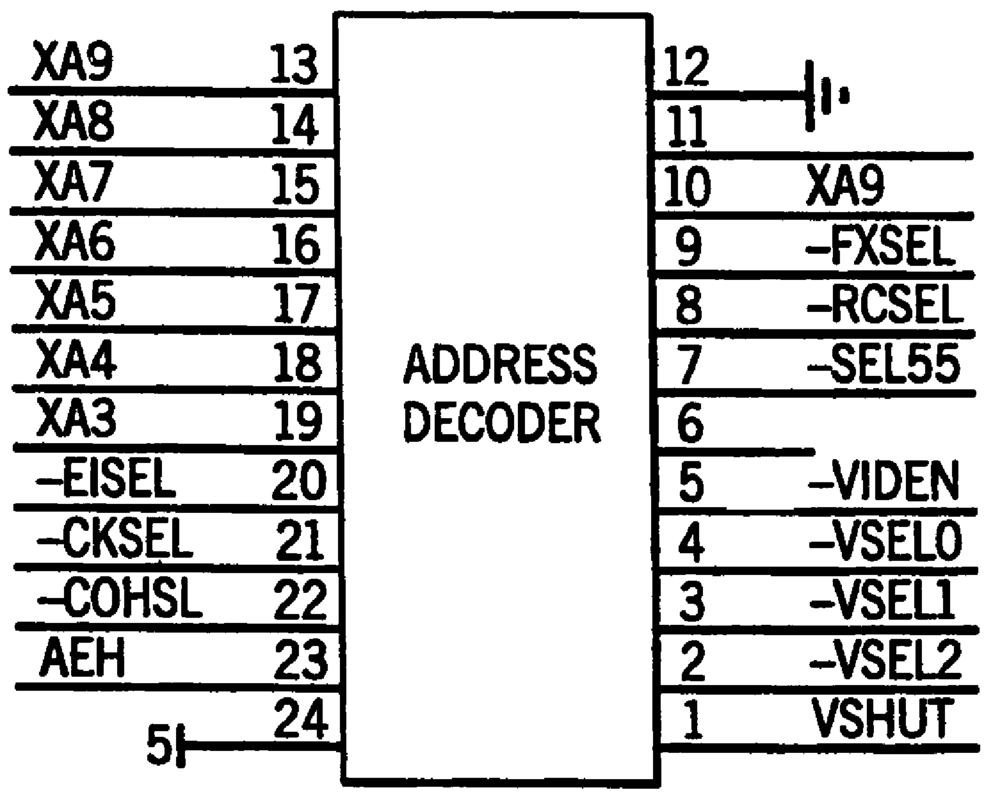
Figures 8, 8D, 9, 10, 11, 12, 13, 14, 15, 16, 17, 18, 19, 20, 21, 22, 23:
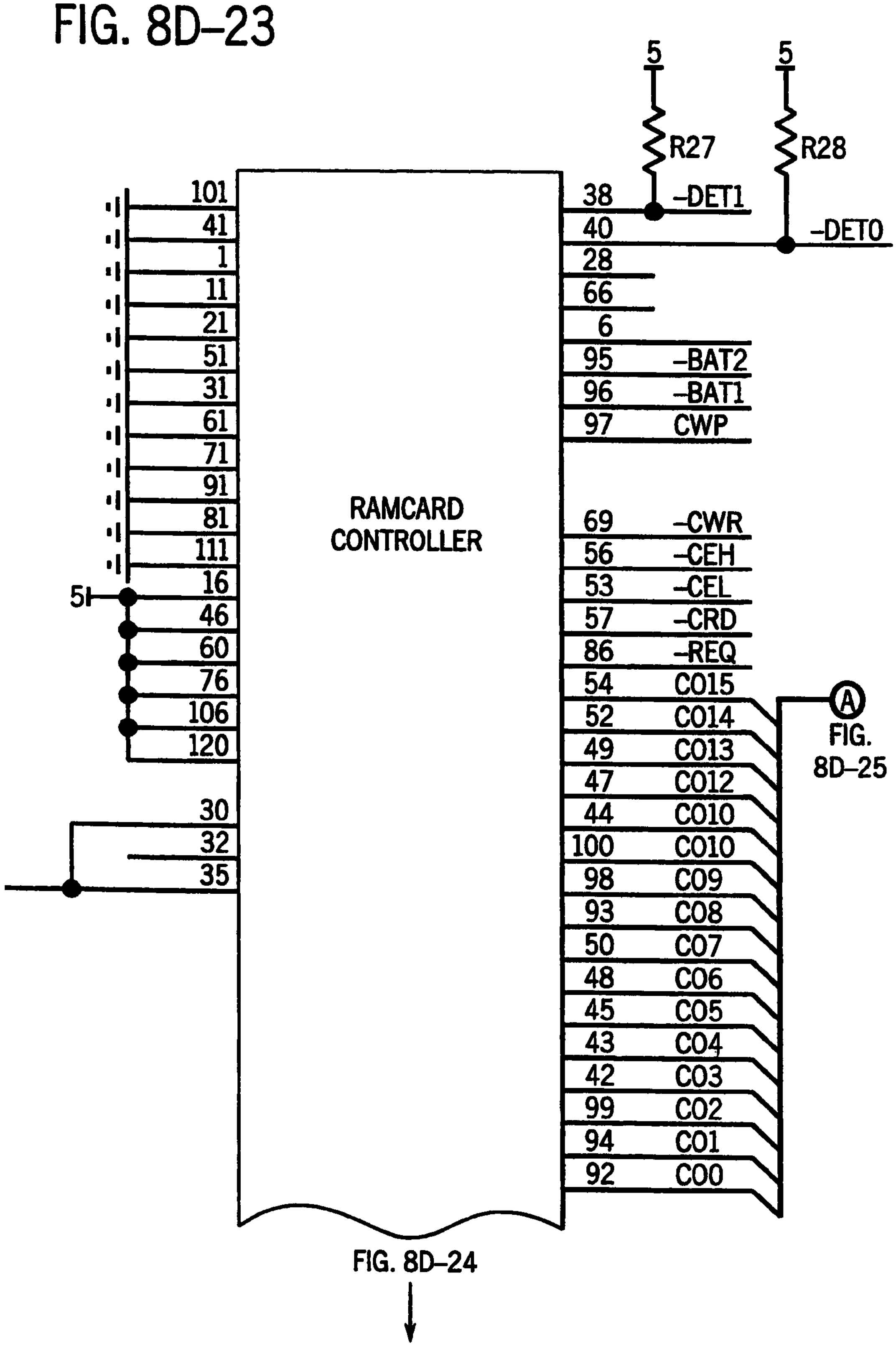
Figures 8, 8D, 9, 10, 11, 12, 13, 14, 15, 16, 17, 18, 19, 20, 21, 22, 23, 24:
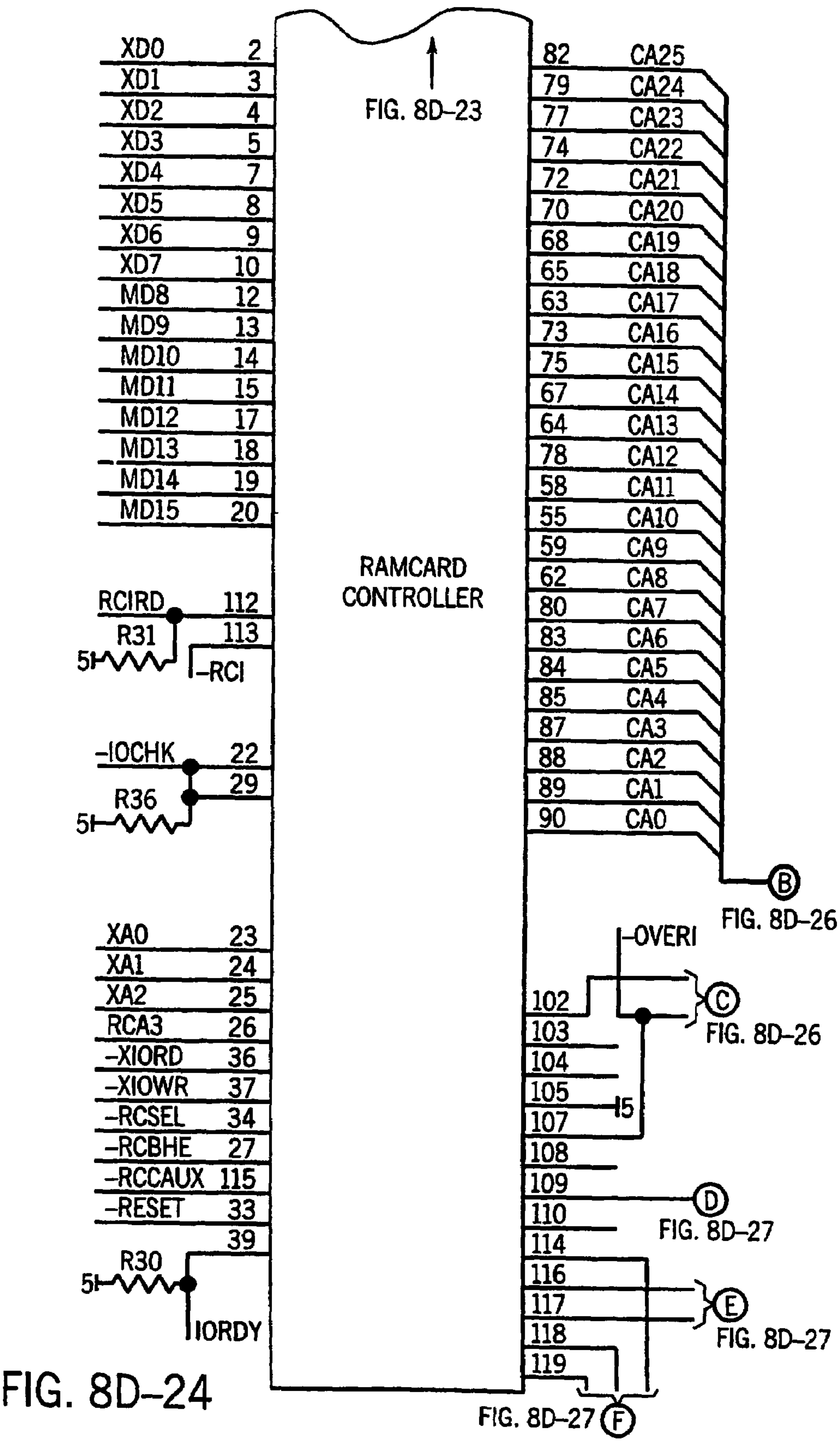
Figures 8, 8D, 9, 10, 11, 12, 13, 14, 15, 16, 17, 18, 19, 20, 21, 22, 23, 24, 25:
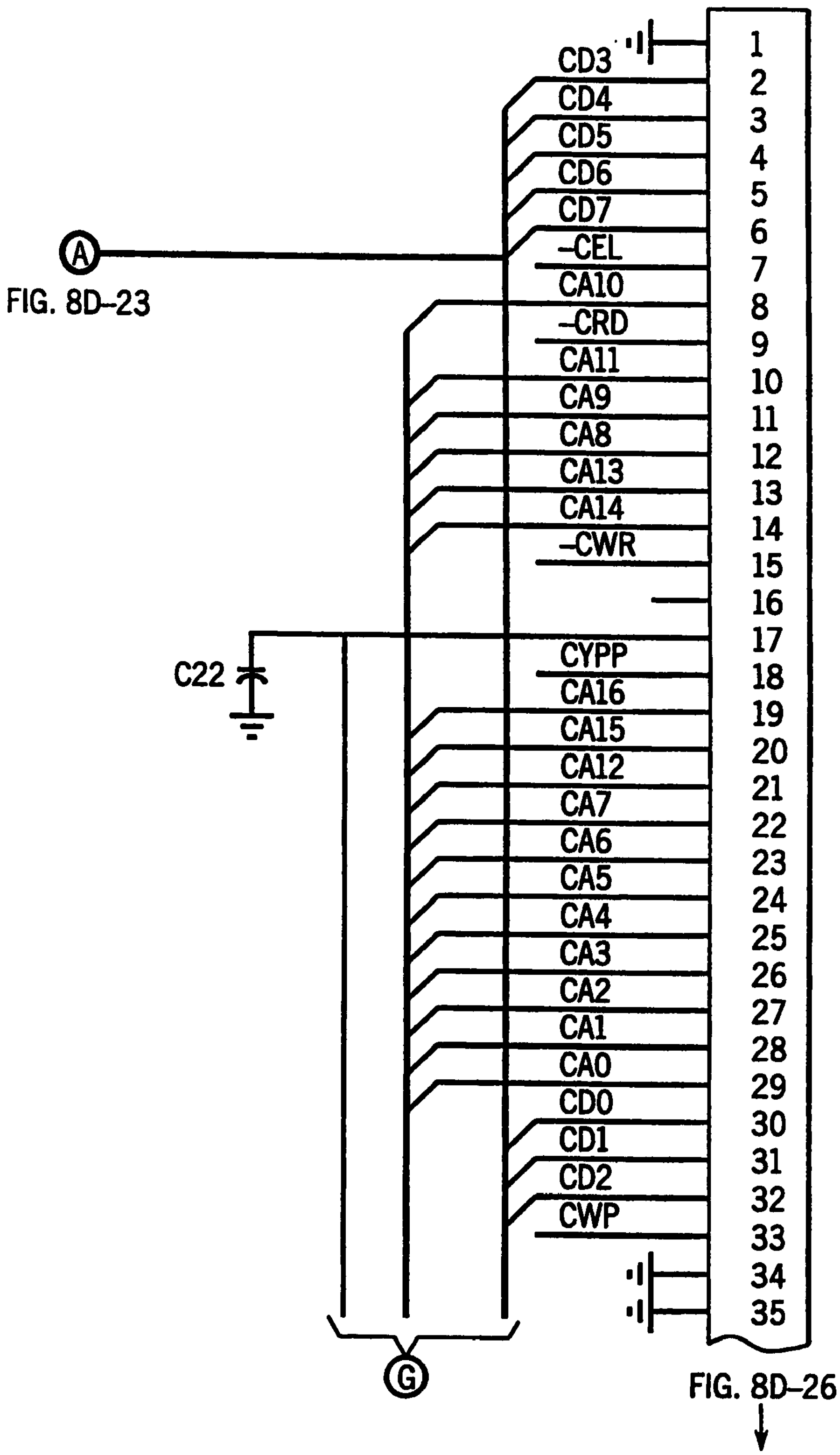
Figures 8, 8D, 9, 10, 11, 12, 13, 14, 15, 16, 17, 18, 19, 20, 21, 22, 23, 24, 25, 26:
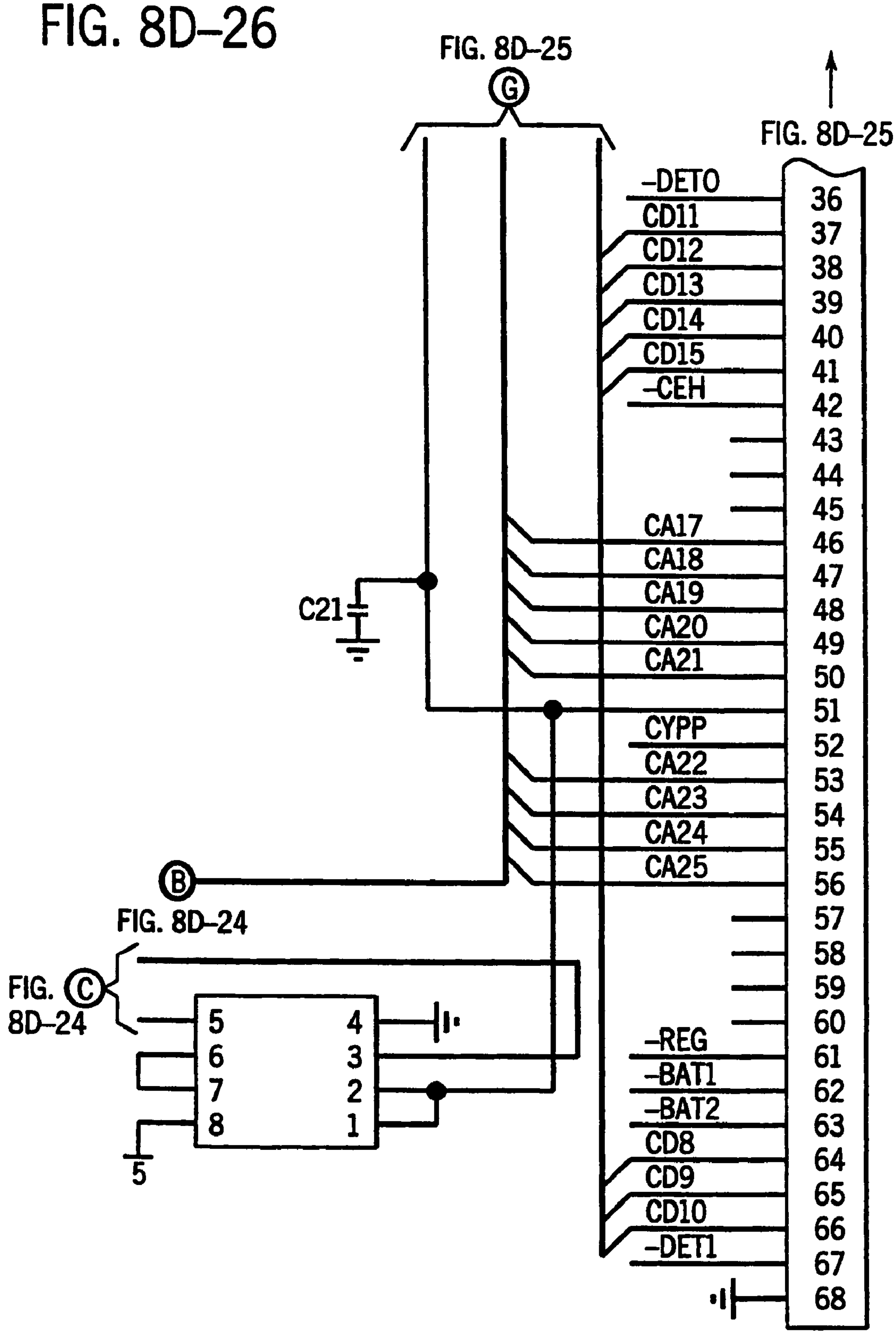
Figures 8, 8D, 9, 10, 11, 12, 13, 14, 15, 16, 17, 18, 19, 20, 21, 22, 23, 24, 25, 26, 27:
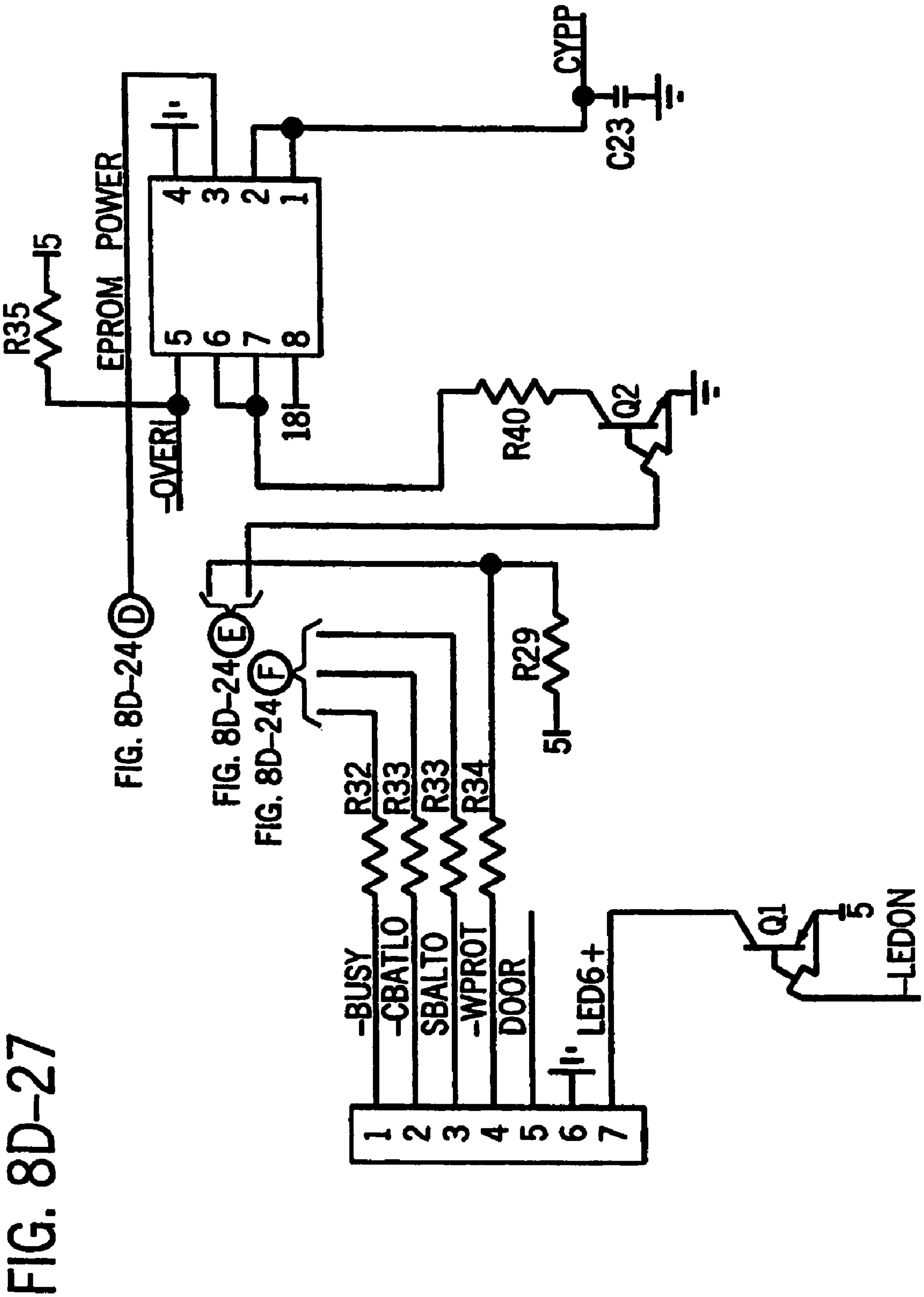
Figures 8, 8D, 9, 10, 11, 12, 13, 14, 15, 16, 17, 18, 19, 20, 21, 22, 23, 24, 25, 26, 27, 28:
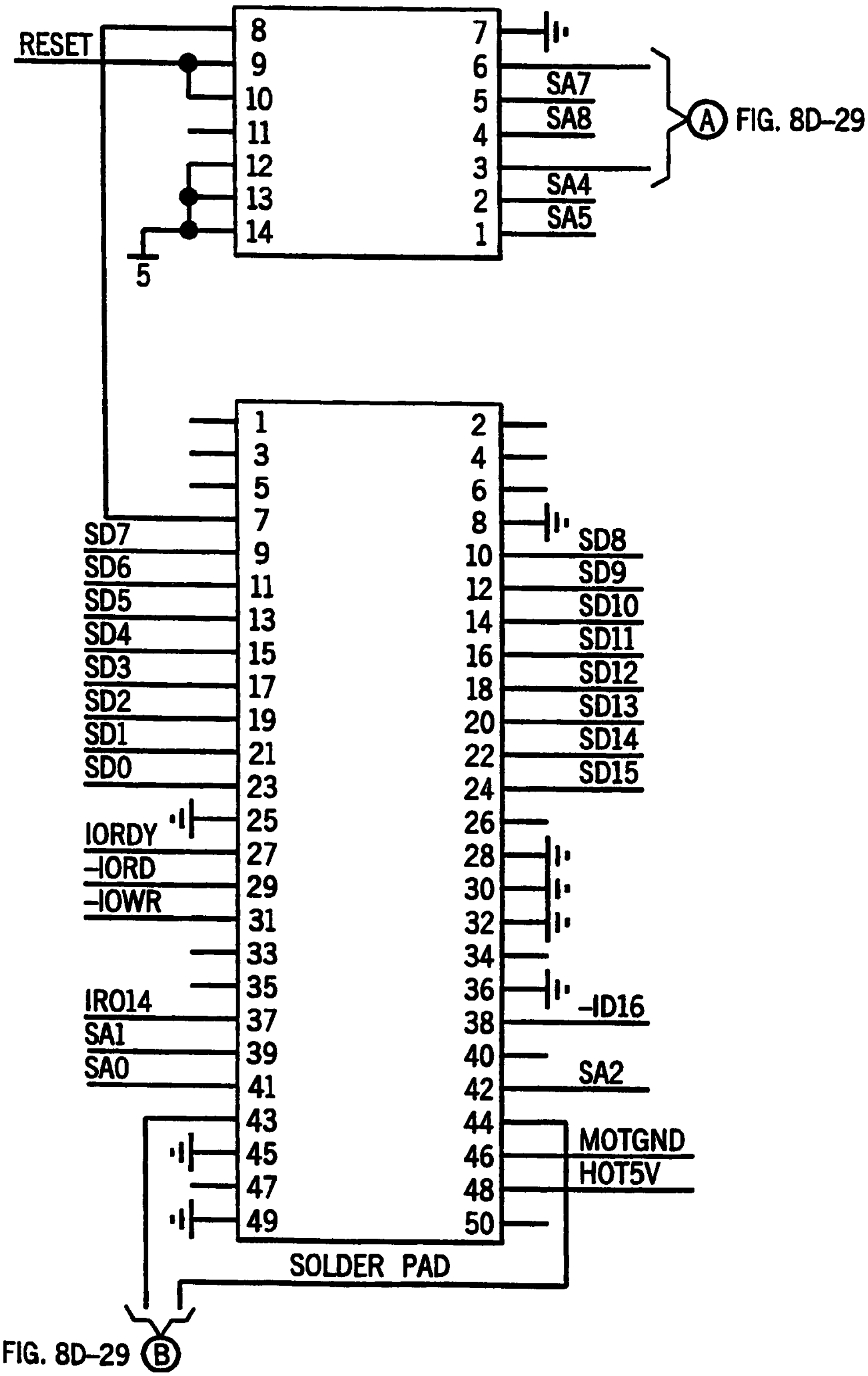
Figures 8, 8D, 9, 10, 11, 12, 13, 14, 15, 16, 17, 18, 19, 20, 21, 22, 23, 24, 25, 26, 27, 28, 29, 30:
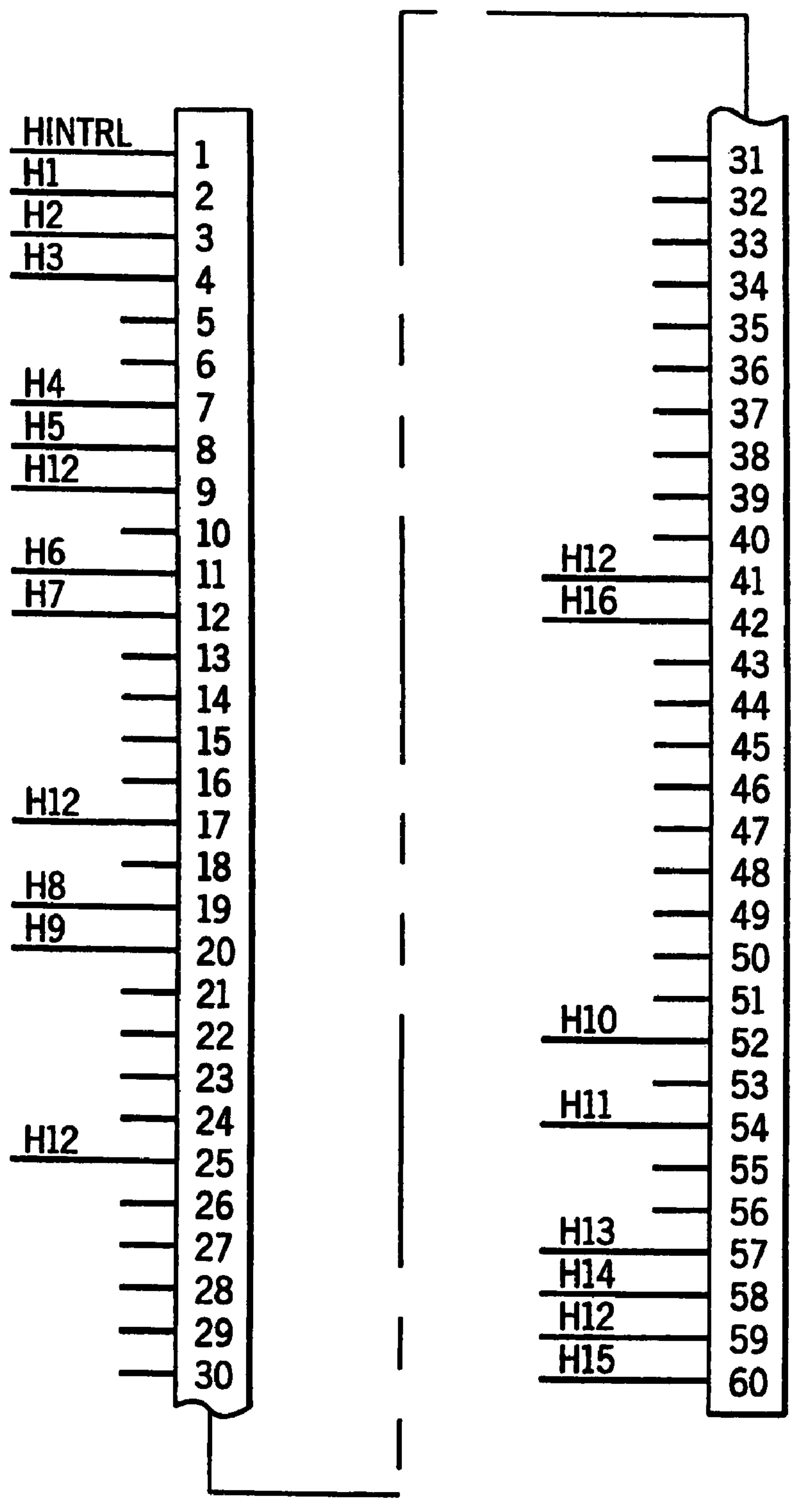
Figures 1, 8E:
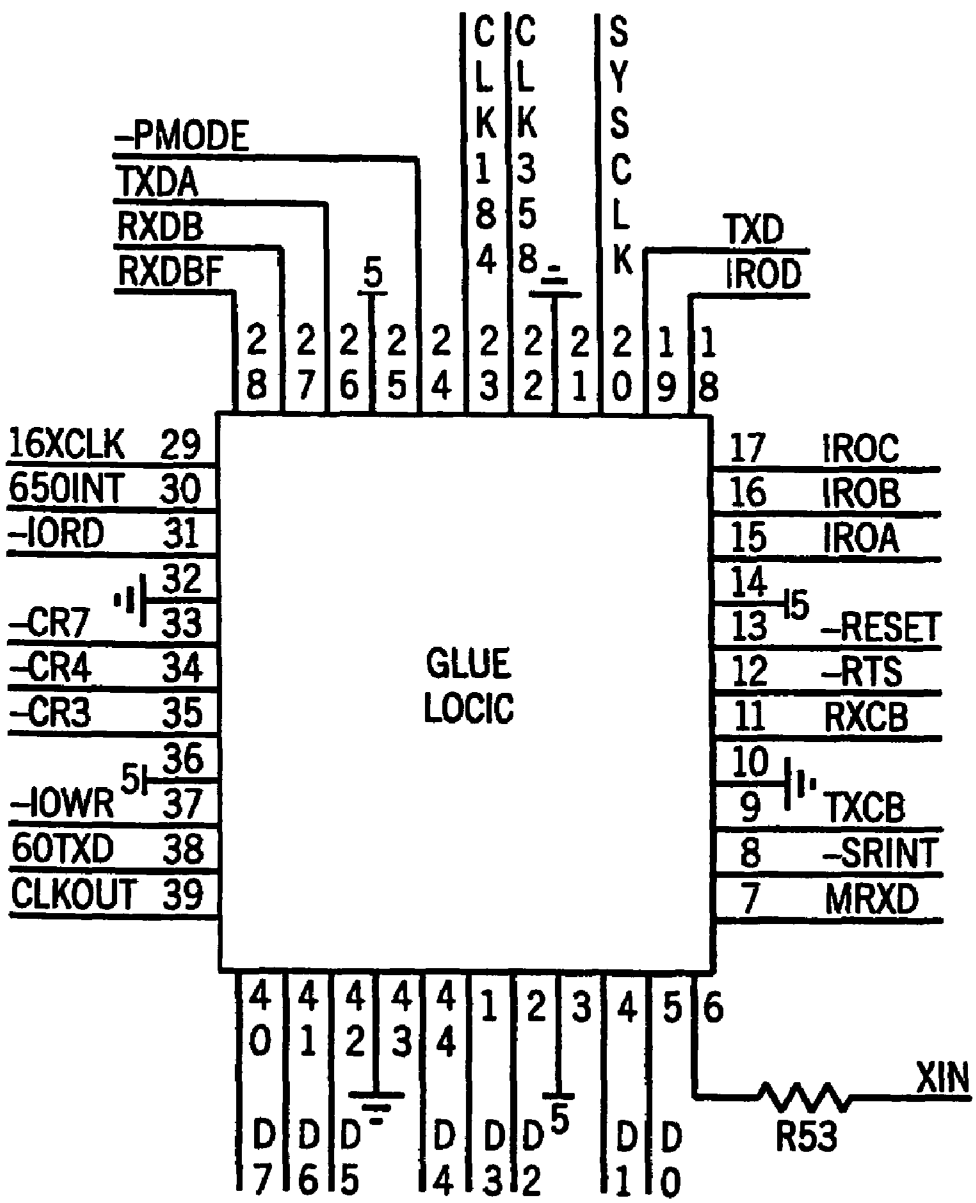
Figures 2, 8E:
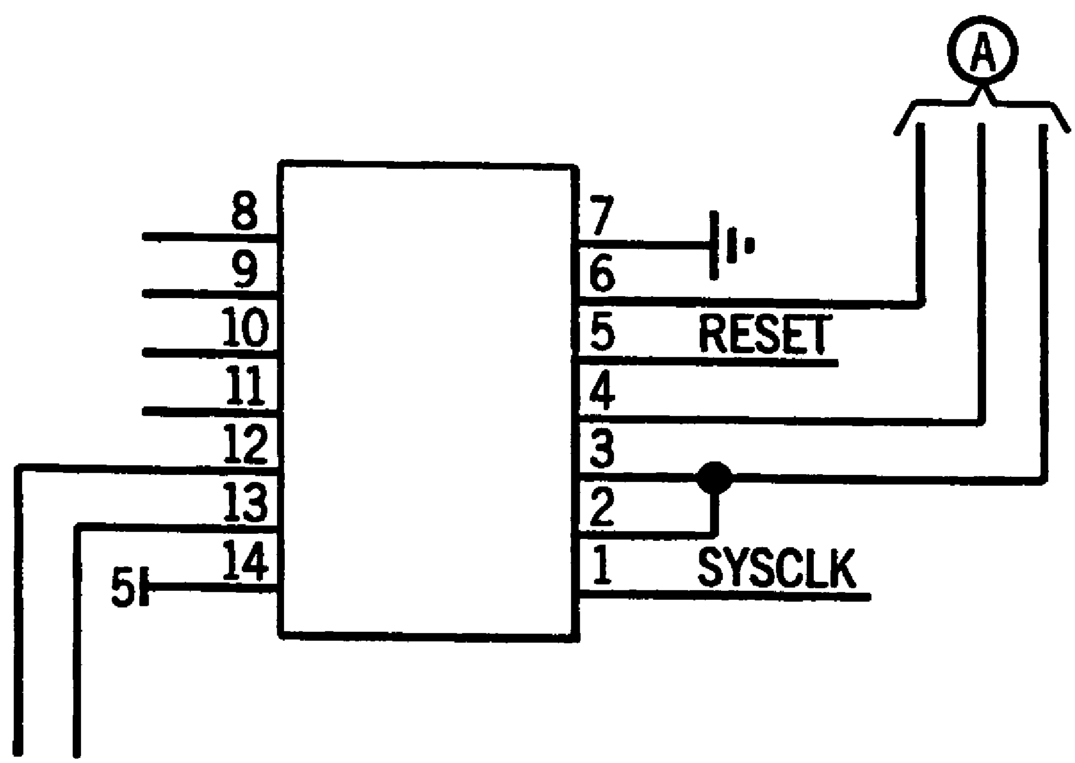
Figures 3, 8E:
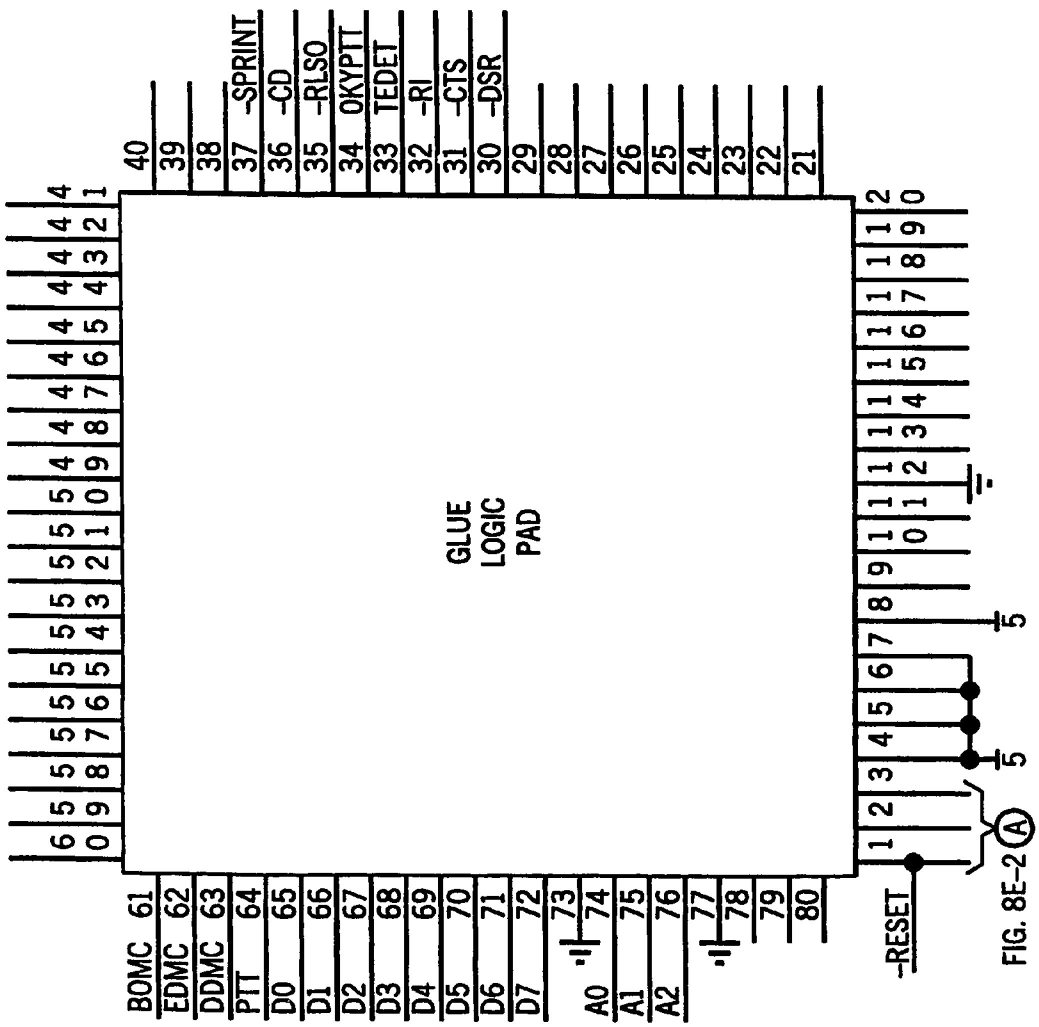
Figures 4, 8E:
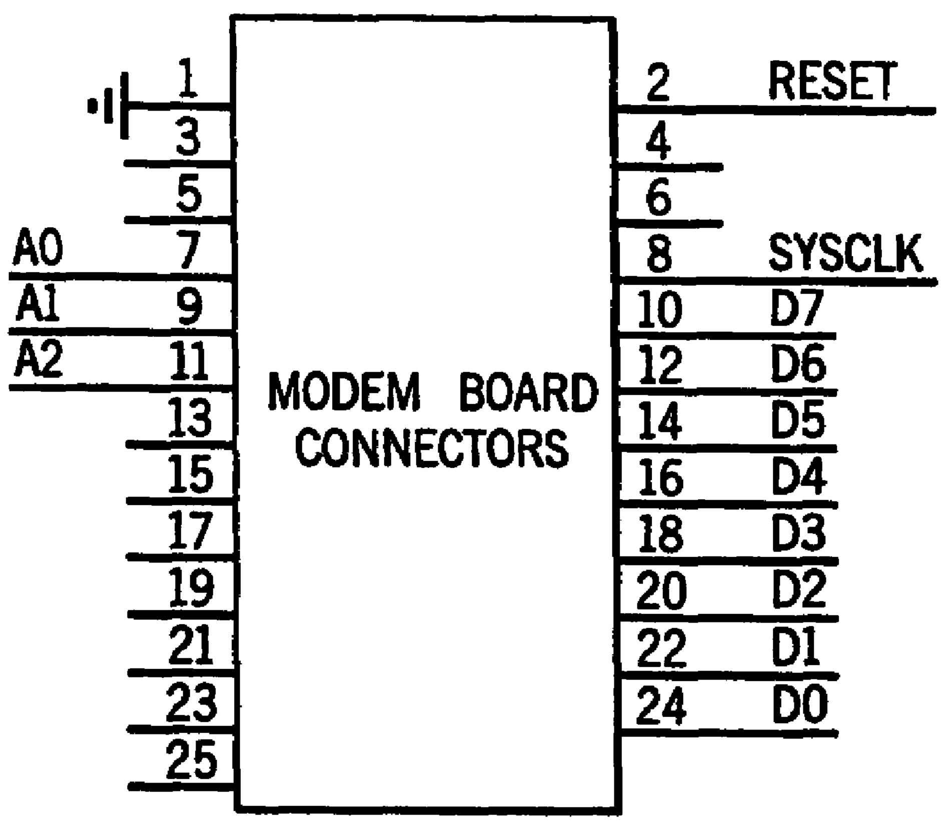
Figures 5, 8E:
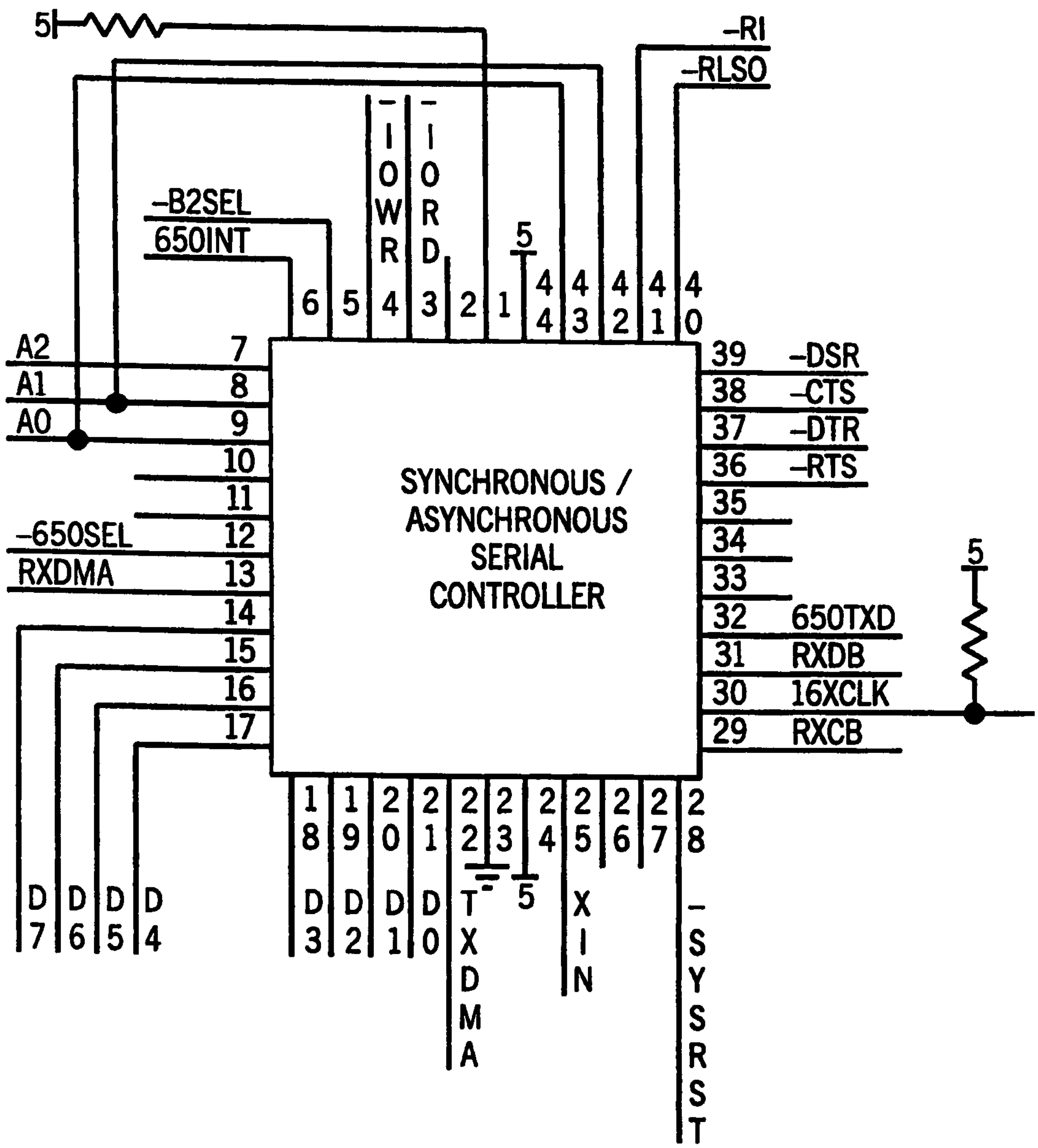
Figures 6, 8E:
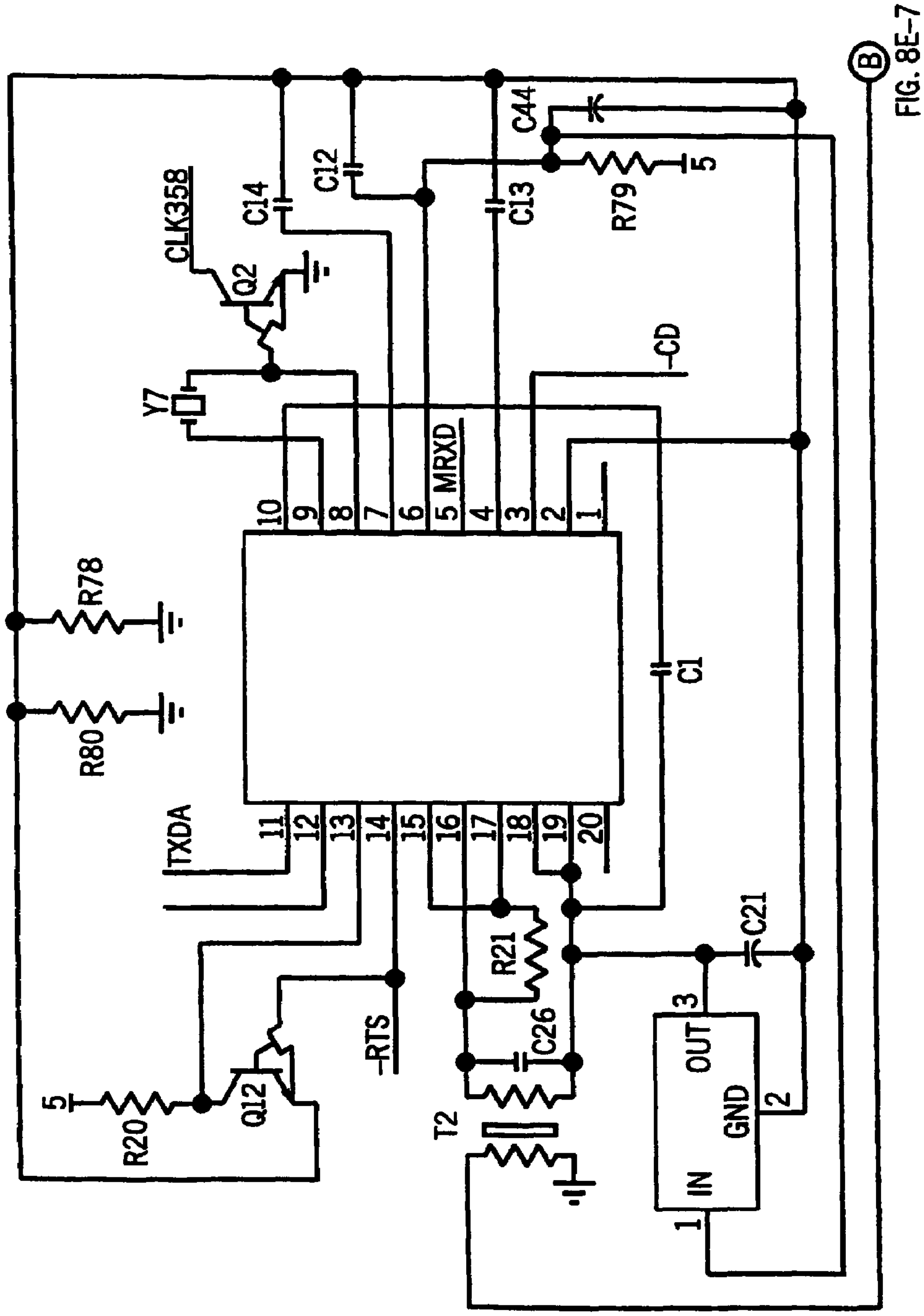
Figures 7, 8E:
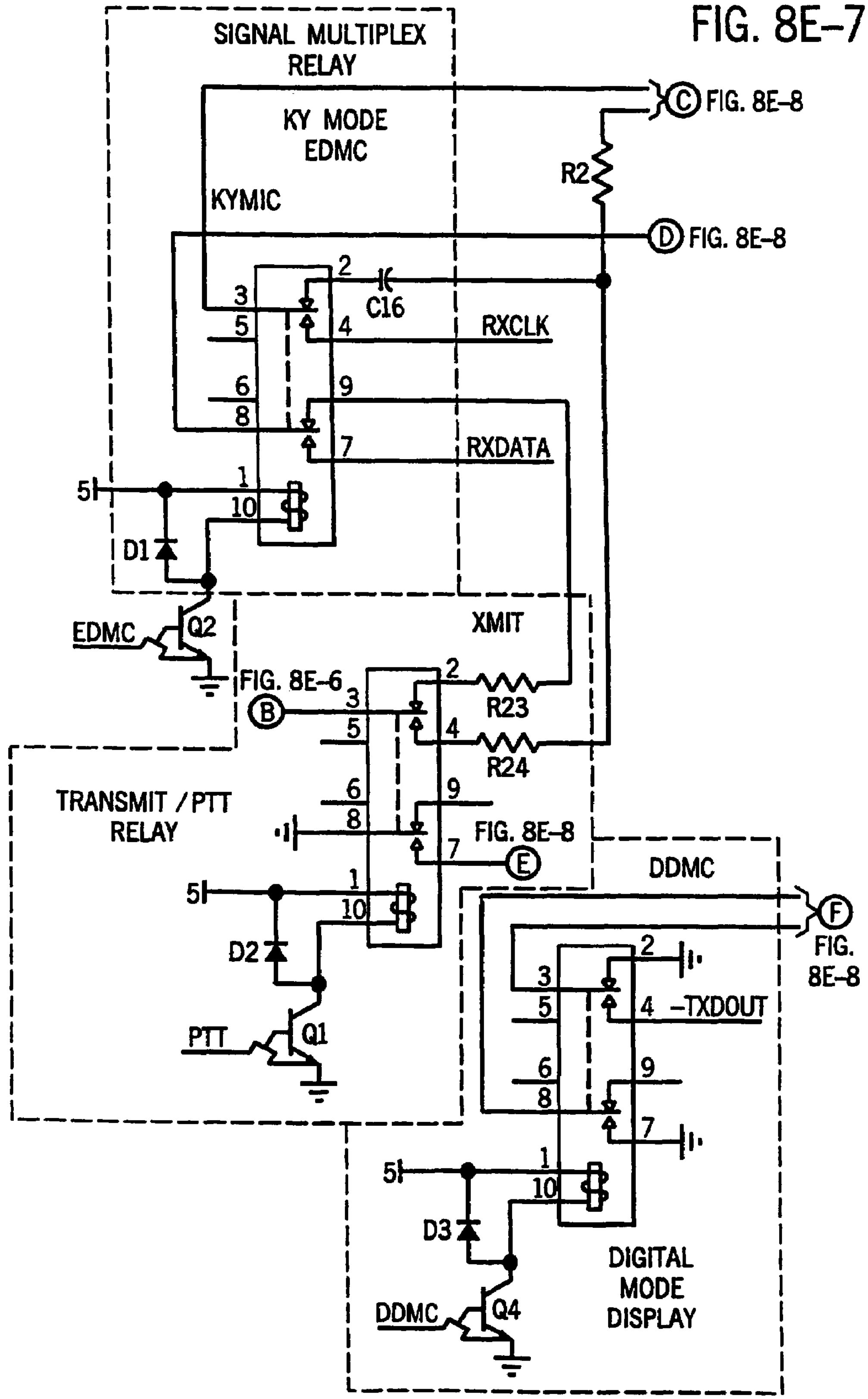
Figures 8, 8E:
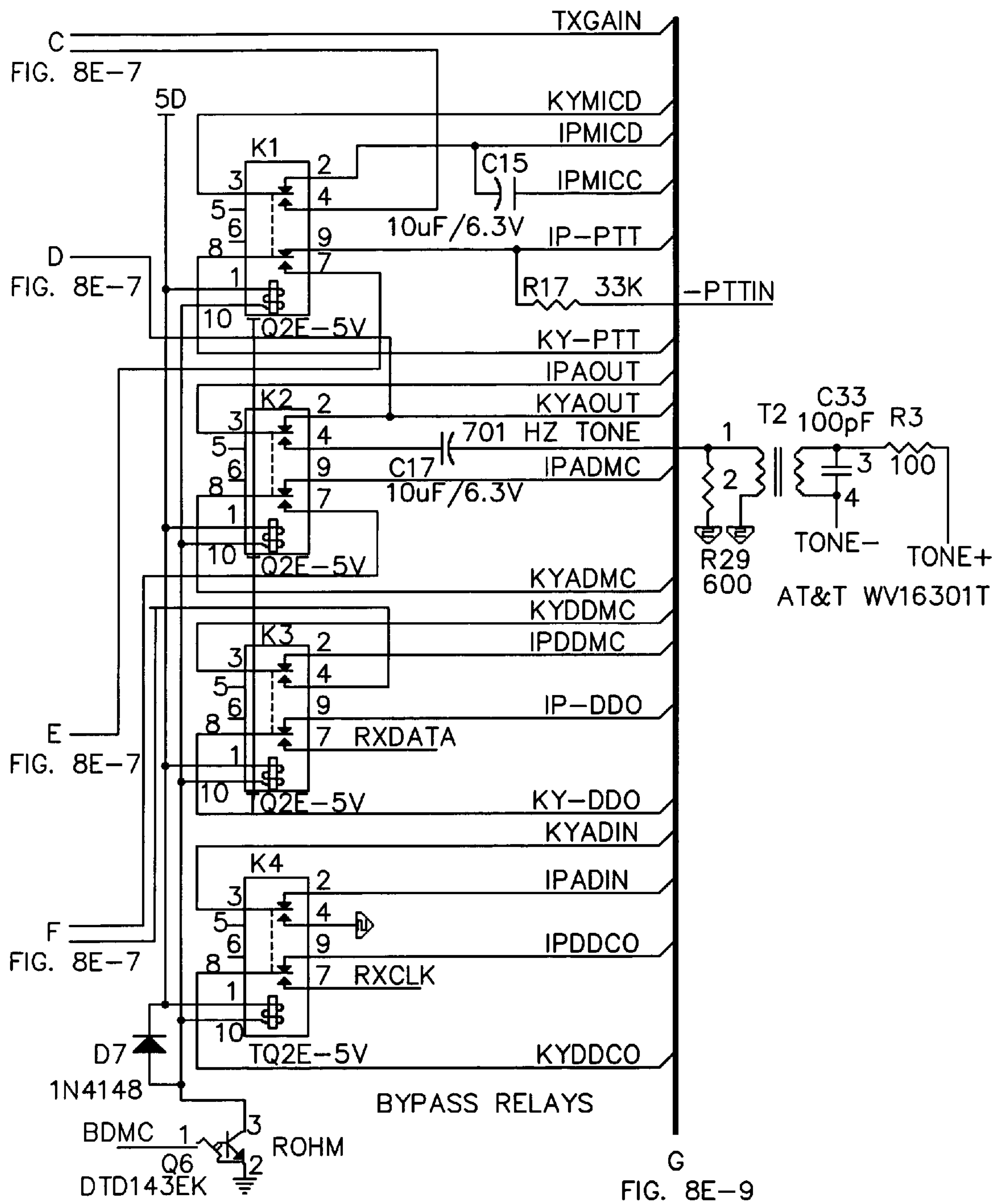
Figures 8, 8E, 9:
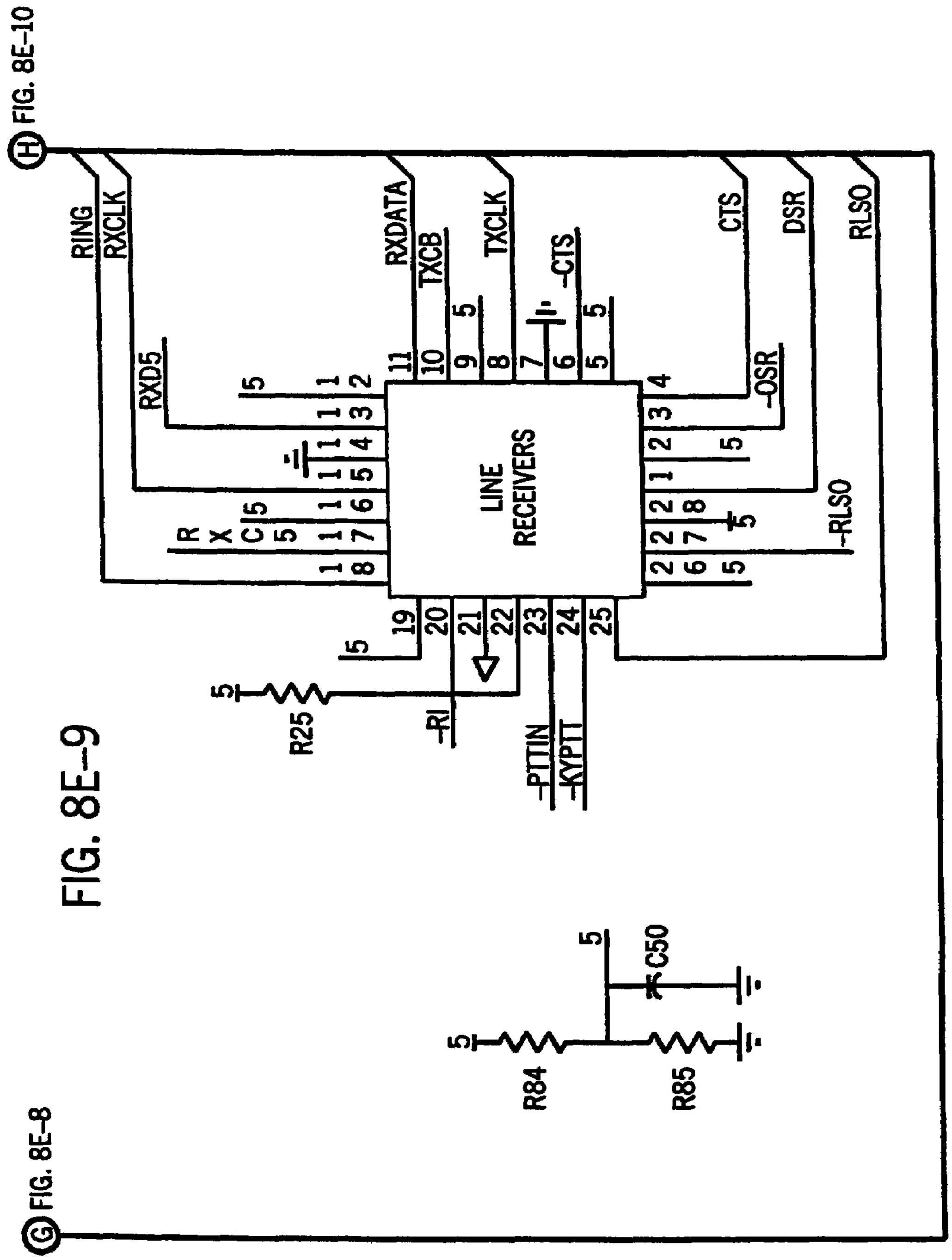
Figures 8, 8E, 9, 10:
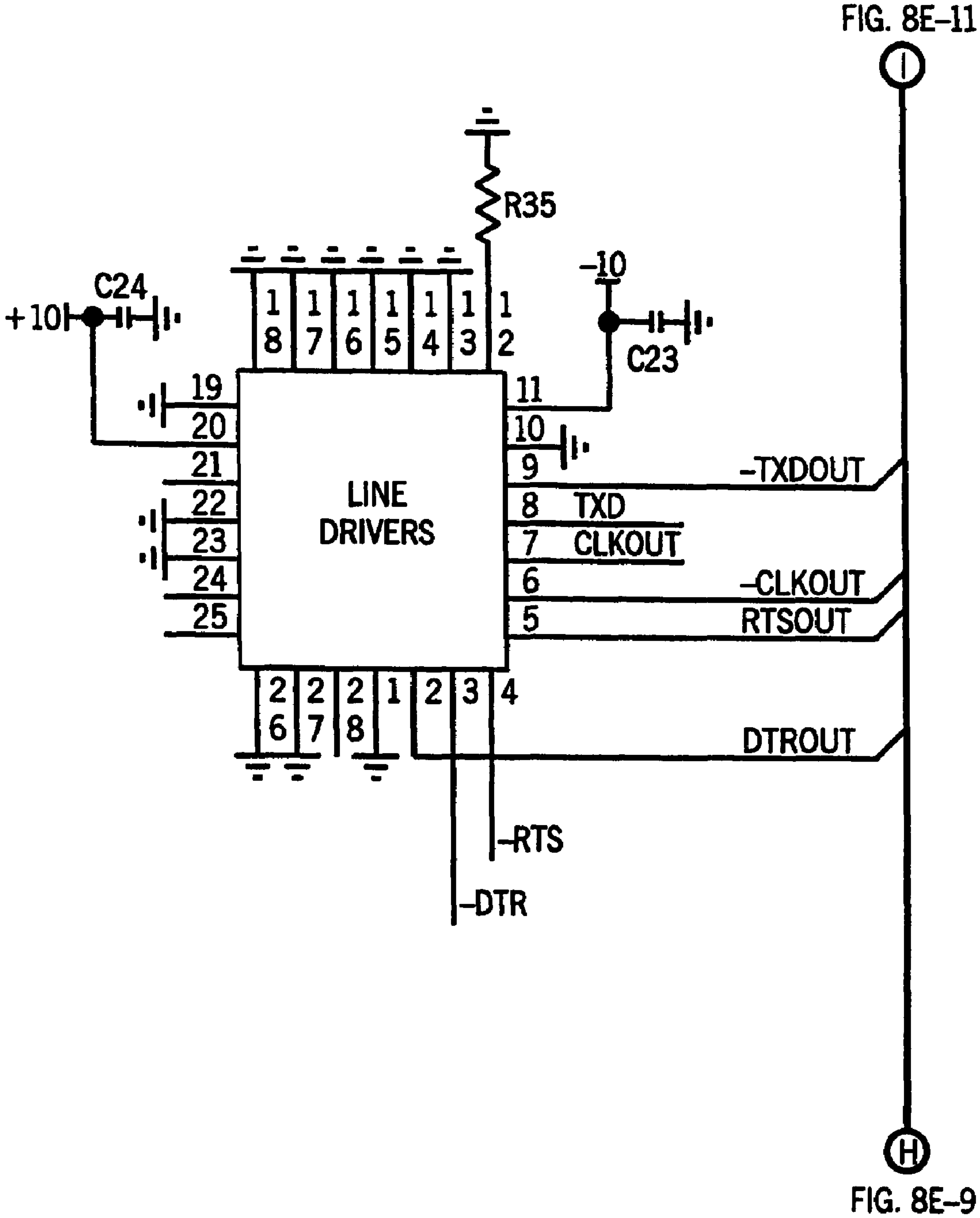
Figures 8, 8E, 9, 10, 11:
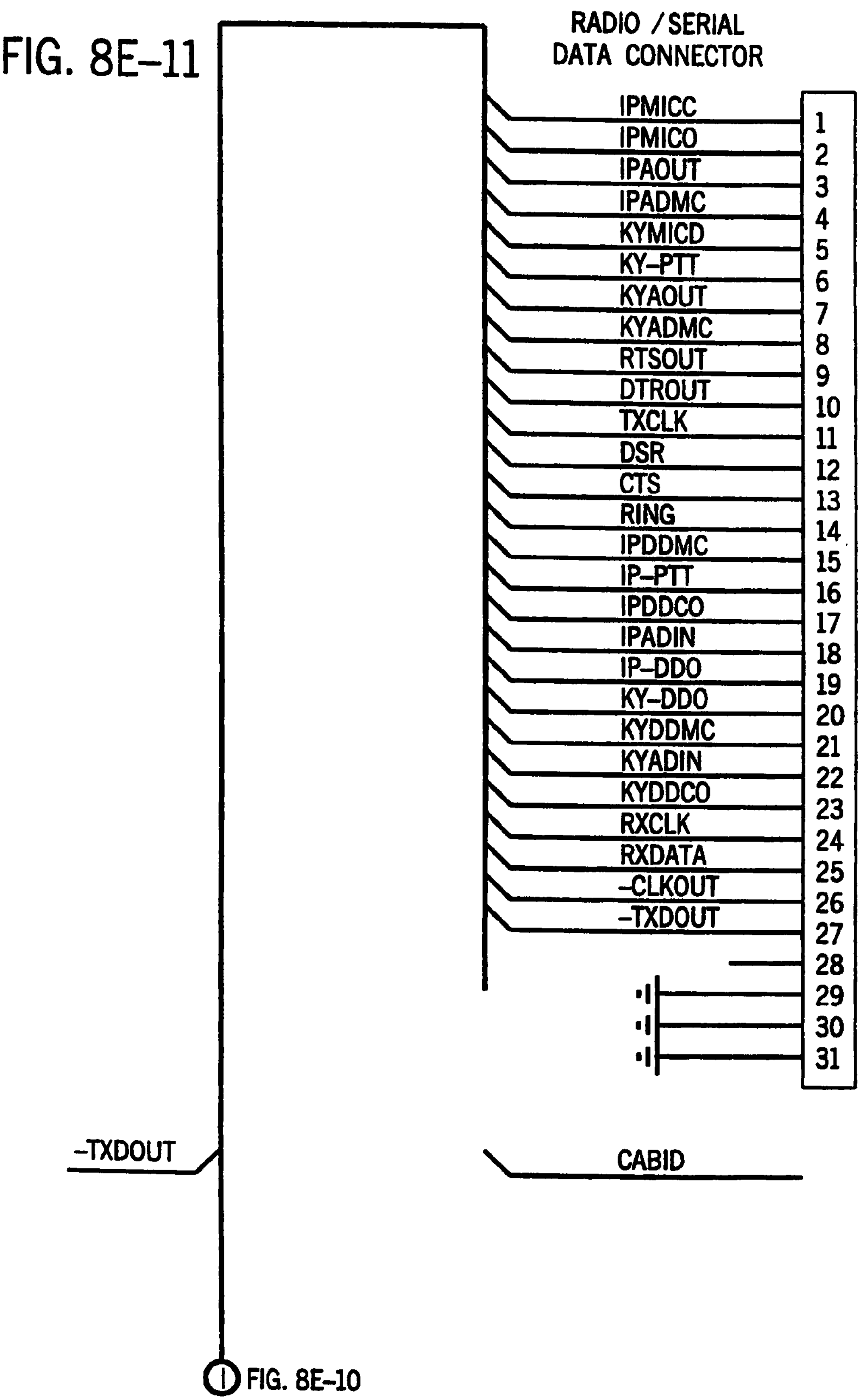
Figures 8, 8E, 9, 10, 11, 12:
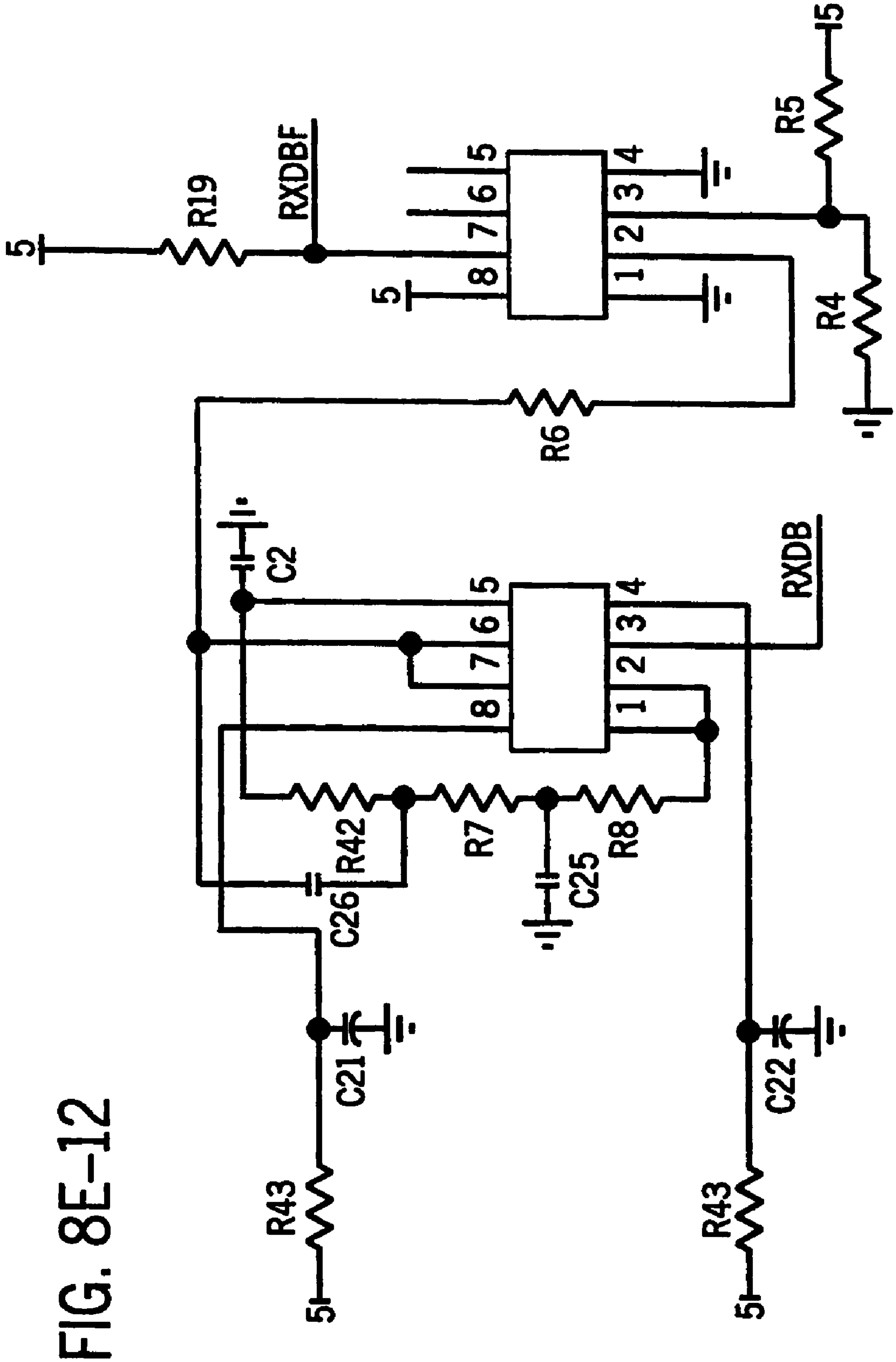
Figure 8F:
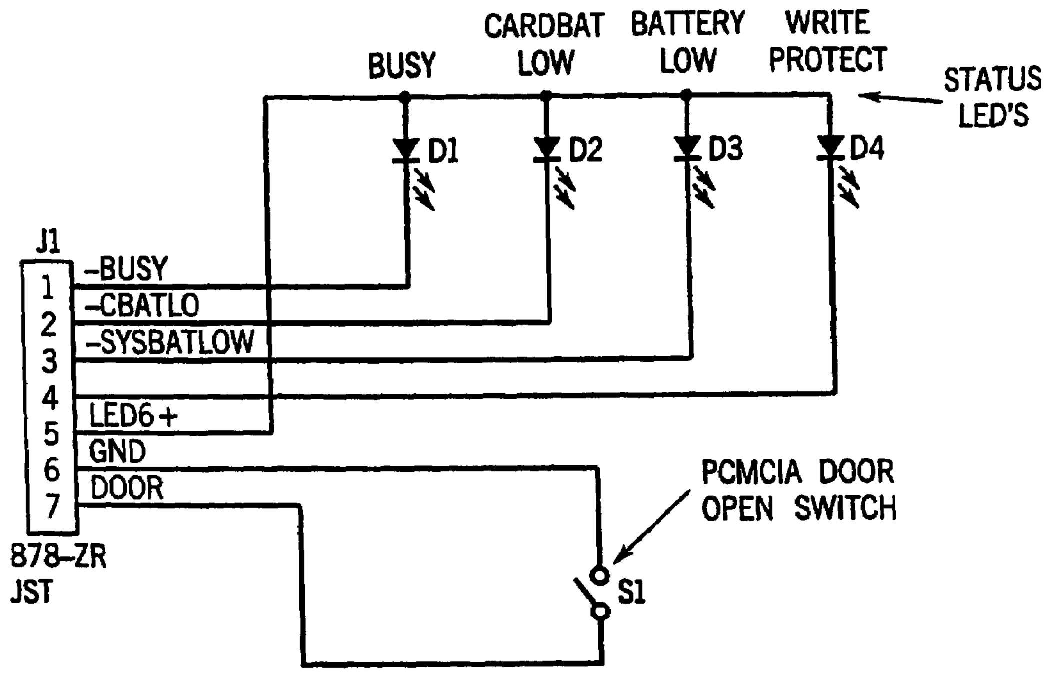
Figure 8G:
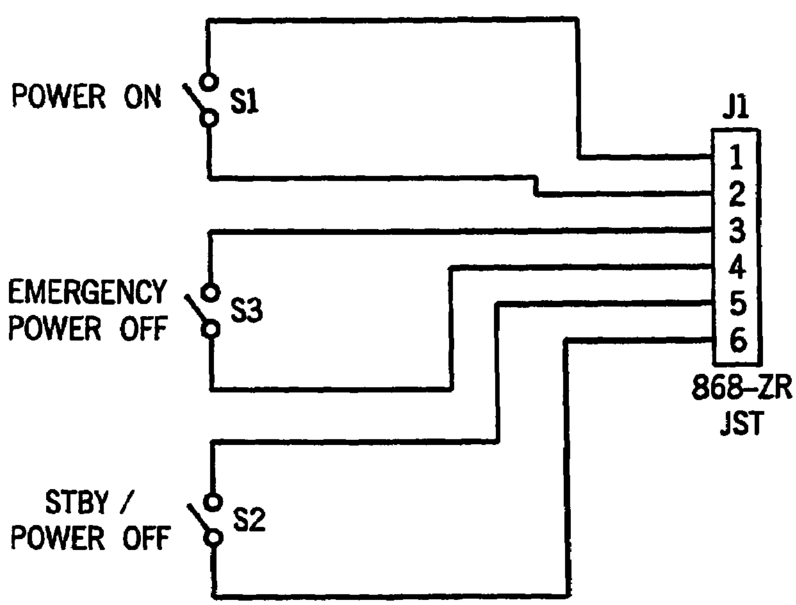
Figures 1, 8L:
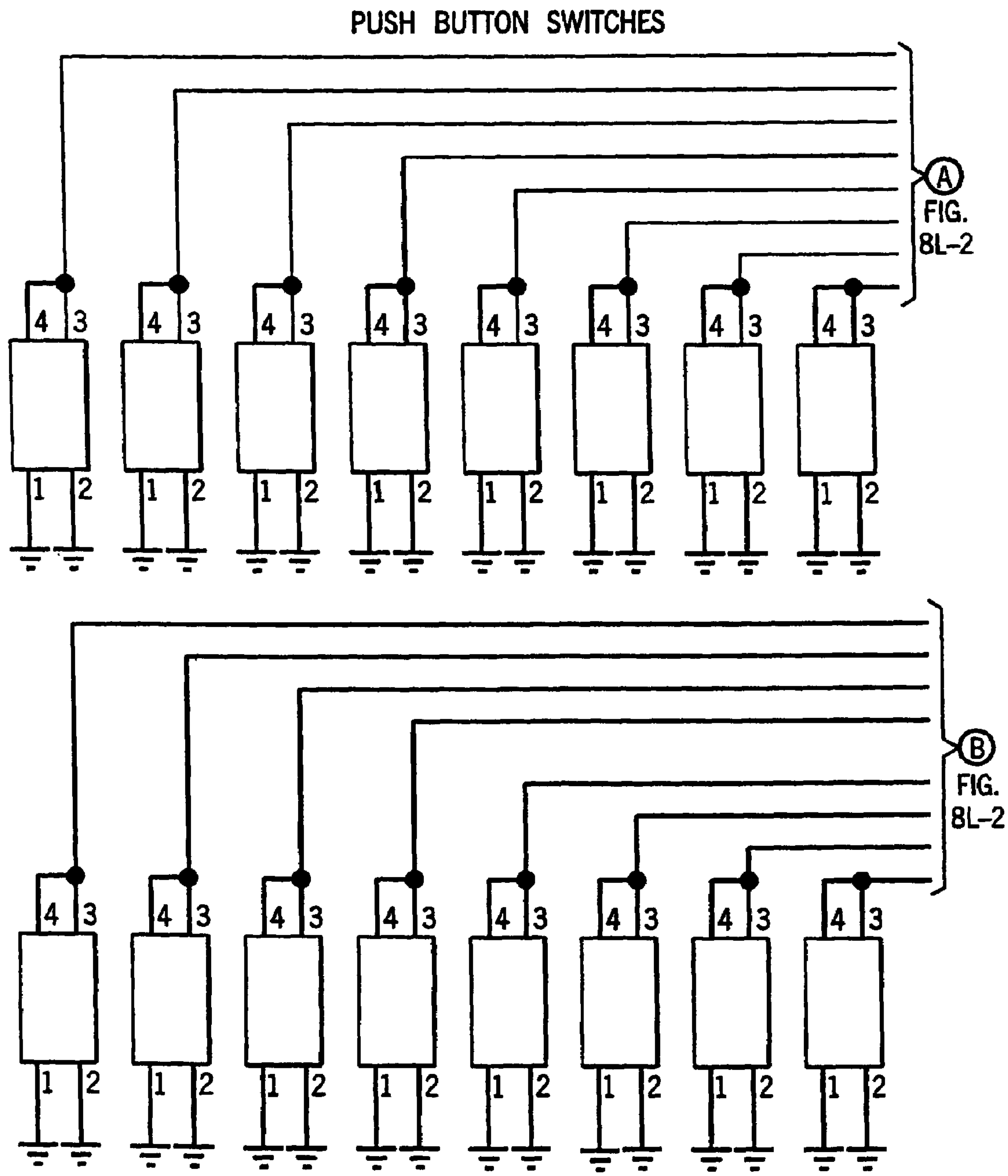
Figures 2, 8L:
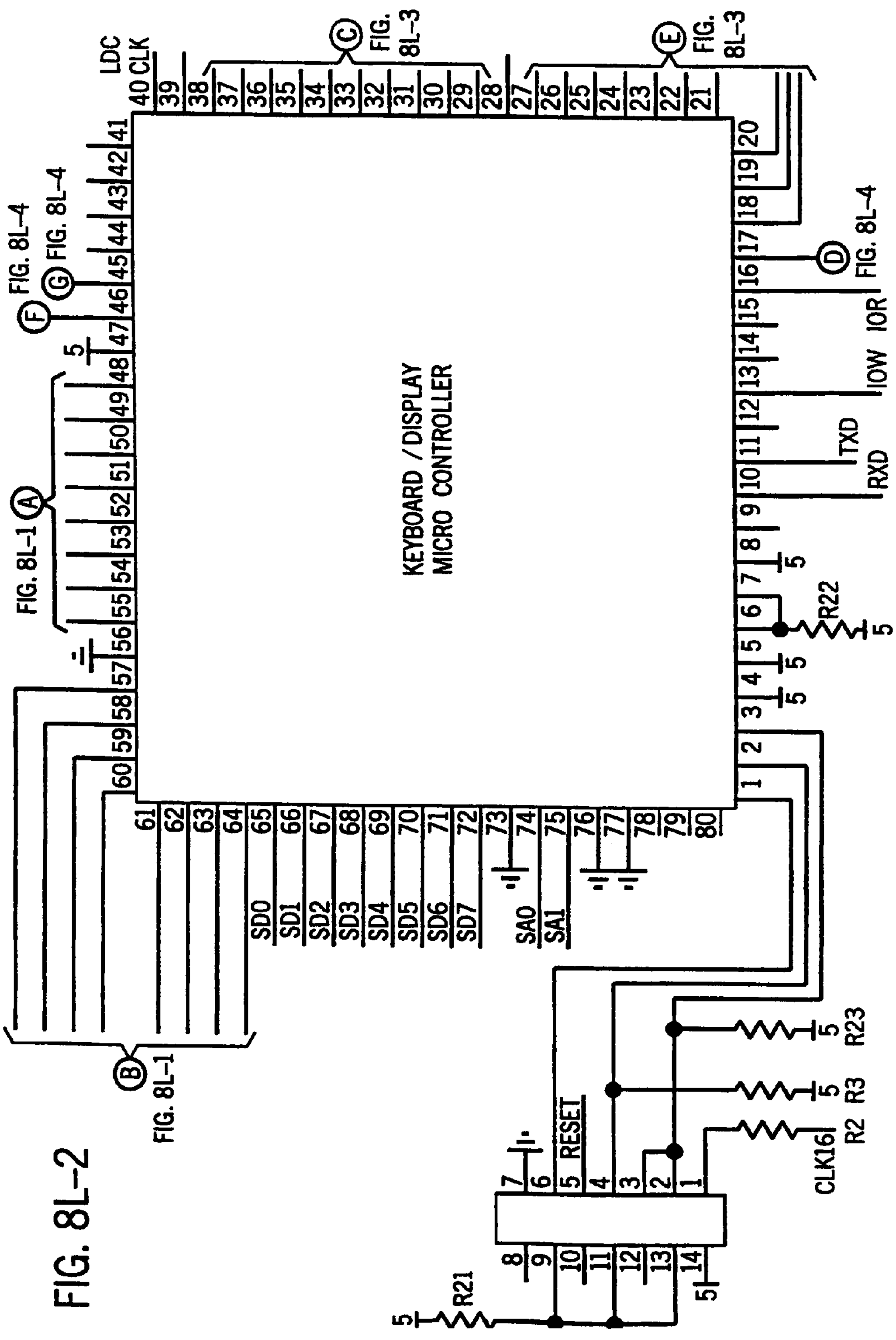
Figures 3, 8L:
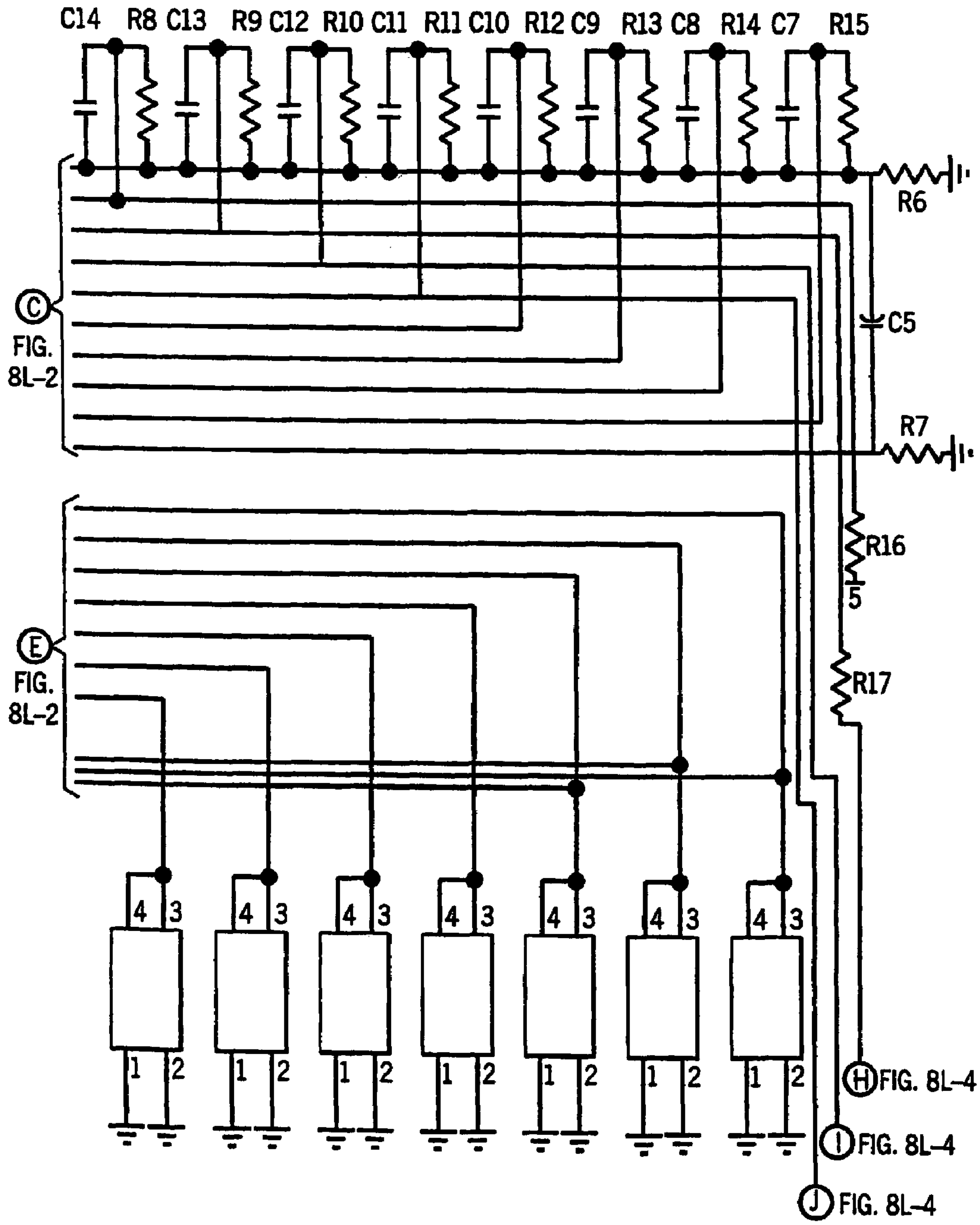
Figures 4, 8L:
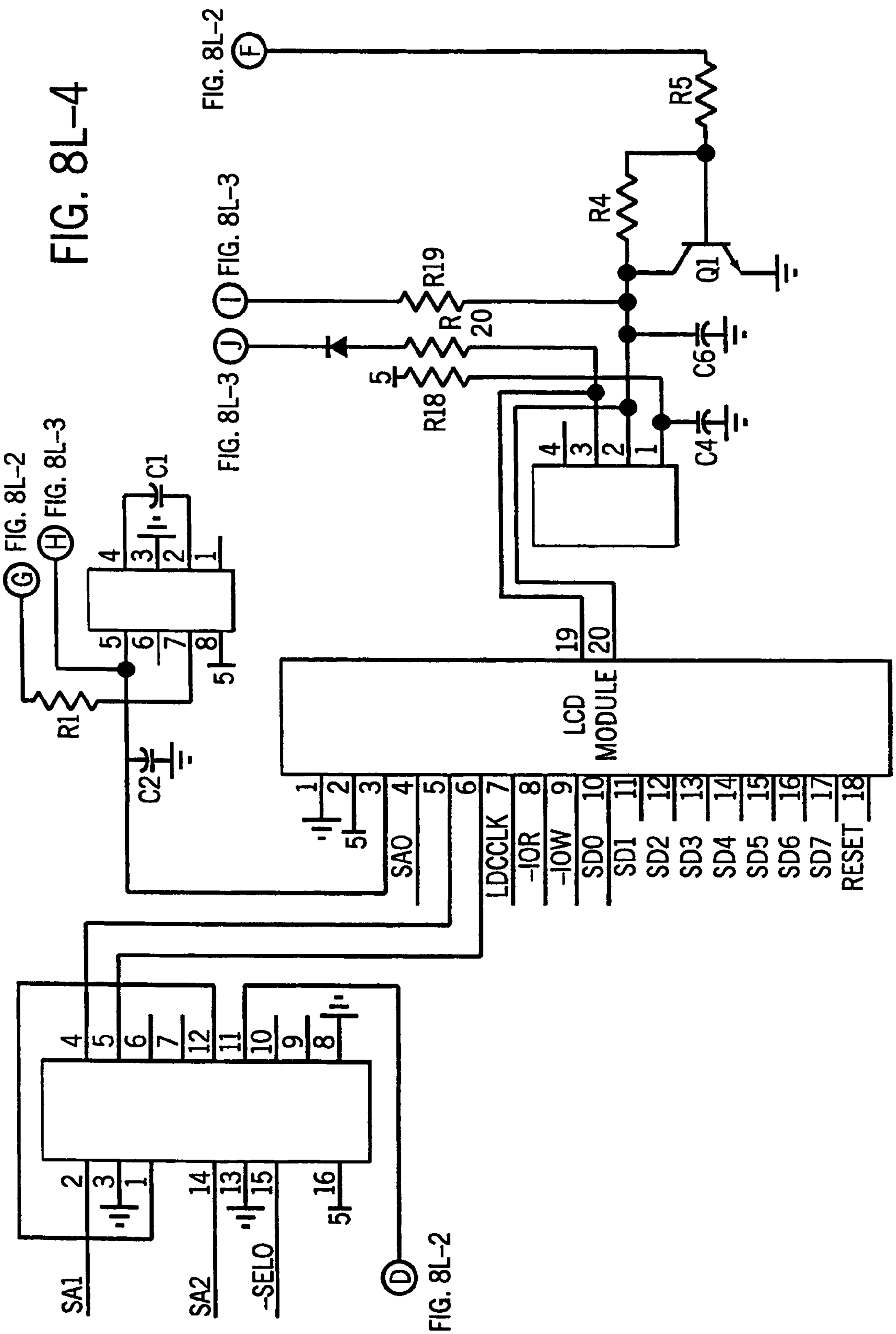
Figures 5, 8L:
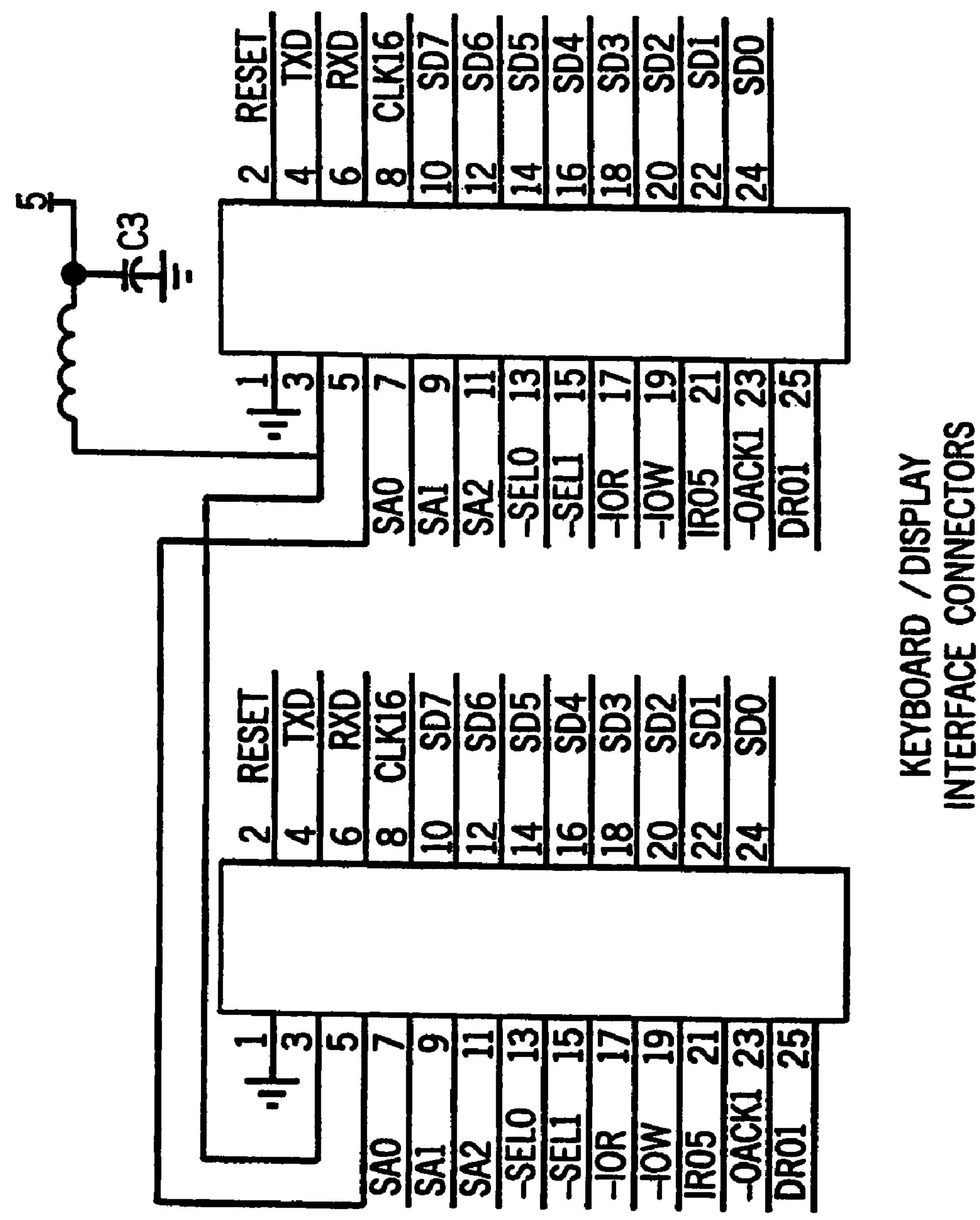
Figure 9:
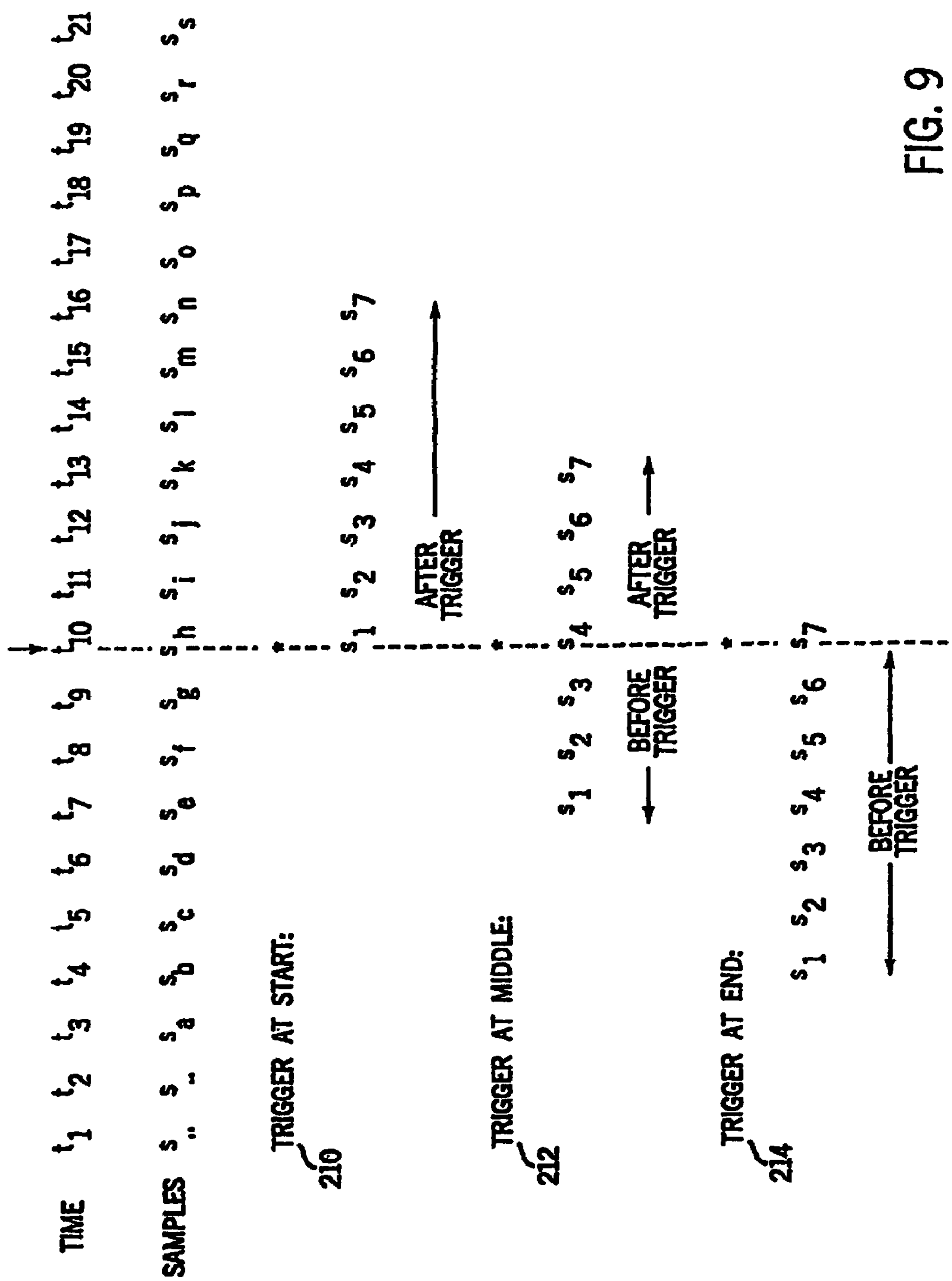
FIG. 9 is a diagram of the various triggering sequence options.

Circular sampling techniques are supported by a data capture system according to embodiments. FIG. 9 is a diagram illustrating exemplary sampling techniques in accordance with the teachings of the disclosure. As shown in FIG. 9, the time sequence is indicated by the Time Line: t1, t2 . . . tn, with a sample at each time interval, as indicated by S1 . . . Sn. For purposes of illustration, the triggering event occurs at time interval t10. Based on the predetermined programming of the system, images will start to be collected upon triggering event, as shown at 210, for a predetermined period prior to and after trigger, as shown at 212, or immediately preceding the trigger, as shown at 214. This permits "circular image storage" without requiring that all images be collected and stored in order to look at events surrounding a triggering event. Circular sampling techniques are also very useful when multiple overlapping zones are monitored by multiple devices and it is desirable to sequence from device to device without losing any critical images.

Circular sampling techniques are particularly useful when triggering events are used to initiate transmission of collected image data over the communications system. For example, if a triggering event is motion detected at a motion sensor, it may be useful to look at the images captured for a period of time both prior to and after the actual event. The circuitry of embodiments permits any circular sampling technique to be utilized depending upon application, such as prior to an after trigger, only after trigger or only before trigger. Again, as an example, it can be desirable to look primarily at images captured before a triggering event, if the event is a catastrophic event such as an explosion or the like. Other circular sampling techniques can be employed, as well, incorporating multiple cameras, for example, wherein different fields are sampled depending upon the time frame in a sequence of events.

Other configurations are contemplated and are within the teachings of the disclosure. While specific embodiments have been shown and described herein, it will be understood that the invention includes all modifications and enhancements within the scope and spirit of the claims.

What is claimed is:

1. A handheld self-contained cellular telephone and integrated image processing system for both sending and receiving telephonic audio signals and for capturing a visual image and transmitting it to a compatible remote receiving station of a wireless telephone network, the system comprising:

a manually portable housing;

an integral image capture device comprising an electronic camera contained within the portable housing;

a display for displaying an image framed by the camera, the display being supported by the housing, the display and the electronic camera being commonly movable in the housing when the housing is moved by hand;

a processor in the housing for generating an image data signal representing the image framed by the camera;

a memory associated with the processor for receiving and storing the digitized framed image, accessible for selectively displaying in the display window and accessible for selectively transmitting over the wireless telephone network the digitized framed image;

a user interface for enabling a user to select the image data signal for viewing and transmission;

a telephonic system in the housing for sending and receiving digitized audio signals and for sending the image data signal;

alphanumeric input keys in the housing for permitting manually input digitized alphanumeric signals to be input to the processor, the telephonic system further used for sending the digitized alphanumeric signals;

a wireless communications device adapted for transmitting any of the digitized signals to the compatible remote receiving station; and a power supply for powering the system.

2. The self-contained cellular telephone and integrated image processing system of claim 1, wherein the display for framing the image to be captured by the image capture device is operable to display the image at the system whereby the image can be viewed and framed prior to capture in the memory.

3. The self-contained cellular telephone and integrated image processing system of claim 1, wherein the display is operable to display for viewing alphanumeric messages input at the alphanumeric keys.

4. The self-contained cellular telephone and integrated image processing system of claim 1, further comprising a removable memory module in addition to the memory, said removable memory able to be removably housed in the housing for storing captured image data signals.

5. The self-contained cellular telephone and integrated image processing system of claim 1, wherein the display is operable to display for viewing incoming image data signals.

6. A handheld cellular telephone having an integrated electronic camera for both sending and receiving telephonic audio signals and for capturing a visual image, converting the visual image to a digitized image data signal and transmitting digitized image data signal via a cellular telephone network, the cellular telephone comprising:

a manually portable housing supporting the cellular telephone and the integrated electronic camera, the cellular telephone and the integrated electronic camera being movable in common with the housing;

a cellular telephone in the housing, the cellular telephone further including a transmitter/receiver for transmitting and receiving audio telephone messages over a cellular telephone network, a keypad for entering manually input alphanumeric signals to be transmitted over the cellular telephone network, and a display window for viewing the manually input alphanumeric signals:

an integral electronic camera in the housing, the camera for visually framing a visual image to be captured;

a processor associated with the electronic camera for capturing and digitizing the framed image in a format for transmission over the cellular telephone network via the cellular telephone;

a memory associated with the processor for receiving and storing the digitized framed image, accessible for selectively displaying in the display window and accessible for selectively transmitting over the cellular telephone network the digitized framed image;

a user interface for enabling a user to selectively display the digitized framed image in the display window and subsequently transmit the digitized framed image over the cellular telephone network; and an integrated power supply for powering both the cellular telephone and the camera.

7. The handheld cellular telephone of claim 6, wherein the display window for viewing the alphanumeric signals is within the display window for framing the visual image.

8. The handheld cellular telephone of claim 6, further including a second memory selectively removable from the housing.

9. A combination of handheld cellular telephone and electronic camera comprising:

a housing;

an electronic camera integral within the housing;

a display in the housing for framing the image to be captured by an image capture device and for viewing the image, whereby an operator can view and frame the image prior to capture;

a processor for processing the image framed by the camera for generating a digitized framed image as displayed in the display;

a memory associated with the processor for receiving and storing the digitized framed image for selectively displaying the digitized framed image in the display window and for selectively transmitting the digitized framed image over a cellular telephone network;

a cellular telephone in the housing for accepting and digitizing audio signals to be transmitted and for convening received digitized audio signals into acoustic audio, the cellular telephone further for transmitting and receiving non-audio digital signals including digitized image signals;

alphanumeric input keys in the housing for permitting manually input alphanumeric signals to be input into the cellular telephone, the manually input alphanumeric signals being presented in the display;

a power supply in the housing for powering the processor, the cellular telephone, the display and the camera;

a wireless transmitter/receiver in the housing for transmitting digital signals sent from and receiving digital signals sent to the cellular telephone; and digital/analog circuits for convening digital commands to analog signals for controlling gain, pedestal, setup, white clip, lens focus, white balance, lens iris, lens zoom and other functions of the camera from a local input device, a remote device or as automatic or programmed functions.

10. The combination of claim 9, further comprising a removable memory module removably housed in the housing for storing captured image data signals.

11. The combination of claim 9, wherein the display is suitable also for viewing image data signals received by the receiver.

12. A combination of handheld wireless telephone and digital camera comprising:

a handheld housing which supports both the wireless telephone and the digital camera, the wireless telephone and electronic camera being commonly movable with the housing;

a display supported in the housing for framing an image to be captured and for viewing the image, whereby an operator can view and frame the image prior to capture;

a processor for processing the image framed by the camera for generating a digitized framed image as displayed in the display;

a memory associated with the processor for receiving and storing the digitized framed image, for selectively displaying in the display window and for selectively transmitting over a wireless telephone network the digitized framed image;

the wireless telephone being selectively operable to accept and digitize audio signals to be transmitted, the wireless telephone being selectively operable to convert received digitized audio signals into acoustic audio, the wireless telephone being selectively operable to transmit and receive non-audio digital signals, the non-audio digital signals including a selected digitized framed image;

a set of input keys supported by the housing to permit alphanumeric signals to be manually input by an operator into the wireless telephone, the alphanumeric signals being presented in the display for viewing by the operator;

a power supply supported by the housing;

the wireless telephone including a wireless transmitter/receiver for transmitting digital signals sent from and receiving digital signals sent to the wireless telephone; and at least one camera control circuit connected to an input device for controlling at least one of the following functions: gain, pedestal, setup, white clip, lens focus, white balance, lens iris, lens zoom.

13. The combination of claim 12 and further comprising:

a removable memory module removably housed in the housing for storing captured images.

14. The combination of claim 12 and further comprising:

the display also being operable for viewing images received by the receiver.

15. The combination of claim 12 and further comprising:

the housing having a first portion, the housing having a second portion joined to the first portion, at least one of the first portion and the second portion being moveable in relation to the other of the first portion and the second portion, the first portion and the second portion also being commonly movable by hand when fixed in relation to each other.

* * * * *